United States Patent
Burmester et al.

(10) Patent No.: US 7,970,601 B2
(45) Date of Patent: Jun. 28, 2011

(54) METHOD OF CREATING A REQUIREMENT DESCRIPTION FOR TESTING AN EMBEDDED SYSTEM

(75) Inventors: Sven Burmester, Paderborn (DE); Klaus Lamberg, Altenbeken-Schwaney (DE); Christian Wewetzer, Gifthorn (DE); Christine Thiessen, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 888 days.

(21) Appl. No.: 11/924,577

(22) Filed: Oct. 25, 2007

(65) Prior Publication Data

US 2008/0109475 A1    May 8, 2008

(30) Foreign Application Priority Data

Oct. 25, 2006 (DE) .......................... 10 2006 050 112

(51) Int. Cl.
*G06F 17/28* (2006.01)
(52) U.S. Cl. .......................................... 704/9; 704/275
(58) Field of Classification Search ............... 704/9, 275
See application file for complete search history.

(56) References Cited

U.S. PATENT DOCUMENTS

| | | | | |
|---|---|---|---|---|
| 6,163,785 A * | 12/2000 | Carbonell et al. | ............ | 715/236 |
| 6,275,789 B1 * | 8/2001 | Moser et al. | ...................... | 704/7 |
| 6,334,103 B1 * | 12/2001 | Surace et al. | ................. | 704/257 |
| 7,085,708 B2 * | 8/2006 | Manson | ............................. | 704/9 |
| 7,165,236 B2 * | 1/2007 | America | ........................ | 717/102 |

OTHER PUBLICATIONS

German Examiner's Report dated May 14, 2008 and English Translation thereof.
German Examiner's Report dated Oct. 29, 2008 and English Translation thereof.
Uwe Schöning. Logik für Informatiker. Spektrum-Akademischer Verlag, Jan. 2000 (with English machine translation).
Georg E. Thaller. Software-Test: Verifikation und Validation. Verlag Heinz Heise, 2000, Sections 2.1 and 3.5 (with English machine translation).
Rupert Wiebel, Steffen Höh, and Stefan Hendrata. Specification Requirements Interchange Format (RIF), 2005.
Mario Friske and Holger Schlingloff. Von Use Cases zu Test Cases: Eine systematische Vorgehensweise. In T. Klein, B. Rumpe, and B. Schätz, editors, Tagungsband Dagstuhl-Workshop MBEES: Model Based Engineering of Embedded Systems, No. 2005-01 in Informatik-Bericht. TU Braunschweig, Jan. 2005 (with English machine translation).

(Continued)

*Primary Examiner* — Susan McFadden
(74) *Attorney, Agent, or Firm* — Orrick Herrington & Sutcliffe, LLP

(57) ABSTRACT

The invention relates to a method of creating a requirement description for an embedded system, including but not only a motor vehicle electronic control unit, in which a vocabulary of natural-language, selectable text segments is stored in a data processing system, said text segments being combinable with one another to form at least one natural-language sentence, possibly but not necessarily in the English language, to form a machine-readable requirement description, and that each text segment is linked to a set of further text segments that can be combined with it, whereby for a text segment that is selected, the data processing system automatically represents the further combinable text segments in selectable form on a display unit. The invention further relates to a computer program product stored on a data medium that, when executed on a data processing system executes a method according to one of the previous claims.

16 Claims, 76 Drawing Sheets

OTHER PUBLICATIONS

Juergen Grossmann, Mirko Conrad, Ines Fey, Alexander Krupp, Klaus Lamberg, and Christian Wewetzer. TestML—A Test Exchange Language for Modelbased Testing of Embedded Software. In Proceedings of Automotive Software Workshop, Mar. 2006.

Matthias Grochtmann and Klaus Grimm. Classification Trees for Partition Testing. vol. 3 of Software Testing, Verification and Reliability, pp. 63-82. 1993.

Erich Gamma, Richard Helm, Ralph Johnson, and John Vlissides. Entwurfsmuster. Addison-Wesley, Jul. 2004, Section 1.2—pp. 4-6 and 163-173.

Robert Bosch GmbH. Kraftfahrtechnisches Taschenbuch. Springer Verlag, 1999, pp. 124 and 167 (with English machine translation).

Jens Grabowski. TTCN-3—A new Test Specification Language for BlackBox Testing of Distributed Systems. In Proceedings of the 17th International Conference and Exposition on Testing Computer Software (TCS'2000), Theme: Testing Technology vs.Testers' Requirements, Washington D.C., Jun. 2000, Jun. 2000.

Mou Hu. A New Test Design Method for Requirement-Based Software Testing. Beijing, China, Aug. 2000.

IEEE. IEEE Standard Glossary of Software Engineering Terminology, Dec. 1990.

British Computer Society Specialist Interest Group in Software Testing. Standard for software component testing (draft 3.4), Apr. 2001.

Erik Kamsties, Daniel M. Berry, and Barbara Paech. Detecting Ambiguities in Requirements Documents Using Inspections. In Mark Lawford and David L. Parnas, editors, Proceedings of the First Workshop on Inspection in Software Engineering (WISE'01), pp. 68-80, Paris, France, Jul. 2001. Software Quality Research Lab, McMaster University, Hamilton, Canada.

Stuart Kent. Model Driven Engineering. In M. Butler, L. Petre, and K. Sere, editors, Proceedings of the Third International Conference on Integrated Formal Methods (IFM 2002), vol. 2335 of Lecture Notes in Computer Science, p. 286-298, Turku, Finland, May 2002. Springer Verlag.

Klaus Lamberg. Software-Entwicklung: Software-Testen. In H. Wallentowitz and K. Reif, editors, Handbuch Kraftfahrzeugelektronik Grundlagen—Komponenten—Systeme—Anwendungen. Vieweg Verlag, Wiesbaden, 2006 (with English machine translation).

Peter Liggesmeyer. Software-Qualität. Spektrum Akademischer Verlag, 2002, Sections 1.3.2 and 13.1 (with English machine translation).

EPO Search Report for EP09002479.5, dated Jul. 21, 2009 (with translation of Examiner's Notes).

Mahajan R., et al., "A Multi-Language Goal-Tree Based Functional Test Planning System", ITC International Test Conference, pp. 472-481, 2002.

Håkan L.S. Younes and Reid G. Simmons, "VHPOP: Versatile Heuristic Partial Order Planner", Journal of Artificial Intelligence Research 20: pp. 405-430, © 2003 AI Access Foundation.

Rolf Schwitter et al., "Attempto Controlled English (ACE) for Software Specifications", Department of Computer Science, University of Zurich, pp. 1-8, 2002.

K. Amschler Andrews et al., "AI Planner Assisted Test Generation, Anneliese Software Quality Journal", 10, pp. 225-259, © 2002 Kluwer Academic Publishers, Manufactured in the Netherlands.

Michael Esser and Peter Struss, "Automated Test Generation from Models Based on Functional Software Specifications", To appear in: 3rd Indian International Conference on Artificial Intelligence (HCAI-07), Dec. 17-19, 2007, Pune, India, 14 pages—No. 1.

M. Esser and P. Struss, "Model-based Test Generation for Embedded Software", To appear in 2nd Monet Workshop on Model-Based Systems at IJCAI-05, Jul. 30, 2005, 7 pages—No. 2.

Michael Esser and Peter Struss, "Obtaining Models for Test Generation from Natural-language-like Functional Specifications", Model-Based Systems & Qualitative Reasoning Group of the Technical University of Munich, pp. 1-36—No. 3.

M.W. Esser and P. Struss, "Obtaining Models for Test Generation from Natural-language-like Functional Specifications", In: G. Biswas et al. (eds.) DX'07, 18th International Workshop on Principles of Diagnosis, May 29-31, 2007, Nashville (USA), pp. 75-82—No. 4.

P. Struss, "Model-based Optimization of Testing through Reduction of Stimuli", In: International Joint Conference on Artificial Intelligence (IJCAI), Jan. 6-12, 2007, Hyderabad, India; 6 pages—No. 5.

Atif M. Memon et al., "Hierarchical GUI Test Case Generation Using Automated Planning", IEEE Transactions on Software Engineering, vol. 27, No. 2, Feb. 2001, pp. 144-155.

Martin Sachenbacher and Stefan Schwoon, "Model-based Test Generation using Quantified CSPs", Technische Universität München, Institut für Informatik, Boltzmannstraße 3, 85748 Garching, Germany, 6 pages, 2008.

Michael Scheetz et al., "Generating Test Cases from an OO Model with an AI Planning System", Computer Science Department, Colorado State University, Fort Collins, CO 80523, Downloaded on Nov. 11, 2008 at 06:39 from IEEE Ixplore, 10 pages.

Ghallab, M. and Traverso, P., "Automated Planning: Theory and Practice", Morgan Kaufmann, 2004, Chapter 14 Temporal Planning, pp. 309-347.

German Search Report, Jul. 11, 2007.

Altova UModel—UML 2.1 Software Modeling and Application Development Tool; http://web.archive.org/web/20060904173222/ http://www.altova.com/products/um; Jun. 29, 2007.

Agedis Consortioum; Agedis Model Based Test Generation Tools, Alan Hartman, Hartman@il.ibm.com, www.agedis.de, 2002.

Automated Test Generation Technology, Assertion Definition Language Project, X/Open Company Ltd., 1997.

From Natural Language Requirements to Executable Models of Software Components, Barrett R. Bryant, Beum-Seuk Lee, Fei Cao, Wei Zhao, Carol C. Burt, Jeffrey G. Gray, Rajeev R. Raje, Andrew M. Olson, and Auguston, Mikhail, Proceedings of the 2003 Monterey Workshop on Software Engineering for Embedded Systems, Sep. 24-26, 2003, Chicago, IL 2003, pp. 51-58.

Gebit Solutions, A.S. (planty@gebit.de); http://web.archive.org/ web/20030618051817/http://www.gebit/de/download/planty/ planty.html (with English language machine translation), Jul. 2007.

Werkzeuggestützte interaktive Formalisierung textueller Anwendungsfallbeschreibungen für den Systemtest, Mario Friske, Holger Pirk, Fraunhofer First, Kekuléstraße 7, D-12489 Berlin, {mario.friske, holger.pirk}@first.fhg.de (with English language machine translation), 2005.

Attempto Controlled English (ACE) for Software Specifications, Rolf Schwitter, Norbert E. Fuchs, Uta Schwertel, Department of Computer Science University of Zurich, {schwitter, fuchs, uschwert}@ifi-unizh.ch, http:/www.ifi.unizh.ch/~fuchs/, http:// www.ifi.unizh.ch/~schwitter/, Mar. 1998.

ECOLE: A Look-ahead Editor for a Controlled Language; Rolf Schwitter, Anna Ljungberg, David Hood; Centre for Language Technology; Macquarie University, Sydney, NSW 2109, Australia, {schwitt|anna|dhood}@ics.mq.edu.au, 2003.

Attempto Controlled English (ACE) Language Manual, Version 3.0; Norbert E. Fuchs, Uta Schwertel, Rolf Schwitter, Institut für Informatik der Universität Zürich, Nr. 99.03—Aug. 1999.

Donald W. Loveland. Automated theorem proving: A logical basis. In Fundamental studies in computer science, vol. 6, Amsterdam, New York, 1978. North-Holland Publishing Co.

Peter Liggesmeyer and Dieter Rombach. Software Engineering eingebetteter Systeme. Spektrum Verlag, 2005, Sections 7.1 and 15.1.1 (with English machine translation).

The OMG's Model Driven Architecture, Jan. 2002.

Bill Moore, David Dean, Anna Gerber, Gunnar Wagenknecht, and Philippe Vanderheyden. Eclipse Development using the Graphical Editing Framework and the Eclipse Modeling Framework. Jan. 2004.

Object Management Group. UML 2.0 Superstructure Specification, Aug. 2005. Document ptc/May 7, 2004.

Rainer Otterbach, Oliver Niggemann, and Joachim Stroop. SoftwareEntwicklung: Entwicklungsprozesse, Methoden und Werkzeuge. In H. Wallentowitz and K. Reif, editors, Handbuch Kraftfahrzeugelektronik Grundlagen—Komponenten—Systeme—Anwendungen. Vieweg Verlag, Wiesbaden, 2006 (with English machine translation).

Jan Peleska. Verbesserte Softwarequalität durch effiziente Testprozesse. Technologie-Zentrum Informatik und Verified Systems International GmbH. Revision: 1.5 (with English machine translation), 1998.

Amir Pnueli. The Temporal Logic of Programs. In Proceedings of the 18th IEEE Symposium on the Foundations of Computer Science, pp. 46-57. IEEE, 1977.

Chris Rupp. Requirements-Engineering und—Management. Hanser Verlag, 2004, Sections 7.1 and 8.2 (with English machine translation).

Rachel L. Smith, George S. Avrunin, and Lori A. Clarke. From Natural Language Requirements to Rigorous Property Specification. In Workshop on Software Engineering for Embedded Systems (SEES 2003): From Requirements to Implementation, pp. 40-46, Sep. 2003.

* cited by examiner

If
- the ignition is on
- and the driving light switch is switched on
- and the rear fog light button was pushed or
- the ignition is on
- and the side marker light switch is switched on
- and the fog lamp switch is switched on
- and the rear fog light button was pushed then
- the "rear fog light indicator lamp" lights up.

Figure 7

Unlocking the vehicle causes the interior lighting to be switched on.

Figure 8

| Text in Requirement | Synonym |
|---|---|
| the vehicle | all doors |
| unlocked | lock open |
| locked | lock closed |
| button 'unlock' on the remote control | 'unlock' key on the remote control |
| pushed | activated |

Figure 22

Requirement

| If | the button 'unlock' on the remote control | is | pushed | at least | 2 seconds |

| then | the vehicle | is | unlocked | after at most | 3 seconds |

Test steps

| Set | the button 'unlock' on the remote control | to | pushed | for 2 + how many | seconds |

| Check whether | the vehicle | is | unlocked | after 3 – how many | seconds |

Figure 46

Requirement

| If | the speed | is | 30 km/h | for at least | 4 seconds | after at most | 5 seconds | then .... |
|----|-----------|----|---------|--------------|-----------|---------------|-----------|-----------|
| and | the speed | is | 20 km/h | for between | 10 and 12 seconds | after exactly | 4 seconds | |

Figure 47

```
<eClassifiers name="AND">
  <label>and</label>
  <displayOrder>
    <item>
      <element>baseExpressionElement</element>
    </item>
    <item>
      <classInstance/>
    </item>
    <item>
      <element>baseExpressionElement1</element>
    </item>
  </displayOrder>
</eClassifiers>
```

Figure 54

Requirements

| Create Text Module | Add Synonym | Create Requirement | Create Test Specification |

Requirement

If | the button 'unlock' on the remote control | is | pushed then | the vehicle | is | unlocked not
and
or
xor

Figure 58

Requirements

Create Text Module | Add Synonym | Create Requirement | Create Test Specification Requirement

| If | the button 'unlock' on the remote control | is | pushed |

| then | not | the vehicle | is | unlocked |

Figure 60

```
algorithm( chosenElement )
{
    nextElement = getNextElements( chosenElement )
    for all nElement ∈ nextElements
    {
        if nElement is abstract
        {
            specialElements = getSpecialisations( nElement )
            for all sElement ∈ specialElements
            {
                addToUserMenu( sElement )
            }
        }
        else
        {
            addToUserMenu( nElement )
        }
    }
}
```

Figure 61

If
- the ignition is on
- and the driving light switch is switched on
- and the rear fog light button was pushed or
- the ignition is on
- and the side marker light switch is switched on
- and the fog lamp switch is switched on
- and the rear fog light button was pushed then
- the "rear fog light indicator lamp" lights up.

Figure 72

If
- the ignition is switched off
- or the driving light switch is switched off
- or the rear fog light button is pushed again then
- the "rear fog light indicator lamp" is switched off.

Figure 73

If
- an accident occurs then
- the front airbags must be activated,
- and the head airbags must be activated,
- and the side airbags must be activated.

Figure 74

- Unlocking the vehicle causes the interior lighting to be switched on and

- pulling the key out of the ignition causes the interior lighting to be switched on.

METHOD OF CREATING A REQUIREMENT DESCRIPTION FOR TESTING AN EMBEDDED SYSTEM

RELATED APPLICATIONS

Applicants hereby claim priority under 35 USC §119 to German Application No. 10 2006 050 112.8 entitled "Verfahren zur Erstellung einer Anforderungsbeschreibung für ein eingebettetes System" filed in the German Patent Office Oct. 25, 2006 and incorporated herein by reference.

FIELD OF THE INVENTION

The invention relates to a method of creating a requirement description, and also but not only of creating a test specification, for an embedded system.

BACKGROUND

An embedded system is usually a software/hardware unit which is connected to a surrounding system or entire system via sensors and/or actuators and/or interfaces. For example, an embedded system can perform monitoring, open-loop control, or closed-loop control tasks.

In this context, an embedded system is understood to be not only the concrete hardware implementation of the embedded system, but also preliminary stages in the development of a hardware-implemented embedded system, that is, for example, a software model for simulating such an embedded system.

To achieve a high quality standard, it is common practice to test embedded systems, such as electronic control units, extensively before their introduction into production, and thereby to check whether they comply with the specified requirements. Thus, the requirements to be applied to an embedded system must be known for such tests, and also, but not only, for the development of such tests.

Requirements are usually specified by the customers of a manufacturer of such an embedded system and normally take the form of a natural-language requirement, for example, a text written by the person specifying the requirement.

The problem arises here that the natural language, whichever language it is, is not usually unambiguous, and the described requirements can therefore be unclear.

Further, such requirements, which may, for example, express a property or action of an embedded system, must be tested, for which it is common practice to write appropriate test programs, either to test the embedded systems after their hardware implementation or to test the earlier software model on which the embedded system is based.

Programmers then write software routines which are not in themselves understandable, particularly to an inexperienced observer, so that it is not possible, from looking at the software routines, to draw direct conclusions about what is tested by a software routine and what the result will express.

SUMMARY

It is therefore one task of the invention to provide a method of creating a requirement description for an embedded system, such that said description will enable any user to recognize unambiguously which concrete requirement is being dealt with and will secondly be suitable for generating automatically, from the described requirement, an unambiguous test with which the embedded system can be tested.

This task is solved by storing, in a data processing system, a vocabulary of selectable, natural-language text segments, which can be combined to form at least one sentence in a natural language, or human comprehendible language, including but not only the English language, to make a machine-readable requirement description.

Storing a limited vocabulary of selectable, natural-language text segments in this way makes it possible to form, from said limited text segments, a natural-language sentence which is unambiguously understood by every person who can read and speak the natural language concerned.

Limiting the vocabulary and providing only certain text segments ensures that ambiguities in formulating a natural-language sentence are avoided, and that the requirements can therefore be formed unambiguously and clearly. In this connection, it is an aspect of the invention that the selectable text segments, which are provided by the limited vocabulary stored on the data processing system, cannot be combined in any arbitrary sequence, but that according to a further aspect of the invention, it is so arranged that every text segment that can be selected from the said limited vocabulary can be linked only with a specific or specifiable set of other text segments that can be combined with the said text segment, whereby it is so arranged by the method that for a text segment that is selected, the data processing system automatically displays the other combinable text segments on a display unit for selection.

Thus, each time a text segment is selected, the data processing system automatically presents further text segments that can be combined with the text segment previously selected. In this context, a distinction can be made between text segments that can be added optionally and text segments from which it is mandatory to select at least one in order to produce a semantically and syntactically correct requirement description.

It can therefore be so arranged according to the invention that the user's usual ability to select freely is restricted, and that after a text segment is selected, whether or not by the user, only limited, deterministically selected text segments are presented for further use. Said presentation and selection of text segments can be implemented in arbitrary ways. For example, the text segments can be represented as menu items which can be selected, possibly but not necessarily by computer mouse, and possibly but not necessarily by a user.

According to an example embodiment of the method, it can be so arranged that the text segments are assigned to classes of a stored requirement metamodel. Such classes include, but are not restricted to, UML classes, that is, classes of the unified modeling language, which is frequently used for modeling items such as company application systems. This is a standardized language which can be understood, for example, directly and platform-independently by different computer systems, or it can be so arranged that reading to the data processing system is performed by a special software routine to achieve machine-readability.

It is therefore possible according to the invention to create, in parallel to creating a natural-language sentence from the presented text segments, a requirement description that obeys formal aspects that are defined by the requirement metamodel, so that the data processing system creates, in parallel, an instance of the requirement metamodel that represents a requirement description that can be understood by a data processing system. Thus, with the method according to the invention, on the one hand the requirement description is formed as a natural-language sentence that can be understood unambiguously by any user, and on the other, in parallel to that, an instance of the underlying requirement metamodel is formed, e.g., described in terms of UML classes, which can be concretely understood and executed by a computer.

It can therefore, according to one aspect of the invention, be so arranged that for every selected text segment, an instance of the requirement metamodel is supplemented by an instance of the requirement metamodel class that is linked to that text segment.

The instance of the class that is linked to the text segment is understood here as a concrete element of the class concerned.

According to another aspect of the invention, it can further be so arranged that every text segment is assigned to a class of the requirement metamodel, and that for each class, information is stored on at least one relationship, and the direction of the relationship, to at least one other class, so that the unidirectional relationships form a class sequence that defines a grammatically correct arrangement of the text segments assigned to the classes.

This aspect therefore ensures that the text segments stored in the limited vocabulary cannot be combined with one another arbitrarily, but that by means of the assignment to classes and the relationships or associations that apply between the text segments, there is only one specific sequence of possible combinations of text segments in each case.

By this means, a user of a data processing system on which the method according to the invention is executed can be prevented from performing arbitrary text segment combinations, so that by using only text segments that are presented for selection, a deterministically prescribed requirement description is created, whose variability of formulation results only from the scope of the class concerned in each case, and therefore from the number or set size of the displayed and combinable text segments. Alternatively, it can also be so arranged that, if no deterministically prescribed requirement description results after a selection, an option for subsequently adding a text segment to the stored text segments is displayed to the user.

The linking and representation of a selected text segment with a set of combinable text segments can be performed in such a way that the data processing system first determines, for a selected text segment, the class of the requirement metamodel that is assigned to the selected text segment. It is then possible to find at least one subsequent class, in accordance with the unidirectional relationships that are stored in the requirement metamodel and that exist between the different possible classes, whereby subsequently those elements or concrete instances of at least one found subsequent class are collected to form a set whose elements are represented by the text segments assigned in each case and which are subsequently displayed for selection on the display unit of the data processing unit. Said display can take the form of a selectable text segment, for example, of a menu item, which can be selected, for example, by clicking with a computer mouse. Display and selection can also be performed according to the invention by any other means, however.

Provision can be made for making a basic distinction between different sets of text segments. For example, it can be so arranged that there are sets of mandatory text segments from which, in every case, a text segment must be selected to form a syntactically correct requirement, and further, there can be sets that comprise possible text segments from which it is not mandatory to select a text segment, but from which a selection can be made if desired.

For example, such a set of possible text segments can be text segments concerning time specifications or any temporal aspects, for example, temporal conditions. For example, a requirement can provide for a specific condition occurring only at a specific time or on expiry of a time or according to some other temporal aspect. Thus, such a time specification is not mandatory in a requirement description, but can be used by preference.

The method according to one aspect of the invention therefore provides the possibility of skipping such sets of non-mandatory, optional text segments during selection. For example, this can be done by such a set of possible text segments initially being displayed, but by the user informing the computer system, e.g., by clicking an appropriate menu item, that he/she does not wish to make a selection from these text segments. The computer system will then clear the display of this specific set and either display a further set of possible text segments or pass on to displaying mandatory text segments, from which the user must now select at least one text segment.

In still another embodiment of the invention, it can also be arranged so text segments that were already selected and incorporated into a finished requirement description can be replaced by alternative text segments, whereby it can be so arranged that after selection of a text segment for replacement, the data processing system automatically displays a set of possible alternative text segments for selection.

By selecting such an alternative text segment from the set displayed, the text segment to be replaced can be replaced automatically by the data processing system. The possible alternative text segments can be found by means of the data processing system first determining the class to which the text segment selected for replacement belongs, whereupon a set of text segments that all belong to that class is formed, and then that set is displayed. The set will essentially correspond overall to the contents of the determined class, possibly but not necessarily minus the text segment selected for replacement.

The method according to one aspect of the invention clearly shows that it is possible firstly to create a natural-language requirement description that can be understood and read unambiguously by the user, and that secondly, by linking to an underlying requirement metamodel, a concrete instance of the requirement metamodel that the computer can understand can be created in parallel.

Thus, according to a further aspect of the invention, it is also possible that after creation of a natural-language requirement description, the data processing system performs a transformation that converts the requirement description into a platform-independent, natural-language test specification. This test specification can also result from an instance of a test metamodel which is formed by the transformation. Thus, the transformation to be performed is based on mapping rules, according to which the instance of the requirement metamodel is converted into the instance of the test metamodel. In this context, there can partly be correspondences between the two metamodels with regard to the classes and to the concrete instances contained in them, and also differences between them, including but not only differences that are mapped from one to the other by the transformation process.

Thus, an example embodiment will be so arranged that to perform the transformation, an instance of the requirement metamodel formed in parallel to the natural-language requirement will be converted by the model transformation into an instance of the test metamodel, for which, as stated above, at least some of the elements of the instance of the requirement metamodel are transformed into elements of an instance of the test metamodel. According to an aspect of the invention, it can be so arranged that an instance of the test metamodel obtained by this means is in turn represented by the data processing system on the display unit as a natural-language test specification, which can be read and clearly understood by the user, whereby it can be so arranged according to the invention that natural-language text segments are also assigned to elements of the instance of the test metamodel, in the same way as for the requirement metamodel. Accordingly, these assigned text segments can be displayed by the data processing system on the display in a sequence given by the syntax underlying the test metamodel, so that a natural-language sentence is also formed in this display.

During a transformation, one embodiment can be so arranged that elements of the instance of the requirement metamodel that describe a condition are transformed into elements of the instance of a test metamodel that effect a value assignment at the inputs of the embedded system. For example, it can be so arranged that the door of a motor vehicle must be opened if the condition is met that a button on the remote control of the motor vehicle is pushed. This condition, which is expressed in the requirement description, is changed into a value assignment by a transformation process, such that a value representing the pushed state of the button on the remote control is assigned to that button or to the input provided for it on the embedded system. Further, it can then be so arranged in a transformation that elements of the instance of the requirement metamodel that describe a reaction to a condition are transformed into elements of the instance of the test metamodel that test the values of the outputs. With reference to the same example, the requirement states that the door of the motor vehicle must be opened if the button was pushed under the condition stated above. The reaction to the condition is therefore the opened door, which means that in the instance of the test metamodel, the value of an output of the embedded system, that is, for example, of a motor vehicle electronic control unit, to which the door is assigned, is checked in order to test, by reference to the value that is read, whether there is a stored value that represents an open door.

In forming a requirement description by means of the method according to the invention, it can also be so arranged that the text segments that are used take temporal aspects into account. Thus, for example, conditions after specific times or at specific times, as well as the associated reactions, can be described. In the same way, it can be so arranged that imprecise temporal aspects are formulated in a requirement, for example, that a reaction must not occur before expiry of a minimum specified period of time. According to the invention, such an imprecise time specification in a requirement description is transformed into elements of the instance of the test metamodel, which comprise degrees of freedom that can be concretized with regard to time.

This means that the associated instance of the test metamodel is not yet concretized with regard to the time aspect stated in the requirement description, so that a user who wants to execute the test must first concretize the degree of freedom. Thus, there is the particular advantage that different users, who may want to execute the test with different time aspects, can concretize the provided degree of freedom individually.

According to a further aspect of the invention, it can then be so arranged that a platform-dependent test program is generated from the platform-independent instance of the test metamodel. However, the precondition for this is that concretization is first performed, in the instance of the test metamodel, for any provided degrees of freedom that still have to be concretized in terms of time. The platform-dependent test program that is then formed can be executed on a test computer that is provided for that purpose, in order to test either the electronic control unit that is simulated on the test computer or the concrete electronic control unit that is connected to the test computer. In this context it can be so arranged that a natural environment for the electronic control unit is additionally simulated, so that the electronic control unit can be tested under real conditions, but not in the real environment, which usually has to be avoided in test phases.

BRIEF DESCRIPTION OF THE DRAWINGS

The drawings show:
FIG. 7: Rear fog light indicator lamp
FIG. 8: Requirement: Interior lighting
FIG. 22: Synonyms
FIG. 46: Requirement with degrees of freedom in the time description
FIG. 47: Overlapping time intervals
FIG. 54: Excerpt from the XML document with information on sentence
FIG. 58: Extending the requirement with an additional sentence part linked by an operator
FIG. 60: NOT operator was added
FIG. 61: The algorithm represented in pseudocode
FIG. 72: Scenario "indicator lamp on"

FIG. 73: Scenario "indicator lamp off"

FIG. 74: Scenario "airbag"

DETAILED DESCRIPTION

Figure 1:
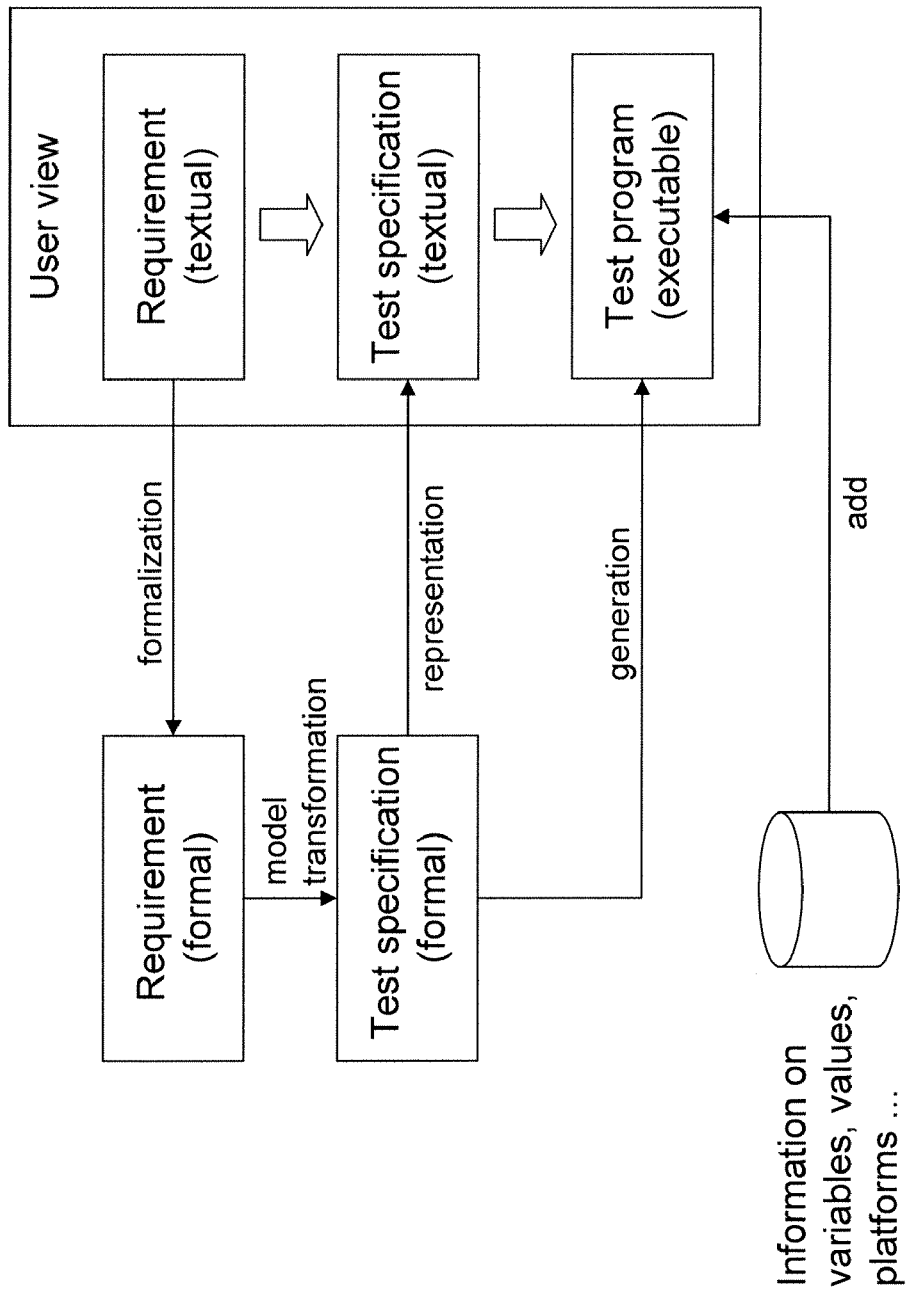
FIG. 1: Entire concept

A schematic overview of the method according to the invention, with its mandatory and optional embodiments, is shown in FIG. 1.

This shows a user view, which is created, for example, by making text segments available to a user on a display unit by means of the data processing system. A user can select the text segments, of which a limited set is provided, and by this means put them together to form a textual, natural-language requirement, for example, in the English language. On the left of the user overview, it can be seen that the requirement that was created textually is formalized by an underlying, formal requirement metamodel. Thus, it becomes clear here that in parallel to the natural-language, textual creation of the requirement, an instance of a requirement metamodel, e.g., a UML model, is created, formalized by the data processing system.

By means of the model transformation further described here, the instance of the requirement metamodel can be converted into an instance of the test metamodel, which describes the test specification as a formal instance which can be read by the computer. This formal test specification, i.e., the instance of the test metamodel, is represented in a textual, natural-language representation of the test specification, which on the other hand can be read by a user in a natural language on the display of the data processing system, and can therefore be understood completely and unambiguously by the user.

Further, on the basis of the formally created instance of the test metamodel, platform-dependent generation of a test program can be performed, which is executable on the data processing system that was also provided for creating the requirement, or on another data processing system. It can additionally be so arranged that further information on variables, values, platforms, or other items, can be added to the platform-dependent test program, e.g., by linking the contents of a library. Further, according to the invention it can be so arranged that the user can add text segments, which in turn can be assigned to instances in the requirement metamodel. Thus, extensions to the underlying requirement metamodel can also be made by a user.

Further concrete embodiments of the method according to the invention are described in greater detail below, with some basic information first being given.

In this context it must first be stated, with regard to all the embodiments named above and below, that the technical features named in connection with an embodiment can be used not only with that specific embodiment, but also with the other embodiments. All the disclosed technical features of this entire invention description are therefore to be regarded as parts of the invention and may be used together in arbitrary combinations or in stand-alone form.

Embedded systems are becoming increasingly widespread. Nowadays, for example, they can be found in vehicles, automatic teller machines, and washing machines. Automobiles have more than 50 networked electronic control units implementing functions such as window control and anti-brake-lock systems. Without a systematic development process, such a network of complex systems cannot be produced with acceptable quality and in a reasonable timeframe. Systematic quality assurance is a fixed component in any development process for such systems.

In practice, testing is one of the most widespread quality measures. With the software part of embedded systems constantly growing, the workload for testing the software also grows [BN03]. Since development costs rise with increasing workload, ways of automating tests are being sought to reduce the workload. While automatic test execution is already a standard technique, the automation of test development still remains largely to be researched.

Figure 2:
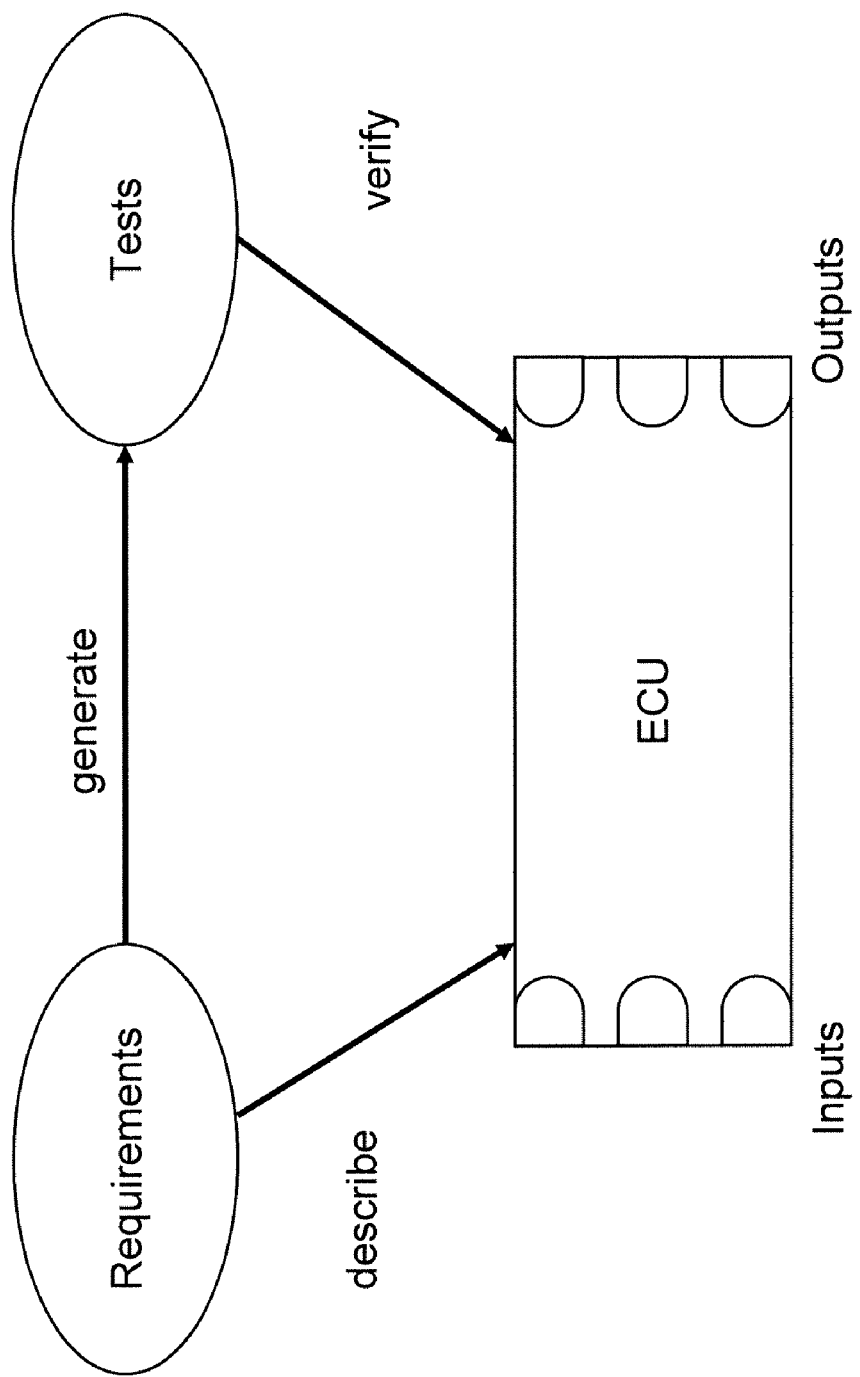
FIG. 2: Text generation based on a requirement.

Common methods rely on formalized requirement descriptions, for example, state machines [CTF01]. However, tests created from formally specified behavior descriptions are more likely to cover only checks on the correctness of the created software in relation to the formal specification. Whether a system was really developed with the requirements desired by the customer can be established by comparing the system with the requirements originally defined by the customer. FIG. 2 shows an example. It represents an electronic control unit (ECU) for which requirements are made. Tests must be generated from these requirements and applied to the ECU.

This invention presents a methodology of automatic test generation that is based on natural-language requirements. However, natural language is not unambiguous, so neither are the requirements described with it. This reveals the necessity of first assigning an unambiguous meaning to the textual requirement description.

In the framework of an aspect of the invention, a requirement metamodel was created that defines a syntax for a requirements and a vocabulary for the requirement description. The vocabulary is assigned a semantic. By creating a requirement on the basis of the metamodel, a formal requirement is produced. This forms the basis for generating a test that checks whether the system meets the defined requirements.

Formal test steps are derived from a requirement, and a test implementation can be created from the formal test steps. The test steps are presented to the user in the form of natural language, so that the test sequence is understandable to the user, and the user can make sense of the test results of an executable test that was created. This embodiment of the invention contains the conception of a metamodel for describing the test steps, and a model transformation that derives an instance of the metamodel for test steps from an instance of the requirement metamodel. This is followed by the generation of a test implementation that tests the functionality of an embedded system, said functionality being defined in a requirement.

A prototype shows how the created concepts can be applied in practice. The prototype allows convenient creation of a natural-language requirement, and automatic generation of a sequence of test steps. An executable test can be created from these defined test steps.

First the basics that are required for understanding and categorizing this invention are explained. These include a description of the development process for embedded systems, a description of requirements, and the testing of software. Finally, existing concepts for related issues are discussed. The following part of the invention description comprises the concept for formalizing natural-language requirements, and the design of automatic test generation from these requirements. In addition, it shows how mapping to a concrete test is performed. Then the prototype implementation of this concept is described. Finally, application examples are given and the prototype is evaluated to show the possible uses of automatic test generation. The description of the invention closes with a summary and an outlook.

The introduction to the basics begins by describing the development process for embedded systems and discussing their features. There follows a closer look at requirement creation and at testing, as these two development phases are of decisive importance to the issue of automatic test generation from natural-language requirements.

This section defines embedded systems and describes their development process. A distinction is made between the development of embedded systems and pure software development.

An embedded system is a software/hardware unit that is connected to an entire system via sensors and actuators and that performs monitoring and control tasks in the entire system [BvdBK98]. Sensors and actuators together form the interface between the embedded system and the environment. Sensors convert mechatronic actions into information technology signals. Actuators convert information technology signals into mechatronic actions [Gmb99].

Such systems are typically concealed from the human user, as they function as an integrated part of the entire system. Thus, the user interacts unknowingly with embedded systems, which occur, for example, in vehicles, automatic teller machines, and washing machines. [LR05] gives the following definition of an embedded system:

"Embedded systems are primarily distinguished from other computer applications in that they directly affect a physical environment. The computer is used as an electronic machine that controls the surrounding physical processes. To monitor and control the physical process of the environment, sensors and actuators are used; these form the communication environment between physical processes and the computer system."

Figure 3:
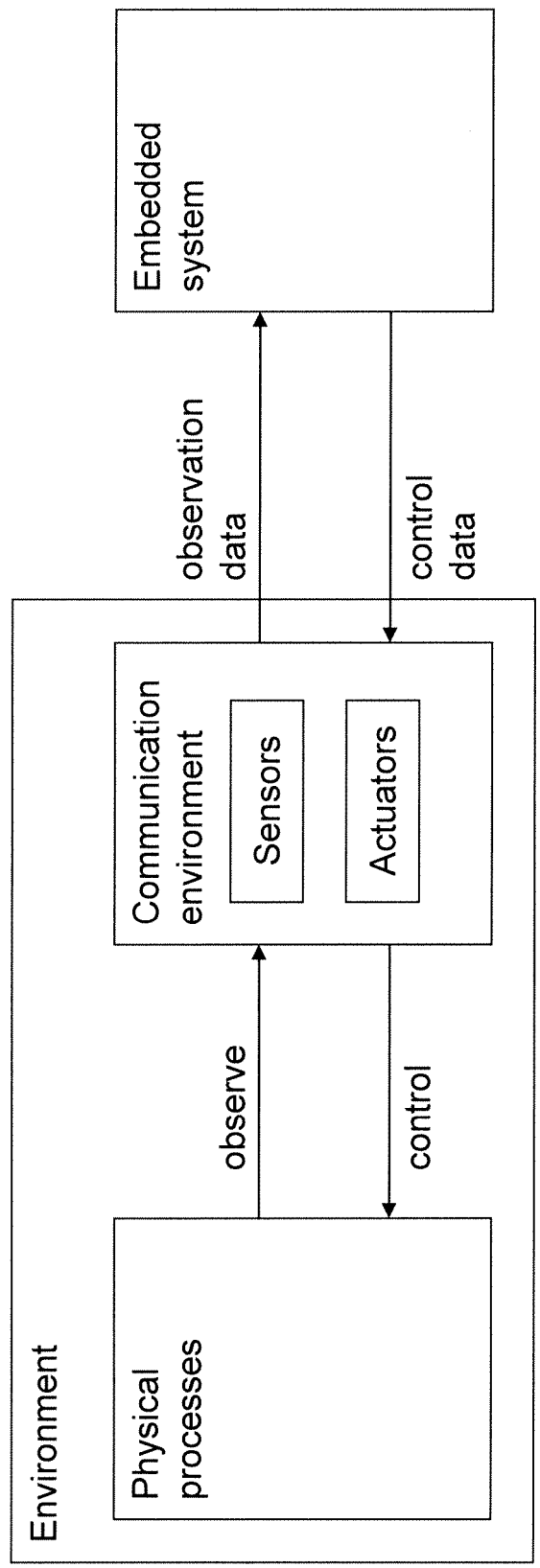
FIG. 3: Embedded system (according to [LR05])

FIG. 3 represents an embedded system that monitors physical processes via sensors and controls them via actuators. From a physical point of view, sensors and actuators can also be part of the embedded system. An example of an embedded system is an ECU that represents the physical implementation of an embedded system, especially in automotive technology [BvdBK98]. As a rule, an ECU consists of processor, RAM, and other electronic components. It performs control tasks for technical processes in an entire system. [Gmb99] defines control according to DIN 19226 as follows:

"Control—controlling—is the process in a system in which one or more variables, as input variables, affect other variables, as output variables, on the basis of the rules inherent in the system."

Embedded systems can be categorized in the class of reactive systems [LR05]. A reactive system interacts constantly with its environment. It converts input events, whose times of occurrence can mostly not be predicted, into output events. This is often done in compliance with time specifications [BvdBK98]. A door ECU in a vehicle is a typical example of a reactive system. The door ECU reacts, for example, by locking or unlocking the door lock, according to specific input variables such as a signal that is caused by the remote control being used.

The correctness of the monitoring and control tasks that an embedded system performs is in most cases dependent not only on functional correctness, but also on the time in which the task is performed. The functionality of an airbag cannot be regarded as correct if it reacts to an accident but its reaction time would be 10 minutes. As a rule, therefore, embedded systems are real-time systems. A real-time system executes functions with reference to temporal conditions, so that the execution end of a function is predictable [LR05].

Embedded systems are typically digital systems that continuously sample (analog) signals and thereby convert them into discrete (digital) signals. Strictly speaking, digital systems always function discretely, because they sample analog signals from the real world. The sampling of analog signals is performed by software. Because time inevitably elapses between two software cycles due to calculations, execution cannot be time-continuous, but must be time-discrete. The "discreteness" therefore results from the clock frequency or sampling rate of the analog signal, which has only a finite size.

EXAMPLE

"A central locking system is a function that is implemented by several ECUs. The behavior of a central locking function is described here, to be used as an example application scenario throughout the description of the invention.

A central locking system is nowadays one of the standard features of many vehicles. It offers the driver and the passengers greater convenience and also improved safety. In addition to the collective locking and unlocking of all doors, the tasks of a central locking system can include functionalities such as closing all windows when the doors are locked or unlocking all doors in an accident. A central locking system must of course be tested, as its functionalities partly have safety-critical aspects. If the unlocking of a door is not performed in the event of an accident, people can be harmed by this fault. A test on a central locking function tests the behavior of the ECUs that implement the function in a network.

One ECU for each door, one remote control, and one lock per door are commonly required to implement a central locking functionality. Communication between the ECUs runs via a bus system. A door ECU monitors sensors, for example, to detect the door being unlocked by the door button, and controls individual actuators. For central locking, all door buttons are put in the down position by actuators."

This section first explains the approach used in the software development process as described in [Bal98] and then goes on to describe the features that are peculiar to embedded systems.

The process of software development essentially differs from the creation of other products. Software is immaterial, and the progress of its development is very difficult to assess. The reason is that new knowledge gained during the development process can affect further development on the one hand, but also, on the other hand, have an effect on previous results. This may lead to extensions or modifications to aspects that were already finished, so that specific product parts are only ever conditionally finished [Bal98]. The above properties of the software development process mean that estimating the time required, and therefore also budgeting for costs, is extremely difficult, so very many projects fail, thereby causing losses.

It is at precisely this point that software management comes into play, utilizing various methods to create a development process that is as plannable and predictable as possible. Models for describing the process sequence of development are an aid to structuring the procedure. The use of process models affects the plannability of development and allows forecasts to be made. Successful software development depends on early error elimination. The later a necessary modification has to be made, the more cost-intensive the reworking process is, as it covers several development stages.

Figure 4:
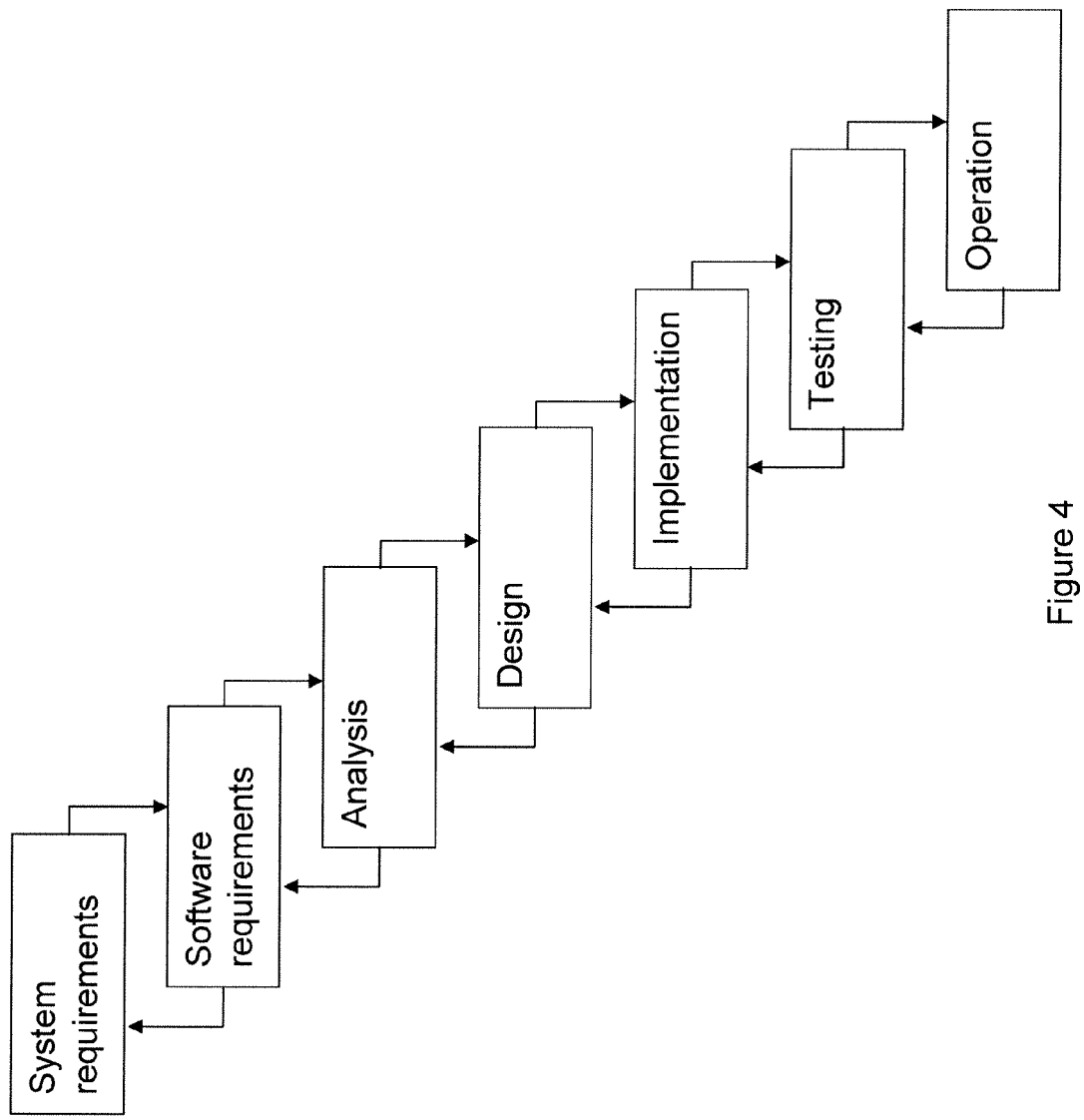
FIG. 4: Waterfall model (based on [Bal98])

The basic development phases in a process model can be seen in FIG. 4. First customers' expectations and wishes regarding the system to be developed are defined in the form of requirements. The software requirements are derived from these. To take existing systems and the environment into account, an analysis of general conditions is made, as these can have an effect on the new system. This is followed by the creation of the software design, which is implemented in the implementation phase. The software that is developed undergoes numerous tests before being put into operation. Many process models further subdivide the design phase into preliminary design and detailed design. In the former, the system concept of the entire system is produced, while in the latter, the focus is on the functionalities of individual components.

The model shown in FIG. 4 is called the waterfall model. This was the first thought-through process model in software engineering, and formed a basis for many models that were developed later. The principle of the waterfall model is that the next phase is never begun until the previous phase has been completed, with the phases building on one another [Bal98]. Each phase begins with defining objectives that provide orientation for performing the activities in the phase. At the end of each activity, documentation is produced. This is used to check whether all the objectives defined before the phase were fulfilled. In the negative case, a modification document is created, and the process returns to the beginning of the previous phase. Such feedback allows several iterations from defining objectives to execution and through to documentation of an individual phase. This means that intensive checks are performed at every stage, so that errors can be found as early as possible.

Figure 5:
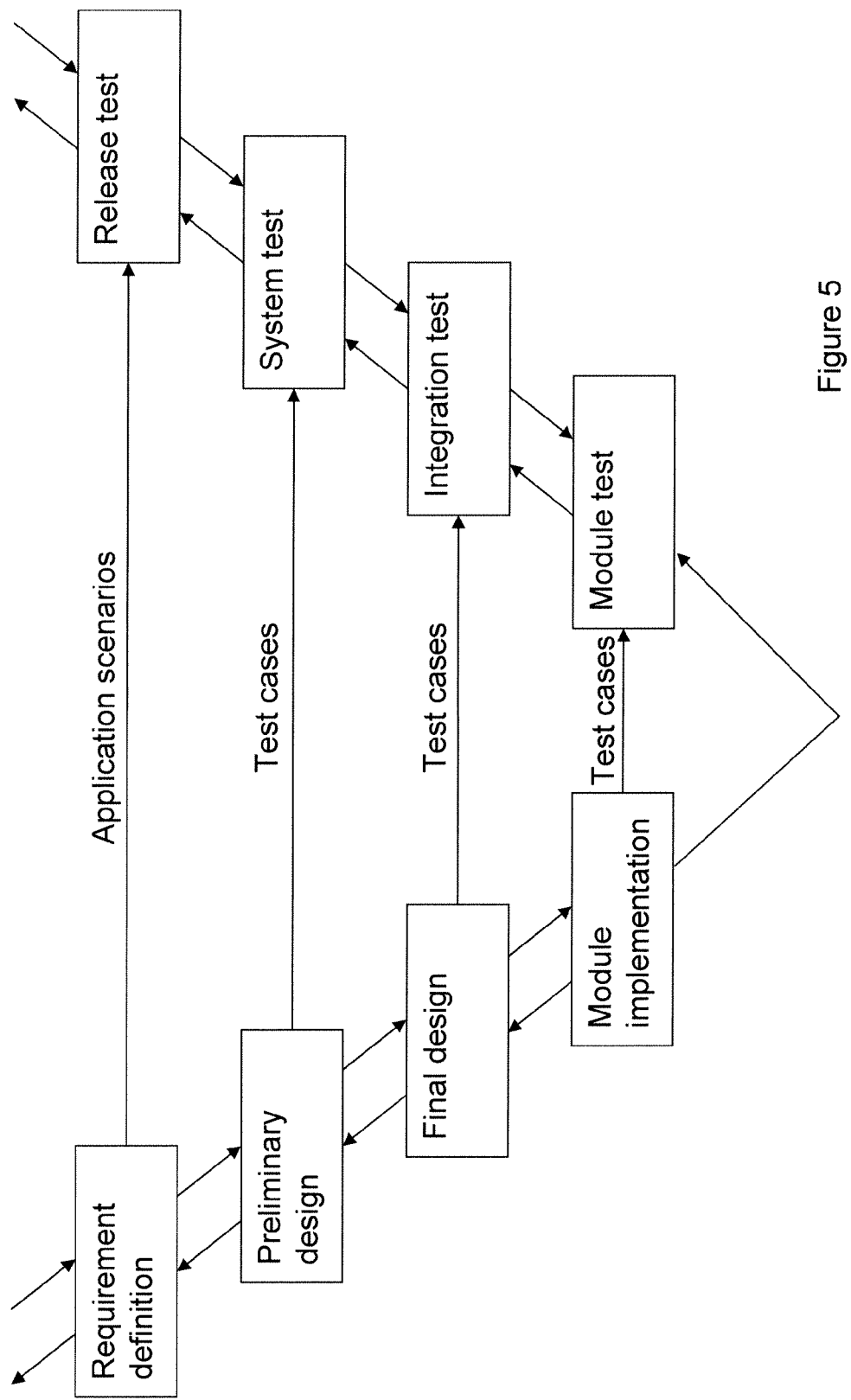
FIG. 5: V-cycle (according to [Bal98])

The V-cycle is an extension of the waterfall model. It integrates quality assurance by placing a test alongside every phase. As can be seen from FIG. 5, modules that were implemented individually are tested in a module test. This is followed by the integration test, which is characterized by a behavior test on a combination of several modules. Testing of the entire system is performed in the system test, which is followed by the acceptance test, in which the implementations of the customer requirements are checked [Bal98].

The V-cycle was originally developed for embedded systems [Bal98], so software is always regarded as a component of an information technology system. The development plan for such a system comprises both software and hardware development, so that there can be electronic parts. The greatest challenge in this is coordinating the development processes for individual components with one another. As the software can no longer be regarded in isolation, its development process as an embedded system is different from pure software development. Integrating the software into a hardware system requires a precise understanding of the hardware.

Further, there is strong interaction between the software and the physical environment. This makes it necessary to coordinate the development processes with one another carefully in all phases. Activities for specifying, modeling, and testing dynamic interactions have greater importance. Errors that are detected late in the process, such as specification or coordination errors, can result in expensive hardware modifications [LR05].

Figure 6:
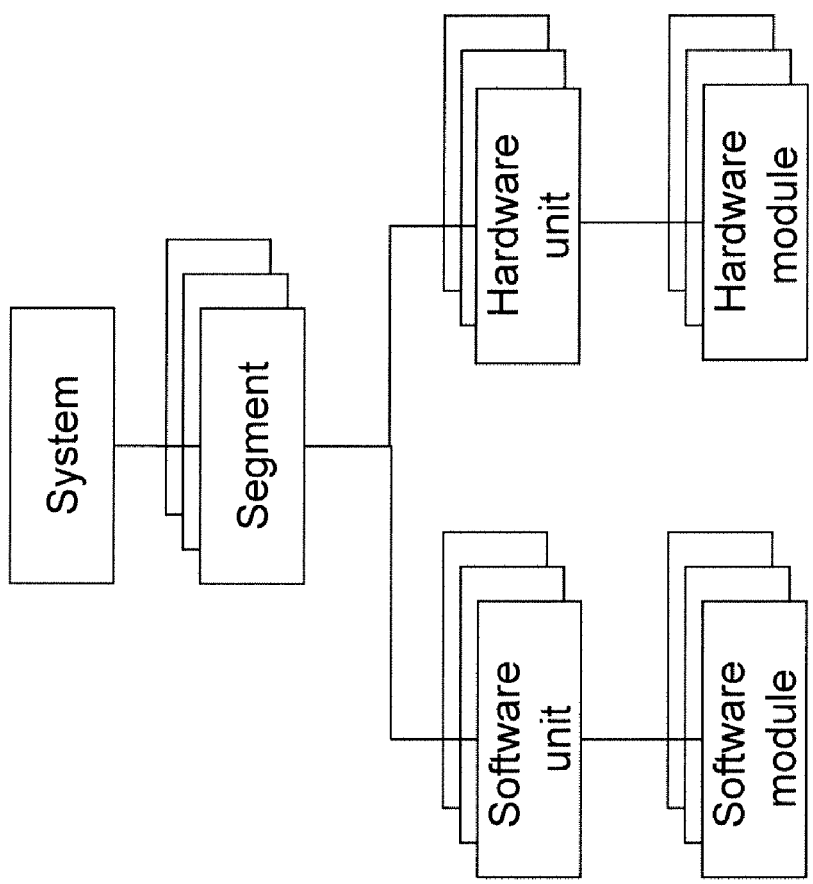
FIG. 6: Partitioning (based on [Bal98])

In the development process for embedded systems, the V-cycle provides for partitioning the entire development into several work packets. Such partitioning is shown in FIG. 6. After the requirement definition has been produced for the entire system, the entire development plan is subdivided into segments. These are further subdivided into hardware and software units. The software units consist finally of several software modules. The partitioning thus described is mainly done in the design phase, which is followed by development of the individual modules, which are brought together again during the integration test [Bal98].

The activities in the V-cycle are performed sequentially, in the order in which they appear in the V. It becomes clear from this that all testing activities do not take place until after implementation. However, errors frequently arise a long time before the implementation phase. In the design phase, requirements can be misinterpreted, so that the design of the system itself is erroneous, and from the point of view of the customer, cannot result in a correct system. Errors caused in early phases, but not discovered and remedied until later, cause further errors, which run all the way through the development process. This causes error potentiation. According to [Bal98], over 50% of all errors that occur in the entire development process do so during the requirement and design phase. The vast majority of them are not discovered until the acceptance tests and the operation phase.

Software projects became increasingly complex as time went on, necessitating techniques to support engineers which would supplement process models such as the V-cycle. The cause of between 15% and 40% of all software errors in automotive electronics was incomplete and ambiguous specifications. Between 40% and 60% of all problems arose during the implementation phase, with half of these errors resulting from successive modifications [ONS06]. Model-based software development evolved into a standard method of organizing the design of complex systems in a clear and structured manner, and of allowing tests to be performed in early phases. Moreover, the bulk of problems caused by ambiguous and incomplete specifications can be solved by using models. Model-Driven Engineering (MDE) [Ken02] and Model- Driven Architecture (MDA) [MDA02] describe approaches to model-based software development.

MDE proposes, among other things, development on different abstraction levels, and the organization and automation of test activities. The architecture and behavior of the system to be created are designed in the form of models, for example, with the aid of standard notations from the Unified Modeling Language (UML) [Obj05]. A model is an abstraction of an object from the real world [Bal98].

These models are machine-readable and can also be understood by human beings. Machine-readability allows tool-supported refinement of the models, so that the development process can be automated to run iteratively from abstract models to increasingly concrete models. This approach structures the development process and organizes it clearly, so that complexity is reduced. Formal techniques are used to validate the correctness of the models. The aim is to test whether a more concrete model matches the specification of the model made at a higher level of abstraction. Further, models can be used to test functionality before the system has been developed completely. Errors can be found in early phases of the development process by this means.

MDA includes methods of deriving an implementation from a specified model. If modifications are made to the model, regenerating the program code avoids inconsistencies between model and code. This approach avoids the errors that can occur during manual programming.

Nowadays, model-based development has established itself in numerous practical fields. In the automotive industry, as an example of the field of developing embedded systems, mathematical models and high-level forms of description are used during the design phase, resulting in a specification in the form of an executable model. Models for describing control algorithms are typically designed in the form of graphical block diagrams. Such specifications, designed as models, can be simulated in an appropriate modeling and simulation environment like MATLAB®/Simulink®, so that the behavior of the software can be studied and evaluated as early as the design phase. This enables tests to be performed from the design phase on, so that errors can be found and eliminated at this early stage. Models can be used on all levels of software design [ONS06].

This section presented the process of software development, along with the waterfall and V-cycle process models that are used in it. This was followed by a description of model-based software development, which complements the use of process models. Regardless of which process model is used, there is always a development phase in which the requirements are defined, and a test phase. Methods of requirement descriptions and testing techniques are described in greater detail below.

Process models such as the waterfall and V-cycle models presented above begin with the requirement definition phase. To define requirements at the beginning of the development process, communication between customer and contractor is needed. The customer describes ideas and wishes regarding the product to be developed. These lead to the requirements. The task of the contractor comprises analyzing customer requirements in order to approach as closely as possible the objective of manufacturing the desired product to the customer's complete satisfaction. Even though in many industries, such as the automotive industry, the customer for the product is not involved in defining requirements, the customer-contractor scenario is present in most production processes. If parts that are required for production are obtained from a supplier, the supplier is the contractor and the manufacturer itself becomes the customer. The manufacturer must inform the supplier of requirements.

The concept of "requirement" is defined by the Institute of Electrical and Electronics Engineers (IEEE) in [IEE90] as:

1. A condition or capability needed by a user to solve a problem or achieve an objective.
2. A condition or capability that must be met or possessed by a system or system component to satisfy a contract, standard, specification, or other formally imposed documents.
3. A documented representation of a condition or quality as in (1) or (2).

A simplified definition of a requirement that can easily be understood in practice is provided by the SOPHIST GROUP in [Rup04]:

"A requirement is a statement of a property or action of a product, a process, or a person involved in the process."

The difficulty is to understand the customer's descriptions in the way that they are meant. The greater the difference between the technical vocabulary and knowledge of the communicating persons is, the more error-prone this process will be. However, different mentalities, as well as social background and experience, also affect communication. These problems are rooted in the representation process that takes place when requirements are formulated in natural language.

These problems do not occur to such a degree in a manufacturer-supplier relationship. As both partners are usually experts in that case, they can communicate on the same level. However, there are frequently people from different fields working together in the same company. These interdisciplinary structures have the advantage that there is special knowledge from each field, so very different aspects can be taken into account in the development process. In the development of embedded systems, for example, engineers and information technologists often work together, as the knowledge of both is required. However, even communication between experts from different fields can cause the problems described above, so that the difficulty of requirement description is not removed when exclusively experts are involved.

The problems of requirement description, as described in [Rup04], are discussed below. Every person has a personal perception of reality. Aspects that are personally important are in the foreground, so that perception contains only a part of reality. The term perception transformation describes this unconscious process. Further information loss occurs during linguistic formulation. The representation of knowledge in a natural language varies from person to person, even if two people could have identical personal perception. This mapping process is called representation transformation.

The entire process as described involves a falsification of reality and therefore an erroneous representation of the desired system functionality, which finds expression in incomplete or ambiguous requirements [Rup04].

The challenge is to describe requirements completely and unambiguously. Information that was lost in the linguistic formulation must be retrieved. This requires reversal of the transformations.

The personal perception of a person reduces reality to particular, different aspects. The information content can be increased by questioning several persons, as each perceives other details, and the statements of different persons complement one another. There is no further means of retrieving aspects lost in perception transformation, as people's sensibilities cannot be influenced without problems. Representation transformations can be resolved very well by uncovering missing information. The precondition for this, however, is that the analyst must have a precise knowledge of the types of transformations that cause problems. If missing information can be detected by means of linguistic effects, questions targeted at obtaining this information will eliminate the incompleteness of the requirement [Rup04].

Making iterative improvements to low-quality requirements by asking the customer specific questions is a time-consuming method. A more efficient procedure can be achieved by creating high-quality requirements directly. Typical formulation mistakes can be avoided by studying the structure of a sentence and building an optimum requirement step by step according to syntactic rules [Rup04].

A requirement for an embedded system defines the functionalities that the system must possess. As described above, embedded systems interact with their physical environment via interfaces in the form of sensors and actuators. The terms input and output are used for these interfaces below. Each input of an embedded system observes a specific element or a property of the physical environment. Examples of elements and properties of a vehicle are the buttons on the remote control, the door buttons, and the current speed. Each physical element can have specific states. A button on the remote control can have the pushed or unpushed state, a door button is up or down, and the speed always has a value. An appropriate value for each state of a physical element is issued to an input of the embedded system, and the value is processed by that system. Control of physical elements is performed by applying a value to an output of the embedded system, thereby putting the physical element into a specific state. Typically, a user requires the embedded system to react to inputs that he or she makes.

FIGS. 7 and 8 show requirements to be found in this form in practice:

To express such functionality in a requirement, the following information must be described in it: For what input values at what inputs are what output values expected at what outputs? The consequence of this is that first an assignment of values to outputs is necessary as a precondition, and that the assignment of values to specific outputs must be described as the expected reaction.

According to [Hu00], requirements for software are mostly expressed by statements of the form "If a precondition arises, then an expected reaction must occur". This can also be stated for requirements for embedded systems. The requirements from practice shown in this section can also both be expressed in this form. If a system receives a value at an input as a precondition, a specific value must be present at an output as a reaction to that precondition. Thus, the system must process the precondition in such a way that the expected reaction occurs as the result.

Figure 9:
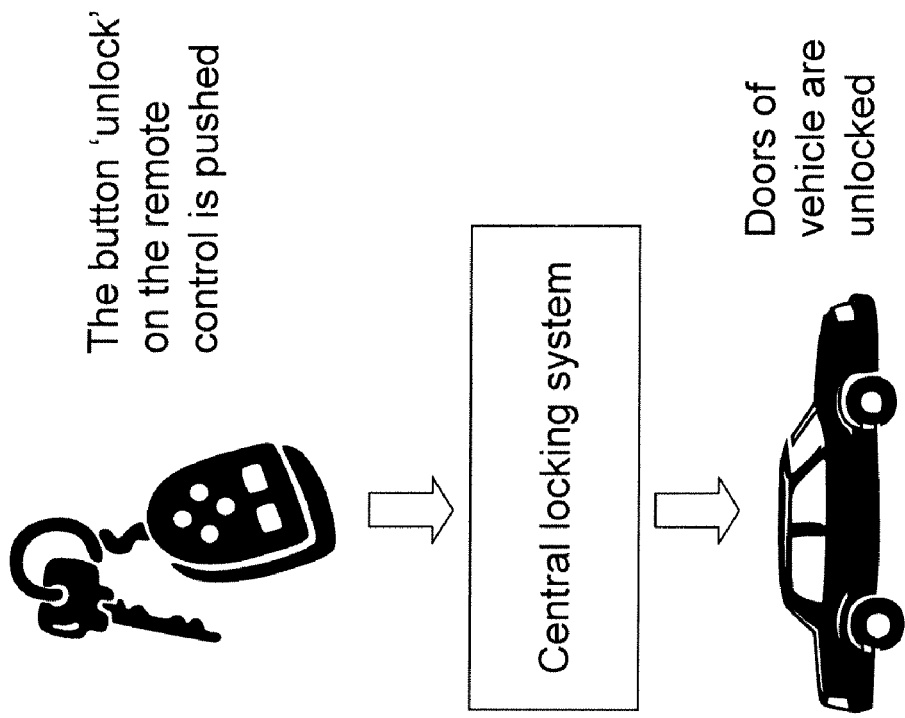
FIG. 9: Functionality of a system: An expected reaction results from a precondition
Figure 9:
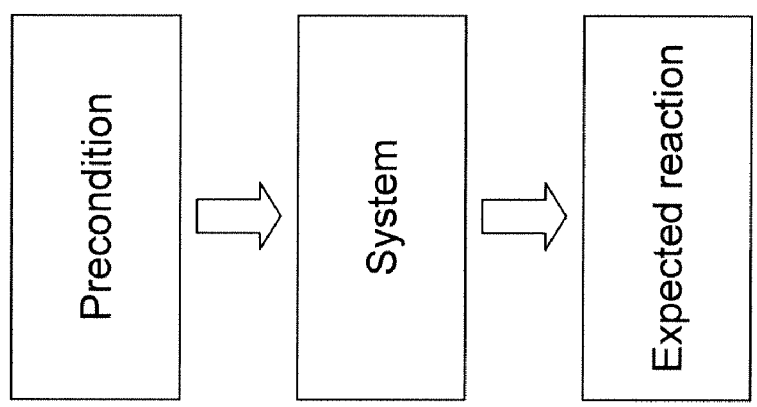

FIG. 9 shows this general process and a central locking function as an example. If the "unlock" button on the remote control is pushed, this is an input with a value assignment. As a result, the door ECUs must unlock the doors of the vehicle, which is the function of the system. The unlocked doors of the vehicle form outputs, where 'unlocked' is the value of the outputs.

Because embedded systems are becoming increasingly widespread and the complexity of their software is growing due to the networking of individual software components, quality assurance is growing in importance. Quality requirements must be defined and compliance with them ensured to guarantee satisfactory software quality. A quality property of software is the correctness of that software with regard to previously specified properties. The requirements definition at the beginning of the software development process is followed by the creation of a specification that formally defines the properties of the software to be produced. Testing the software for these formally specified properties is called verification. In the event that errors arise in creating the specification from the requirements, verification guarantees only correct behavior of the software with regard to the specification. The system's suitability for fulfilling the task desired by the customer is however not tested by this method. Testing the effectivity of the software with regard to the requirements is termed validation [Tha00, Pel].

Figure 10:
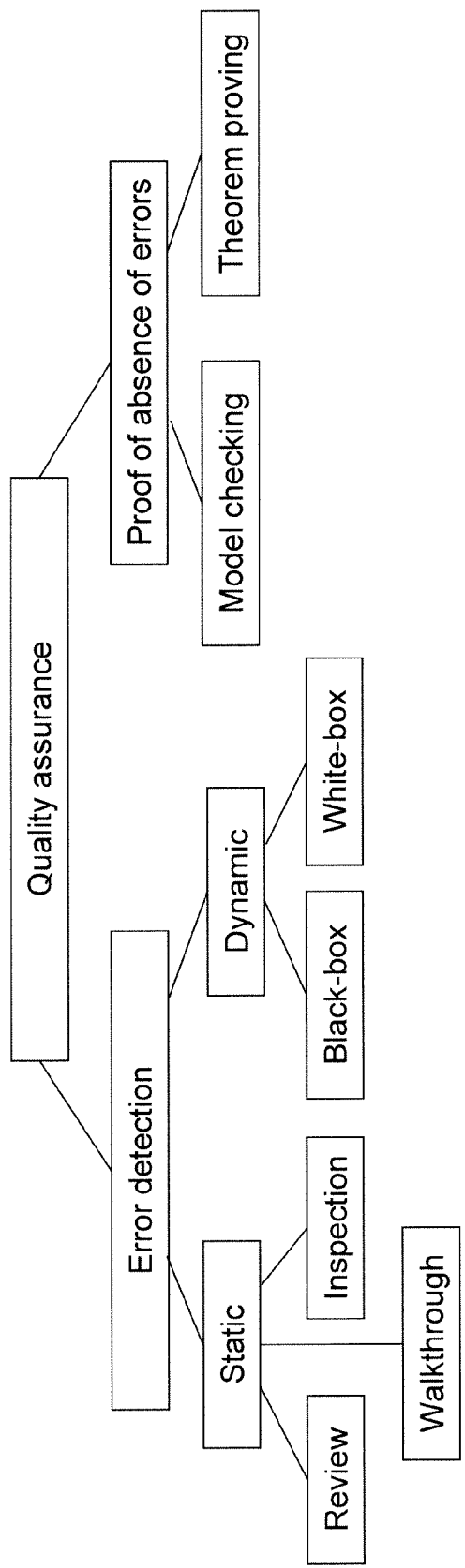
FIG. 10: Methods of Quality Assurance

Methods of quality assurance are categorized in various ways in the literature, for example in [Bal98] and [Lig02]. FIG. 10 gives an overview of the methods presented below. The widely used basic subdivision into methods for detecting errors and methods for proving the absence of errors is suitable for categorizing the term testing. Testing is an activity for finding errors. Showing that they are absent is not a part of testing [Dij70].

Error finding methods are classified as static and dynamic methods. The criterion on which this classification is based is the execution of the software to detect errors. Static methods study the software without it being executed. Inspection, review, and walkthrough [Bal98] can be assigned to this category, and are based on a manual check of the software by a team. Dynamic methods use program execution with selected input data.

A further categorization is made on the basis of the software observation depth [Pel]. Black-box tests observe only the interfaces of the test objects. After the software has run with the selected inputs, the outputs are evaluated. To check that the actual outputs are correct, they are compared with the expected outputs previously defined. A white-box test uses all the components of the test objects, whose entire structure is open in this case. Thus, the control flow of the test object can be tracked and its logic understood [Tha00]. This method allows errors to be found that do not affect the interfaces.

Further, methods of detecting errors can be subdivided into function and structure tests. Functional properties of a test object are the functionalities that were defined in the requirements and whose correctness is tested on the basis of the specification. Frequently, these are black-box tests, as it is not the inside of the test object that is relevant, but its visible behavior. This type of test method frequently does not reach the entire program structure of the test object completely, as some program parts are executed only in the case of particular input data. The goal of a structure test is complete coverage of the test object structure. All the test object's program parts must be run through, as unreachable parts are superfluous. The program code must be visible for this test, so this method is always a white-box test [Lig02]. The challenge consists in selecting input data in such a way that every part of the test object is run through. Superfluous parts are called dead code and could theoretically be deleted. However, as the test runs are always only samples, this test method is not yet proof that the code is unreachable. A complete check, combining all possible input data, is too costly in practice.

The methods of proving the absence of errors include theorem proving [Lov78, CLL97] and model checking [CGP00]. The aim of model checking is to ascertain whether a model fulfills a given formal requirement specification. An automatic test of the required properties is performed across all possible states of the system by means of an algorithm.

To validate an embedded system, the test covers whether the system possesses all the functionalities that were defined by the customer. The focus is on the entire system in its environment. The test must study how the system behaves in the event of specific user interactions. The focus of interest is only the system's suitability for fulfilling its task, and not the process inside the system. This invention therefore concentrates on black-box testing. Currently, tests are still largely created manually. A method for the manual creation of test cases to perform a black-box test is the classification tree method described below.

For one test object, there can be a very large number of input values and combinations that form an input space. The test object cannot be tested with all its possible inputs with reasonable effort. The input space is therefore divided up according to specific aspects, and the partitions are in turn subdivided into equivalence classes. The classes must be selected in such a way that the test object behaves either correctly or erroneously for all the input values in one class [GG93]. The equivalence classes can be further divided into subclassifications according to additional criteria. The result is a classification tree. Test sequences can be created on the basis of the partitioning of the input space [Lam06]. This is done by combining specific classes, with one value from each class being selected for the test.

Following the categorization of the term "testing", the components of a test that are necessary for performing a black-box test are now presented. The object to be tested can be, for example, a model, program code, or a prototype of the real system, and is called the test object [Bal98]. To test the test object's behavior, input data is needed to execute it with. Input data is also called stimulus data.

An embedded system does not behave like a simple application program that receives a value at every input, is executed with the input values, returns an output after execution, and then terminates. Frequently, different input values arrive at the inputs in a time sequence. Executing the test object with these inputs provides outputs that represent the behavior of the test object. However, these outputs alone do not indicate whether an error is present. They must be compared with values that match the tester's expectations. The outputs to be expected are called reference data, and have to be defined before text execution. The set of input data of a test, together with the associated reference data, form a test case.

Figure 11:
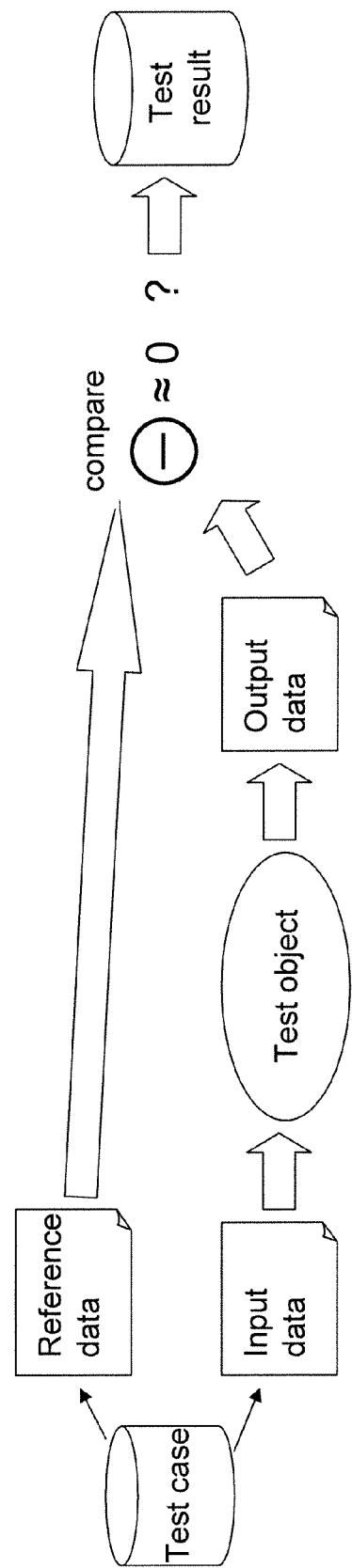
FIG. 11: Components of a Test

To create a test that provides information on the correctness of a functionality of an embedded system, a test objective has to be formulated. This must define what properties of the test object are to be tested. The basis is provided by documents that contain the required properties of the object under test, such as specifications or customer requirements. The input data is selected according to the defined objective and applied to the test object in a temporal sequence. The reference data is also determined according to the test objective. FIG. 11 shows the testing sequence with the individual components.

Because an embedded system is developed for use within an entire system and interacts with that system via interfaces, the embedded system must be tested in the environment in which it will be used. Testing an embedded system in the real environment is frequently very expensive and can be safety-critical. For example, to test the functionality of an ECU in a vehicle, several test drives would have to be performed. Many ECUs execute functions without which the safety of vehicle use is not guaranteed, so that test drives with a previously untested ECU pose a hazard.

Moreover, an embedded system can be developed before the entire system that it will later be integrated into has been produced completely. Frequently, development work on the components of a system runs in parallel to keep the development time short. In this case, an embedded system cannot be tested in its real environment.

However, it was demonstrated above that tests on embedded systems are necessary even in early phases of development. The later any errors that occur are detected in early phases, the more expensive are the changes needed for remedying the errors, as they cover several development stages. Methods of mimicking the behavior of the real environment of an embedded system are therefore required. As described above, the model-based development method used nowadays provides a way of testing systems at early stages of development by means of simulation. Utilizing the simulation options available in the various development stages allows the results obtained to be checked in parallel to development work. In this way, the model, the program code, and the prototype of the embedded system can be tested as test objects in a completely simulated environment. For example, the environment can be represented in the form of software models by means of MATLAB®/Simulink®.

Figure 12:
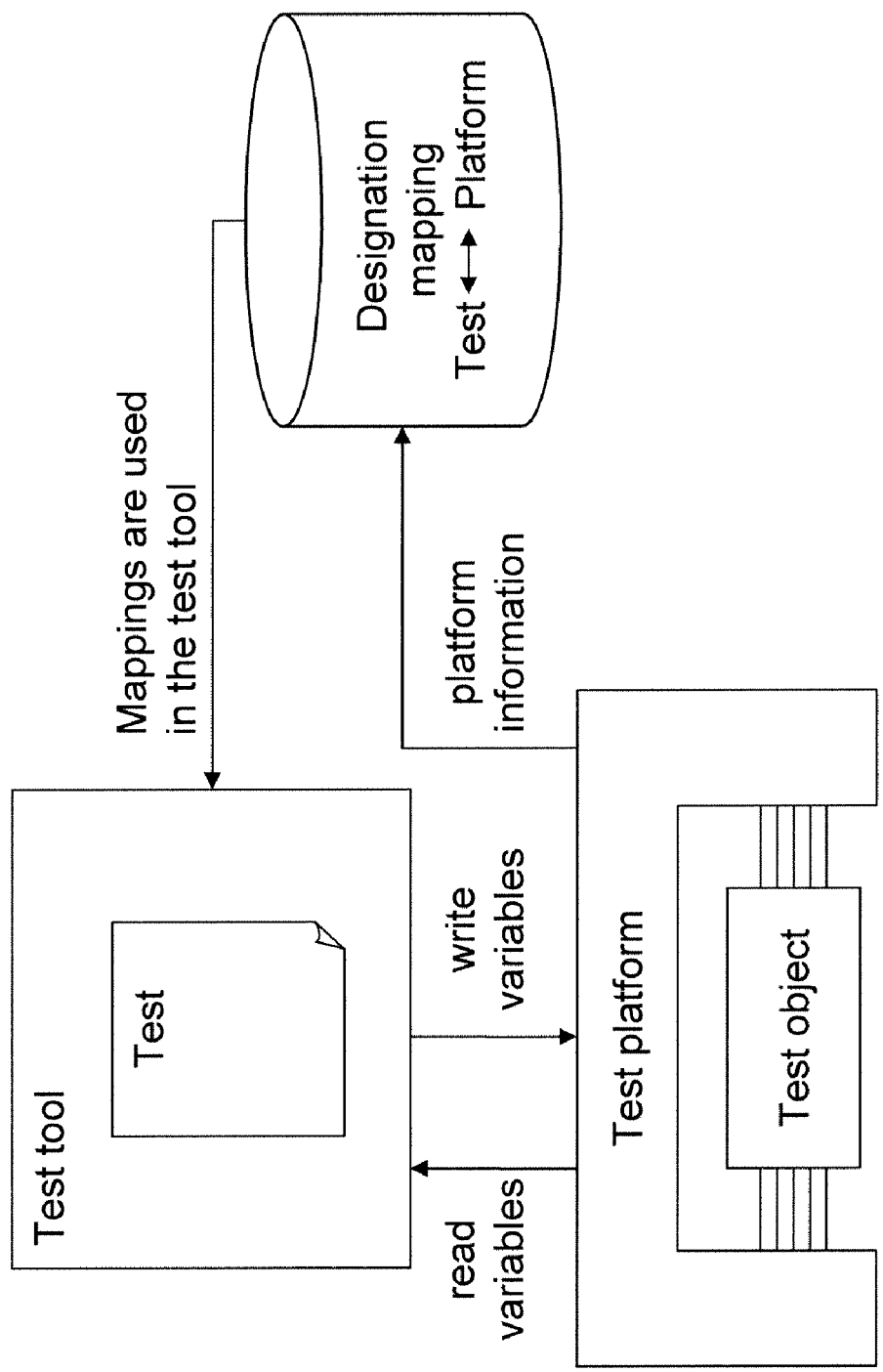
FIG. 12: Structure of components needed for testing embedded systems

FIG. 12 shows the test object connected to a test platform via interfaces. The simulated environment is run on the test platform. The test is executed in a test tool that accesses the test platform. Since a test is initially created independently of the test platform used, the designations used in the test are mapped to platform-specific variables and values. The variables form the interfaces of the test object.

Figure 13:
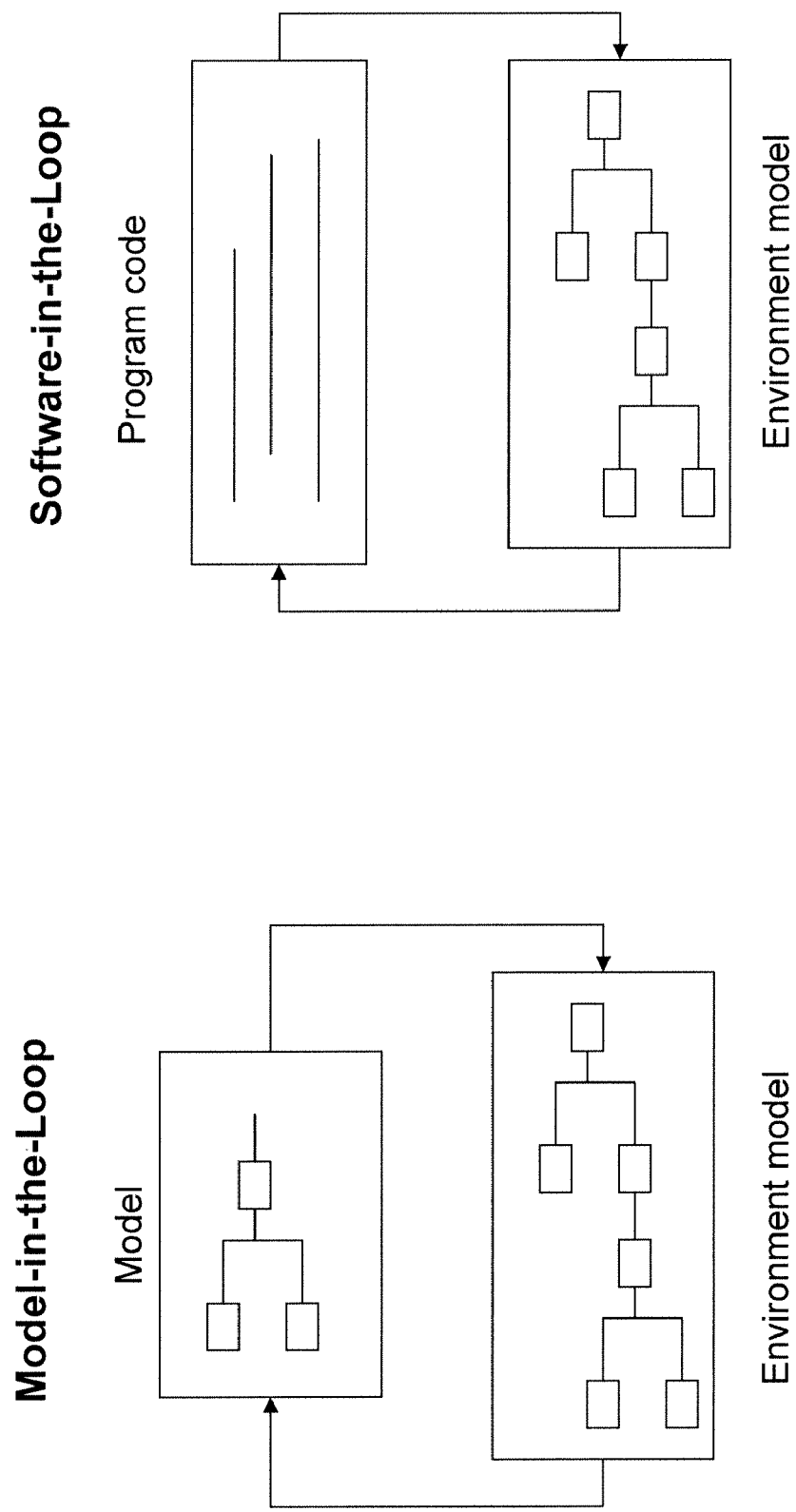
FIG. 13: Model- and software-in-the-loop

In model-based development, a model of the embedded system is developed in the design phase, with the support of software tools. This model can be simulated. As the model of the embedded system can be tested only in the context of the entire system, a test environment is necessary. The environment of the embedded system itself is also represented as a model for this purpose, and is called the environment model below. The model of the embedded system can initially be tested independently of its environment, by executing it with inputs and analyzing the resulting outputs. In the next step, the interaction between the model of the embedded system and the environment model is tested. The environment model supplies inputs for the model, receives the model's outputs, and reacts to them. This in turn produces new inputs. The test platform must provide the ability to change the models' parameters, and to read out and record the test object's outputs. These tasks are performed by a test. Testing the model of an embedded system by means of simulation is called model-in-the-loop (MIL). FIG. 13 shows this scenario [BN03].

Following successful testing by model-in-the-loop, the program code of the embedded system is automatically generated from the model or developed manually. This program code can be tested in the same way as the model. The test platform and the environment model can be reused. Only the test object is now the program code instead of the model. This test process is called software-in-the-loop (SIL) (BN03). The program code can initially be compiled for the simulation computer and executed on that. Next, an emulator of the target processor can be used for testing, and program code is compiled for it in this step. The objective of this procedure is to test the behavior of the code on the target processor.

Figure 14:
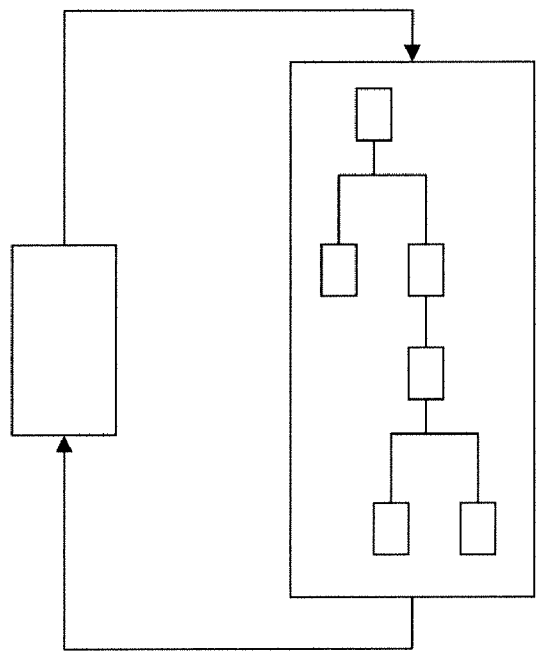
FIG. 14: Hardware-in-the-loop

As development of the embedded system proceeds, a prototype of the embedded system is produced, and the tested program code is loaded to it. To test that the embedded software runs correctly on the real hardware, the prototype is tested by means of hardware-in-the-loop simulation (HIL simulation). For example, the prototype can be an ECU for a vehicle with completed software. To test the prototype together with the environment model, the test platform must provide real interfaces that the prototype of the ECU can be connected to, as it would be in the real entire system. A real-time simulation can be performed at this point. The environment model runs on a real-time-capable simulator for this, instead of on a PC. FIG. 14 shows hardware-in-the-loop situation.

Hardware-in-the-loop technology has become established practice for testing ECU prototypes during actual development. Up to 90% of all faults occurring in test drives can be reconstructed by means of HIL simulation [ONS06].

In the field of black-box testing, the term testing frequently only means execution a test object with specific input data. However, testing covers more than test execution alone. First, a test has to be developed. This includes defining the objective and preparing the test cases. Exactly the right input and reference data must be selected in order to achieve the test objective by executing the test with the specific test case. To create an executable test, frequently the individual test steps are first defined and then described in a test specification. The test specification forms the basis for implementing the executable test.

Figure 15:
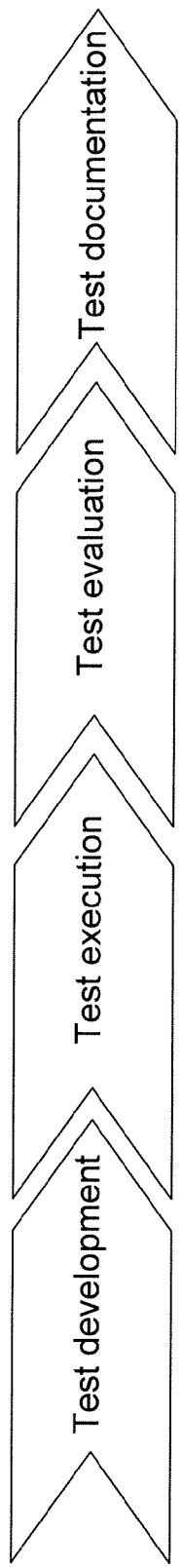
FIG. 15: Test process

Following test execution, the result is evaluated. At this point, the output and reference data are compared, providing information on any errors. The results and their associated test cases must be recorded in documentation. This procedure is a very important task for reaping long-term benefit from a test. FIG. 15 shows the test process flow. The literature contains slight differences in the subdivision into individual process phases. The BS 7925-2 standard for testing software components [iST01] subdivides a test into the following steps: test planning, test specification, test execution, test evaluation, and test recording.

To make the test process easier, faster, and safer, automation techniques are increasingly being developed. Test execution is already automated nowadays. In many companies, tests are run automatically over the weekend or at night, to make testing efficient. Some research endeavors are looking into automating evaluation [CSW06] and documentation. Test cases can also already be generated [CTF01, Hu00] as part of test generation. Further, there are many methods of testing the functionalities of a system against previously defined specifications, such as model checking [CGP00].

The preceding sections defined embedded systems and described their development process. The requirement definition and the test phase were studied in detail. It was explained that a requirement specifies a precondition and an expected reaction that the system has to create from the precondition. Similar elements can be found in a test. As described above, the system under test is given input data. Specific output data, called reference data, is expected in reaction to this data.

Because of the increasing cost of development, and therefore also of testing, the automation of test generation is desirable. There are already numerous methods of testing the functionalities of a system against previously defined behavior specifications. However, even if all the specified functions in the software behave correctly, that does not mean that the software possesses the required functionality. To achieve this correct functionality, the requirements previously described for the software must be fulfilled. Thus, the software must be tested for correct behavior with regard to the requirements. Requirements are initially, and usually exclusively, formulated in text form, so that the text forms the basis for validation. The aim of this invention is to answer the challenge of generating tests automatically from requirements expressed in text form.

The existing approaches to related issues are presented and assessed below.

Existing concepts are presented that have various aspects in common with the automatic generation of tests from textual requirements.

The SOPHIST GROUP is concerned with natural-language requirements analysis and object-oriented methods. It makes its knowledge available to companies so that they can run their system and/or software development processes as error-free and efficiently as possible. Within this framework, the SOPHIST GROUP supports its customers with advice, training, and tool development. Two concepts from the SOPHIST GROUP are described below.

As already described, requirements must be checked for completeness and if necessary extended by information from the customers, who are questioned specifically on this. The SOPHIST GROUP defines a set of rules for the iterative creation of requirements. Information gaps can be avoided by this means. Searching for implied assumptions is one of these rules [Rup04]. However, as iterative improvement is not an efficient method of requirement creation, the SOPHIST GROUP developed a concept in [Rup04] by means of which a high-quality requirements definition can be created in 6 steps. This concept is based on a syntactic requirement template that is defined as follows by [Rup04]:

"A requirement template is an assembly plan that defines the syntactic structure of a single requirement."

The following example shows how the template is used.

EXAMPLE

"A central locking system must have the functionality that all the doors of the vehicle can be unlocked by the vehicle user. Different people could describe this fact in different ways: "The central locking system must be able to unlock all the doors of the vehicle", or "The task of the vehicle is to unlock all the doors". These statements might give rise to the following questions: Does the central locking system do the unlocking itself? When does it perform the task? This shows that these formulations are incomplete."

The desired functionality must be formulated according to a requirement template. The starting point is always a system to which the requirement must apply. In this case, the central locking system is the system.

Step 1: The central statement in a requirement is contained in the functionality that defines system behavior. This must be identified first and expressed as a verb. The decisive verb in the example is 'unlock', and this is called the process word below.

Step 2: There are three variants to select from at this point. Either the system performs the process defined at the beginning autonomously or it makes the functionality available to the user. The last possibility is that the system performs the process according to a third entity, so that it has only a passive role itself, and waits for an external result. These three ways are summarized by the following terms:

Independent system activity

User interaction

Interface requirement

Figure 16:
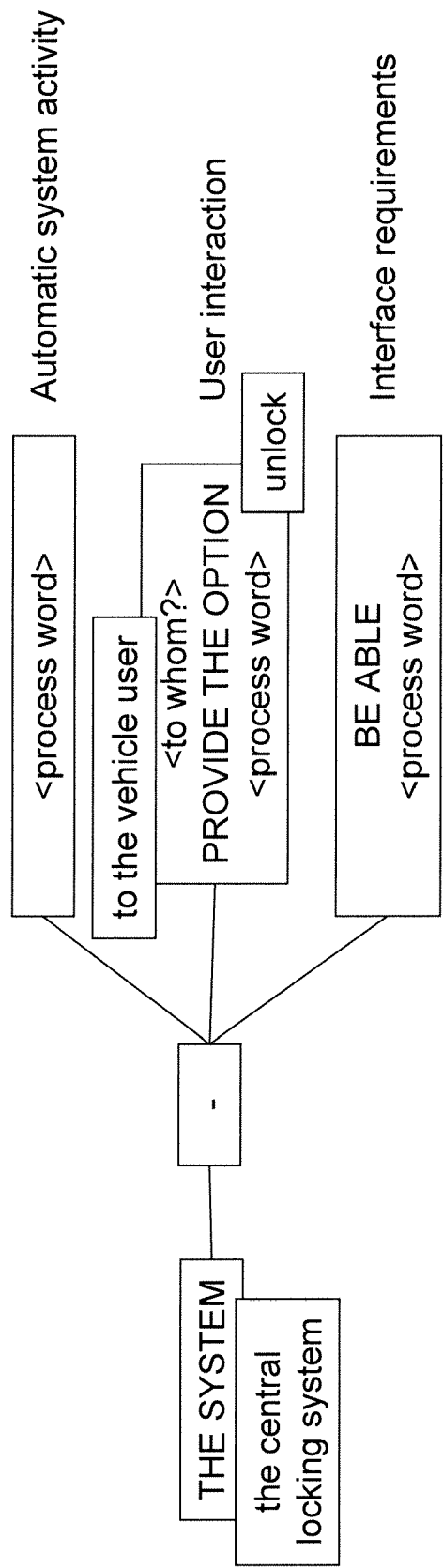
FIG. 16: Step 2: The core of the requirement (according to [Rup04])

The core of the requirement at this point is the central locking system in the role of the system, the process word 'unlock', and the vehicle user, who triggers the unlocking. This example is for user interaction, as FIG. 16 shows.

Step 3: To express the degree of legal obligation, one of the keywords "must", "should" and "will" is used. The term that is selected indicates whether the requirement is legally binding, urgently recommended, or future. In this example, the term "must" should be chosen to express that it is legally binding.

Figure 17:
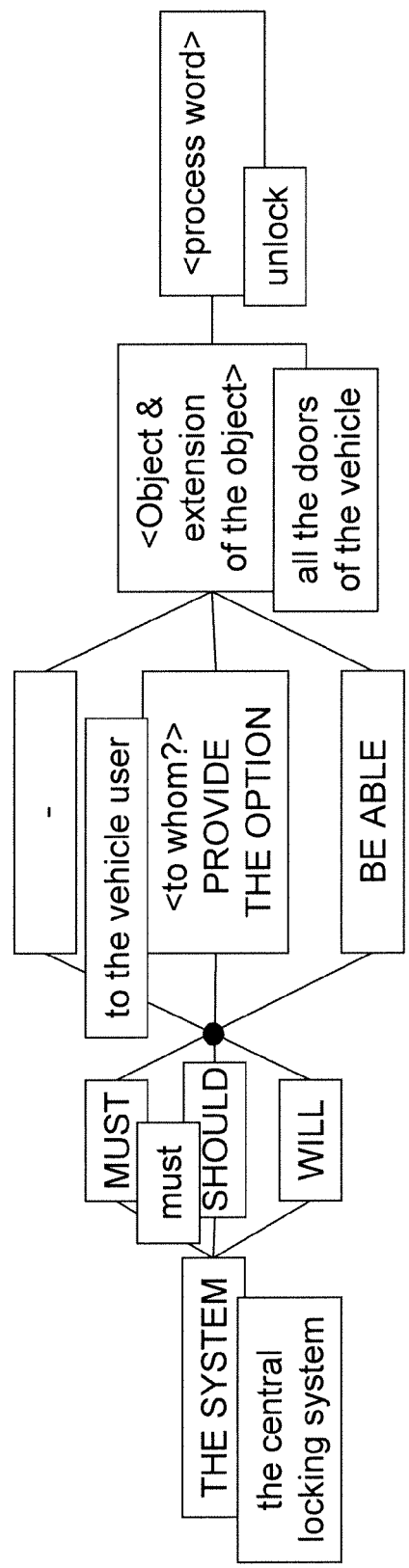
FIG. 17: Step 4 (according to [Rup04])

Step 4: Missing objects and additions must be integrated here. The question might be asked: what is the central locking system to unlock? The answer is all the doors of the vehicle, and in this example, this is the object of the requirement. FIG. 17 shows this in graphical form. (Note: The template supports the German language. So the figures and description express the German syntax. This leads to incorrect English sentences in the given example.) The structure of the pattern has changed slightly compared with FIG. 16. The object and the object extension must be inserted before the process word, so the process word was taken out of the center blocks and placed at the end of the template as a separate element. This results in an empty element. That means that an object can be located after the system and the term for legal obligation, and the process word follows the object.

Figure 18:
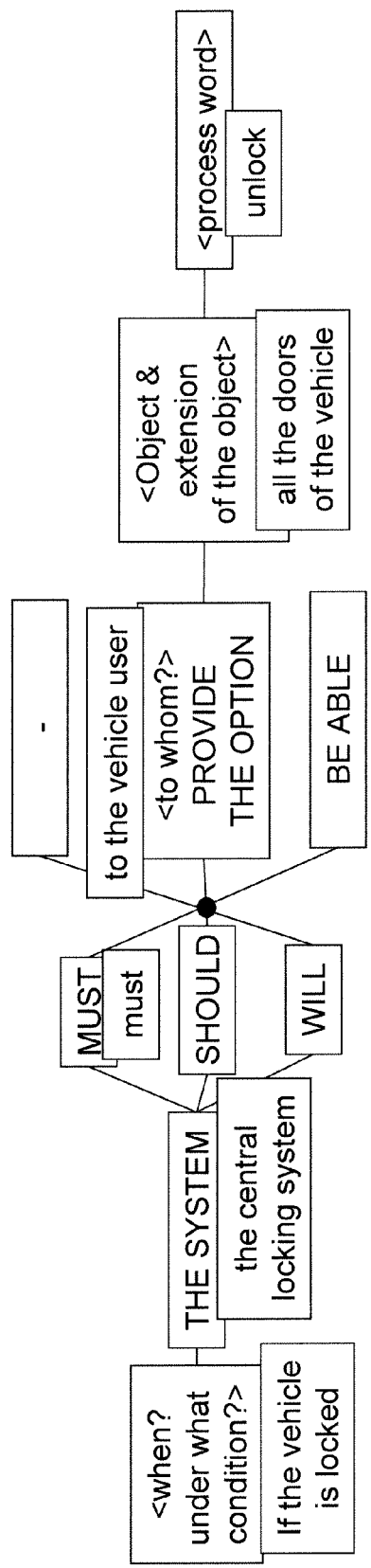
FIG. 18: Step 5 (according to [Rup04])

Step 5: The functionalities of a system are frequently subject to temporal or logical conditions. In German, adding a condition results in the word order having to be rearranged. The example in FIG. 18 shows a complete requirements pattern with the added condition "If the vehicle is locked". This results in a changed word order.

Step 6: Finally, the created requirement is checked. The rules of the analytical approach first described, which still contain incomplete information, are used for this.

The steps performed to fill out the template provide a sentence structure without semantics. Each concept used requires an assigned meaning to produce the semantics of the requirement [Rup04]. The meaning of a concept must be defined via a concept explanation in the form of a set of natural language sentences. The objective of this kind of semantic definition is that different authors must select the same concepts when formulating the same facts, and that these concepts must be understood identically by everyone involved.

These semantics can be understood by people, but cannot be processed automatically, as the concept explanations are not formal and therefore not machine-readable. As a consequence, it is not possible to generate a test automatically from a requirement that was defined in this way.

As part of the development of the RE-KIT method, the Fraunhofer Institute Experimentelles Software Engineering (IESE) presents a different approach in [KBP01] The main focus of this is on ambiguously formulated requirements. In the software development process, textual requirements are mapped to a formal model, so that developers gain an unambiguous understanding of the product to be produced, and the functions to be developed can be derived from this model.

While this can uncover inconsistencies and incomplete formulations, any possibilities for multiple interpretations in informal requirements can lead to misunderstandings in the formalization process. The technique presented in [KBP01] concentrates on checking the informal requirements before these results in erroneous formal specifications. Check lists and scenario-based reading are used to eliminate any ambiguities. These procedures are already known and accepted in industry, so they are particularly suitable in practice.

The aim of this approach is to detect ambiguities and incomplete formulations in informal requirements before formal requirements are created from them. No formalization of natural language expressions is performed, which could be used to generate tests.

One concept is provided by the PROPEL tool presented in [SAC03]. Properties should be specified formally from natural language requirements, since in contrast to textual terms, formalized expressions leave less room for interpretation, and misunderstandings and inconsistencies are to a large extent avoided. This is done by giving developers the opportunity to produce precise formulations, at the same time giving them a simple, understandable representation of the requirement.

The PROPEL tool provides commonly occurring property patterns as templates that must be filled by the user. Examples of property patterns are the number of events that occur in a requirement and the definition of whether an event must occur or must not occur. There are three notations available, by means of which the requirements and the questions relating to them are represented: the decision tree template, natural language, and a finite state machine. The decision tree template allows selection of a property pattern that defines the basic structure of the requirement. The second notation available to the user is a subset of natural language. In parallel to this, the requirement is presented in the form of a finite state machine. These last two representations give the user identical functions for specifying the requirement. They can be transformed into one another. By means of the finite machine, the requirement is formulated formally and precisely, while the natural language view allows the user easy understanding.

The concept of the PROPEL tool addresses developers who have a knowledge of finite state machines as the target group for requirements formulation. The method of requirements formulation in the form of natural language is not intended to stand on its own in this tool. Representing the requirement in natural language gives the user a view that he or she can understand, but a precise semantic interpretation can be obtained only from the finite machine. Exclusive use of natural language can result in misunderstandings. Using an unambiguous, formal notation, such as a notation in the form of finite machines as in this approach, provides a way of creating requirements that can be analyzed by computer. However, only few requirements creators have a mastery of formal notations, so the formal description of requirements is not the desired solution.

The PROPEL tool supports the formulation of formal, precise requirements, but does not provide a concept for deriving tests from these requirements. The PROPEL tool does not therefore suffice to generate tests automatically from requirements formulated in natural language.

In addition, there is no way of specifying temporal conditions in the requirements. Since the correctness of the behavior of an embedded system is not only dependent on logical correctness, but the time in which a function is executed also plays a role, it must be possible to formulate temporal aspects in requirements for embedded systems. However, finite machines such as those used by the PROPEL tool do not support the treatment of temporal conditions. A form of finite machines that is extended by temporal conditions would have to be used for this.

[FMR00] shows a method of creating formal, precise expressions from natural language. The notation used is oriented to structured English, so it is understandable to the user. To construct a sentence, lists with given states are available for selection, as well as a set of fragments of natural language. The basic structure of a specified sentence, whose elements and syntax are defined in a grammar, is very simple. By translating such a sentence into a formal expression of the temporal logic CCTL, the sentence is assigned a semantic.

Defining syntax via a grammar has the disadvantage that extensions with new language fragments result in a change to several grammar parts. The mapping to the temporal logic must then be updated for all the modified parts. This makes performing extensions complex.

The approach described in [FMR00] concentrates on the formalization of natural language expressions so that they can be used to formally describe properties that can be used for model checking. The approach does not provide a concept for generating tests automatically on the basis of the formalized expressions.

The Requirements Interchange Format (RIF) [WHH05], a tool-independent exchange format for requirements, must also be mentioned. An increasing number of companies handle requirements with the support of widely varying programs developed for this purpose, as part of requirements management. ("Requirements management comprises measures that support requirements analysis and the further use of requirements" [Rup04].)

Requirement management is also used in the automotive industry. However, the strong degree of cooperation and division of tasks between manufacturers and suppliers has shown that requirements management must not stop at company boundaries. The exchange of requirements between manufacturers and suppliers requires a common format for requirements. Automobile manufacturers and suppliers have therefore jointly defined the Requirements Interchange Format to close the gap in requirements management between different companies. The specification of the RIF provides for each company to continue using the previously used, and familiar, requirements management program, and to transfer the requirements created in it to the shared RIF requirements exchange format. To allow this, a requirements management program must be extended by an import and an export functionality.

Close study of the RIF has shown that exclusive use of this format for managing requirements is not useful, since the contents of the requirements are represented in simple data types (int, string, . . . ), enumerations, and complex data types, and the complex data types are application-specific. As a consequence, every application requires a format in which the complex data types are defined, so that the application can also process this data. The RIF does not formalize the syntax of language, but transfers entire documents into another format. There is no way of assigning a semantic to each language element, so that the RIF cannot be used for formalizing natural-language requirements from which tests are to be generated. The RIF was developed with the objective of making it possible to interchange requirements that are available in different formats. The format is not designed for formalizing natural-language requirements for the automatic generation of tests.

Another important task, in addition to the challenge of describing requirements unambiguously, is to create all the relevant test cases in an automatic test generation process. Different concepts for generating test cases automatically can be found in [CTF01] and [Hu00].

For example [Hu00] describes a method of representing requirements for software by means of multiple-valued logic. Multiple-valued logic allows a variable to assume not only the values true or false, but an arbitrary number of values. For example, assuming X1 is the interior lighting of a vehicle that can have three states 0, 1, and 2: The interior lighting can be switched off (0), dimmed (1), or lit at full power (2). If a requirement is intended to describe that the interior lighting must be dimmed, this can be expressed by the following formula: Y=X1(1). From such multiple-valued expressions, which result from the requirements, test cases can be created by using existing algorithms for test generation for multiple-valued digital circuits.

[CTF01] presents the "statistical functional testing" method, in which probability theory is used for the automatic generation of test cases. UML state charts are used to represent the dynamic behavior of the system under test. Test cases are derived from these state charts. Coverage of every state transition is viewed as the test criterion. This concept does not use a natural language as a basis.

These two approaches deal with the generation of test cases, though this assumes that a test already exists. Test cases consist of selected input data and the output data that is expected after execution of a system with the selected input data. These are therefore merely parameters with which a test is executed. The test implementation that performs individual test steps includes, for example, the assigning of values to variables in the test object, and the reading out of values. An executable test must be available so that a test can be executed with different test cases. The approaches presented here do not provide a concept for automatic test generation.

The Fraunhofer Institut Rechnerarchitektur und Softwaretechnik (FIRST) describes a procedure for deriving test cases from use cases, in [Fri04, FS05, FP05]. The approach that this presents is based on an interactive method for treating use case descriptions so that automatic test cases can be generated from them. Textual requirements can be loaded to a user interface, linked, extended by control flow elements, and connected to information from the design [FP05]. The requirements are formalized interactively by this.

In this approach, the textual requirements descriptions are not sufficient for generating automatic tests from them. Design information must be added or created manually. Further, there is no concept for treating temporal conditions, which is necessary for formulating requirements for embedded systems. Like the previous approaches, this approach does not provide a way of generating executable tests. It is solely for creating test cases.

This section presented approaches concerned with the formalization of natural-language expressions and the description of textual requirements that are to be processed automatically. It also investigated concepts for the automatic generation of test cases from information available in a variety of forms. None of these approaches provides for automatic test generation on the basis of natural-language requirements.

The existing approaches partly do not work with natural language as a basis for creating requirements in an intelligible form, or the requirements that are created are not machine-readable and therefore cannot be processed into tests automatically. Some approaches lack a concept for treating temporal conditions. To automate requirements-based test generation and thereby reduce the cost of the test process, one example embodiment of this invention describes a new concept that contains a formalization of natural-language requirements and presents a method of generating test steps from these requirements in order to create executable tests from them.

In the first step, requirements are always described in the form of informal text. To derive tests automatically from such a textual requirement, it needs to be interpreted unambiguously and by machine. This requires information on the meaning of every single term in the requirements document. However, creating a system that can understand all the terms and combinations of terms in natural language is not feasible in practice. There is no possible way to include all existing words, because the number of terms is far too great and because a natural language allows new words to be formed. Moreover, a natural language involves the danger of misunderstandings due to ambiguities, so that an unambiguous representation cannot be achieved. It is therefore necessary to define an unambiguous syntax and an unambiguous semantic that can be processed by a computer.

An example embodiments of this invention takes as its starting point a previously defined subset of expressions of a natural language, in which a semantic is assigned to each expression, thereby making automated processing possible. There is a vocabulary and a fixed sentence structure for formulating requirements. If at all possible, the requirements creator must be able to express all the desired requirements.

FIG. 1 provides an overview of the entire concept. This invention describes a metamodel that defines an unambiguous syntax for a requirement. With the aid of this metamodel, formal requirements that are presented to the user in natural-language form can be created. The user is given a vocabulary for requirements creation that contains basic text fragments such as "If . . . then", "and", "or", . . . Further text fragments representing instances of specific elements of the requirement metamodel can be defined by the user.

Before a test is generated from a formal requirement, the user is given a textual description of the test sequence. This step shows the user what is tested by the test generated from his/her requirement. This description of the test sequence is called a test specification. A further metamodel describes its syntax. By means of a model transformation, a formal requirement is converted into a formal test specification, which is presented to the user in a textual, and therefore understandable, form. The model transformation consists in the application of mapping rules. These contain semantic information that defines which test fragments of a requirement are mapped to specific test fragments in the test specification. To generate an executable test program from the formal test specification, information on the test platform and its specific variables and values is needed.

Figure 19:
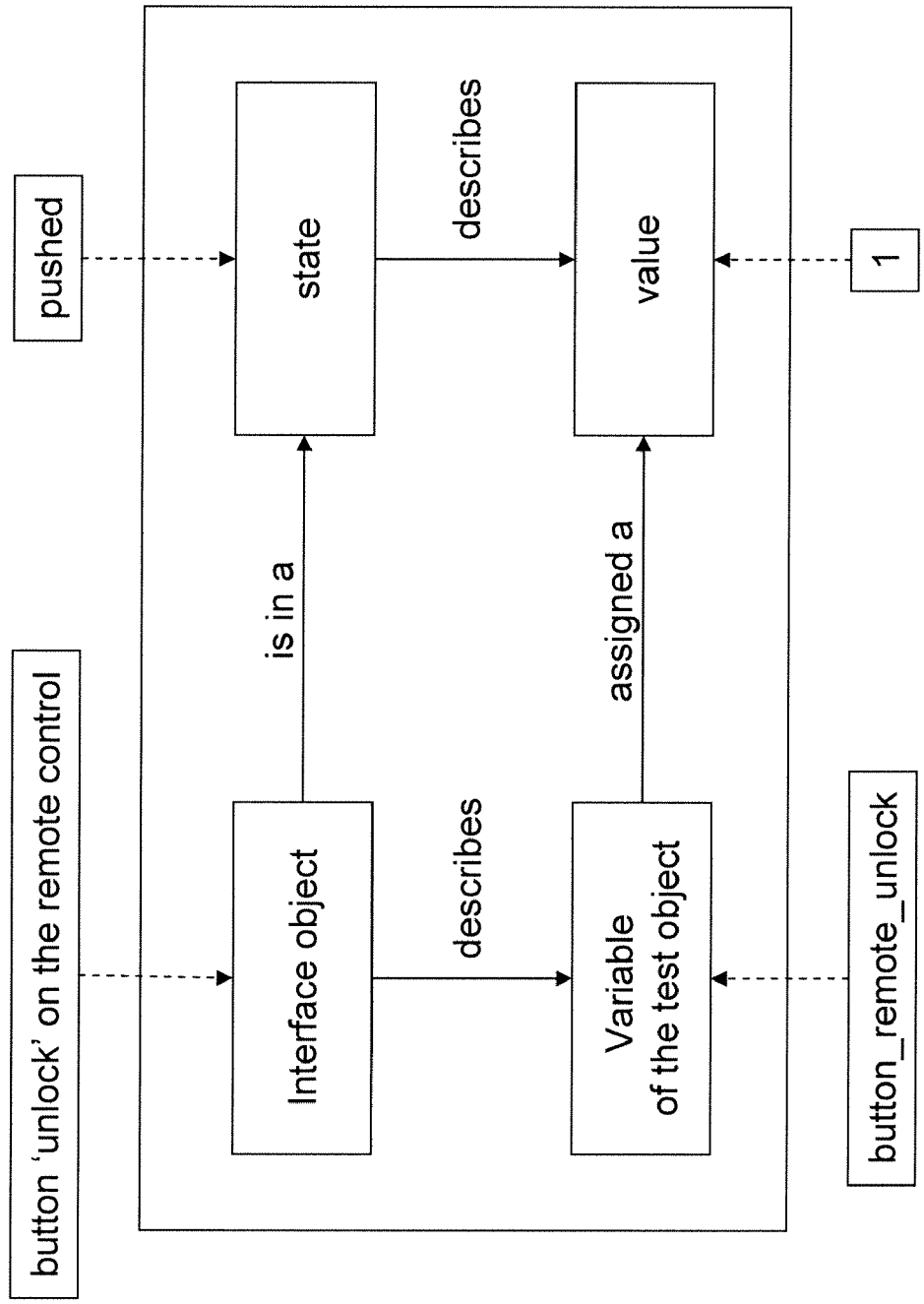
FIG. 19: The relationship between interface object, variable of the test object, value, and state.

So that the user can describe his/her requirements in terms that can be understood intuitively, and also understands the test steps in the test specification, the interfaces of the test object are not described by its variable names, but by user-defined interface objects. The user can describe the values that are assigned to the interfaces of the test object in the form of self-defined states. FIG. 19 shows the relationship between interface object, variable, value, and state. For example, the user can define the interface object "button 'unlock' on the remote control" and use it in the requirement. This interface object describes the test object variable "button_remote_unlock". To describe that the "button 'unlock' on the remote control" must be pushed, the user can define the state "pushed" and assign it to the interface object. The state "pushed" describes the value "1". Thus, by mapping the interface objects to variables and states to values, allows the assignment of a value to a variable described by a natural-language expression. For example, the text "button 'unlock' on the remote control is pushed" represents the variable assignment "button_remote_unlock=1". On the one hand, the interface objects and states defined in natural language are easier for the user to understand, and on the other, the variables and values may not be known to the user at the time of requirements creation.

The metamodel for requirements is described in detail below. This is followed by a description of the metamodel of the test specification. Then the concept of model transformation is presented, followed by a description of the basic procedure for mapping the test specification to an executable test program.

Models are used in computer science to reduce complex situations to the elements that are relevant to the purpose concerned. This provides an abstract view of comprehensive information, making it easier to grasp the relevant aspects. A metamodel defines which elements can occur in a model and which must occur, along with the relationships existing between the elements. To describe a sentence, for example, the metamodel can define that a subject and a predicate must be present in every sentence, and that objects can exist. A model that consists of instances of metamodel elements is an instance of the metamodel.

The metamodel developed in the framework of this invention defines the syntax of a subset of natural language. It describes the vocabulary that can be used to describe requirements. A model of a requirement results from selecting and combining terms from this vocabulary. This is an instance of the metamodel.

Using a vocabulary to create a sentence consists in selecting words and combining them to make a sentence. Some words are used only in combination with others. Several words are therefore brought together in fixed expressions that are modeled as atomic objects. Words that can be used on their own form single atomic objects. These objects are also called text constructs or text segments in the rest of this invention description.

The requirement metamodel, and therefore the vocabulary, is directly adapted to the information required for test generation. To protect the user against defining inconsistent and incomplete requirements, the metamodel prescribes a fixed requirement structure.

The requirement metamodel was modeled with the aid of a UML class diagram. This notation is described in [Obj05]. Text segments are represented by classes. Associations between the classes define the relationships between text segments to guarantee that syntactically correct sentences are created. Abstract classes do not represent concrete text segments, but define specific text segment types. Concrete text segments inherit their properties and associations from these. The use of abstract classes serves to structure the metamodel. Text segments can be grouped according to shared associations or properties and modeled as classes, which all inherit from the same abstract classes. For example, the binary operators "AND" and "OR" form a group of words. These can occur at the same place in a requirement and possess the associations with the same classes.

Figure 20:
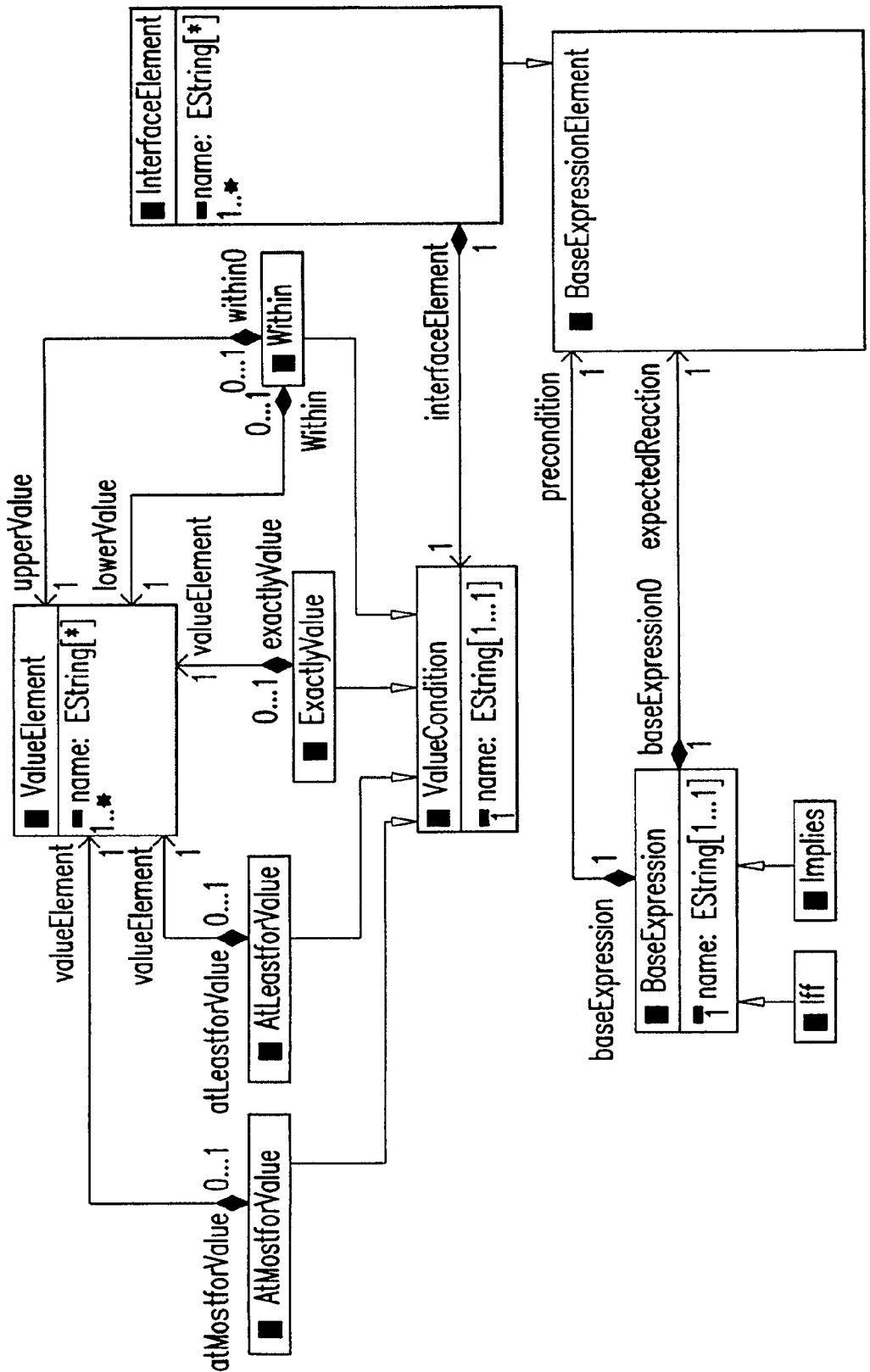
FIG. 20: UML class diagram of the requirement metamodel

The individual elements of the metamodel that together define the syntax for requirement description are defined below. An excerpt from the metamodel with its essential elements can be seen in FIG. 20.

As described above, requirements for software are mostly expressed by statements of the form "If a precondition arises, then an expected reaction must occur". Expressions such as "If . . . then" determine the entire structure of a requirement. There is an abstract element for specifying such basic expressions, "BaseExpression", which can be seen in FIG. 20. This represents the structure of the requirement. A concrete instance of "BaseExpression" is provided by the "Iff" element, which stands for the text expression "If and only if . . . then". The "Implies" element is another instance which can be used to create a "If . . . then" construct. These two elements have different meanings for a test: "If . . . then" means that if the precondition arises, the expected reaction must occur, otherwise the test fails. Using the expression "If and only if . . . then" provides two cases to be tested: If the precondition arises, the expected reaction must occur and if the precondition does not arise, the expected reaction must not occur. If either of these two rules is violated, the test fails.

A "BaseExpression" contains two elements of the "BaseExpressionElement" type, the first of which represents the precondition and the second the expected reaction. In the simplest case, a BaseExpressionElement is an "InterfaceElement". This represents the interface object that represents the inputs and outputs of the system under test. It must be possible to assign a state to an interface object, so that values can be assigned to the variables of the system. FIG. 19 shows the relationship between interface object, variable, value, and state. For example, the 'unlock' key on the remote control describes an interface object whose state can be pushed or not pushed.

The "ValueElement" element models such a state. At the time the requirement description is created, it is possible that the exact value described by the state is not yet known at all, but that the value must be restricted by a specific range. The abstract element "ValueCondition" is available for this. This has four different elements as concrete instances. First, it can be an "AtMostforValue" element that defines an upper bound for the value. Further, an "AtLeastforValue" element can be used to specify the lower bound. The "Within" element allows an interval to be defined, and the "Exactly Value" element specifies a concrete value precisely.

Figure 21:
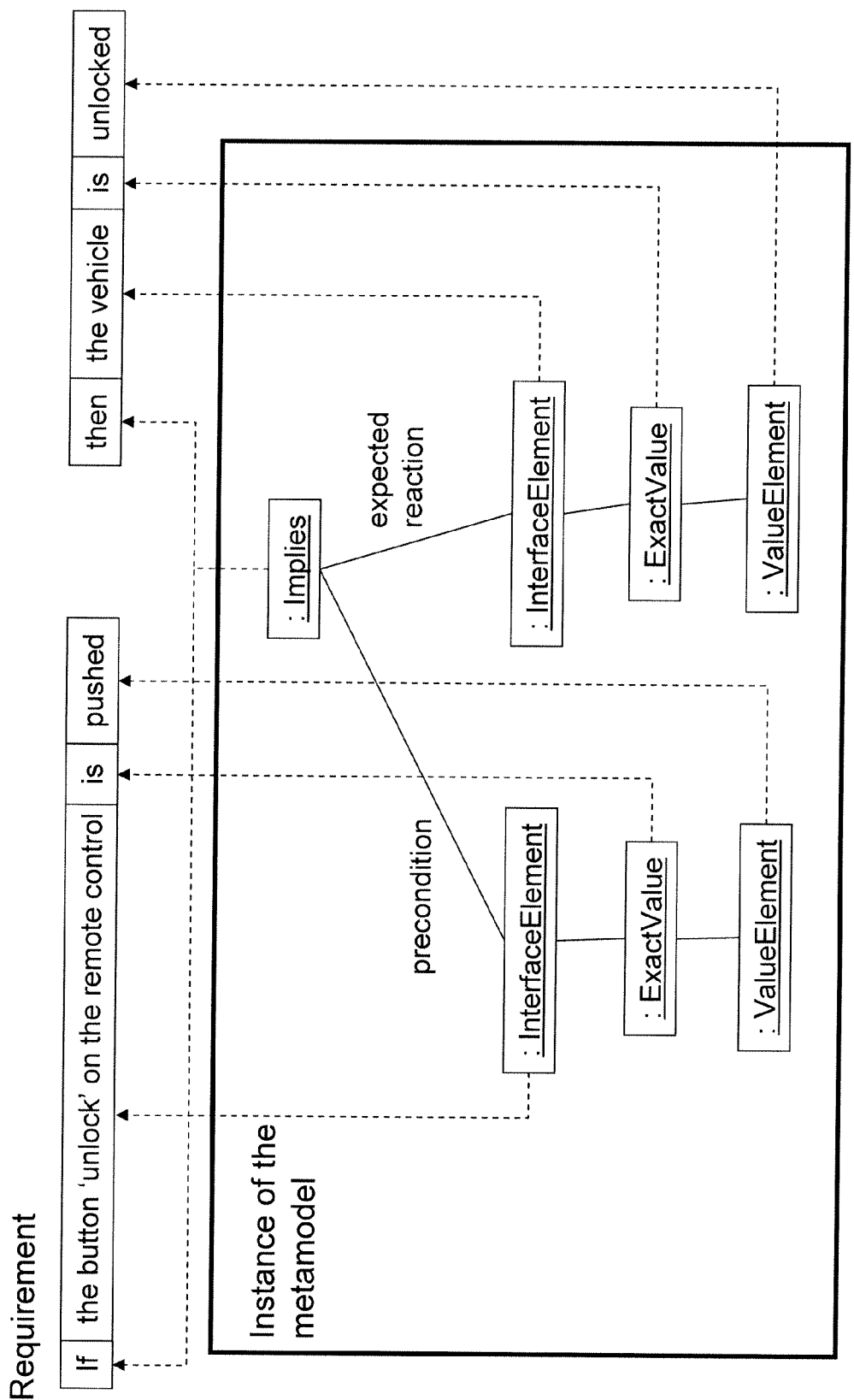
FIG. 21: Instance of the metamodel

FIG. 21 shows a concrete instance of a metamodel and a requirement than can be created by means of the elements presented here. The lines represent the associations between elements. The dotted arrows each connect an element of the metamodel instance with text, as an example of what a user view can look like. To produce a user-readable view from a metamodel instance, mapping to natural-language expressions is required. This mapping process will be described later.

The elements defined so far allow requirements to be formulated in the passive. The functionalities of a system depend on the input, but not on the person who makes the input. A text construct that describes a person or system that the input originates from is therefore not needed.

As the example in FIG. 21 shows, interface objects and states are always assigned to one another by the word "is". A customer could also want to express the statement "then the vehicle is unlocked" in the form "then the vehicle must be unlocked", or to use the terms "may", "should", or "will" instead of "must". However, only functionalities that must return specific results must be validated by tests. It does not make sense to invest energy in developing a test to check functions that can cause a specific result and where it is no problem if the result does not match that expected.

While text constructs such as "If . . . then", "at most", "at least", . . . are part of the general vocabulary, text constructs for describing interface objects (InterfaceElement) and states (ValueElement) depend on the system. Users must therefore be able to define text constructs for interface objects and states themselves, thereby extending the vocabulary.

To offer the user various means of expression, it must be possible to assign synonyms to the InterfaceElement. For example, the expressions "unlock all doors" and "unlock the vehicle" in a requirement can describe the same underlying fact. An arbitrary number of synonyms can be assigned to each InterfaceElement and modeled as attributes of the InterfaceElement element. Synonyms can also be defined for states that are present in the form of ValueElement elements.

Figure 23:
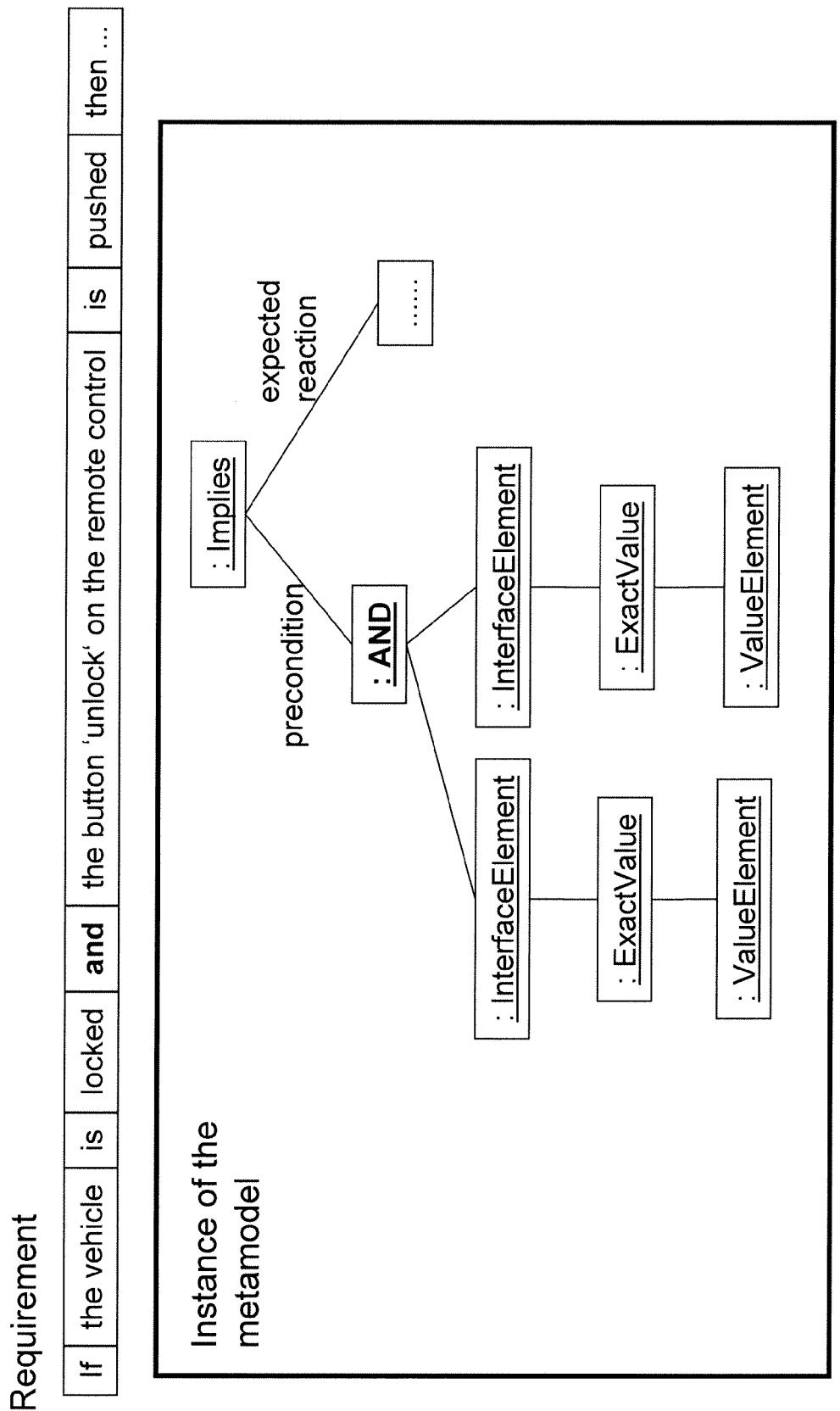
FIG. 23: Requirement with operator

Many requirements cannot be described by the elements presented above. Several inputs can be given specific values and several outputs can react to this. This requires an AND operator. The precondition and the expected reaction could also consist of OR-linked instructions. The excerpt of the metamodel presented so far is also unable to describe the negation of a statement. This shows the need for operators in the metamodel. FIG. 23 contains a requirement with a simple AND link in the precondition.

Figure 24:
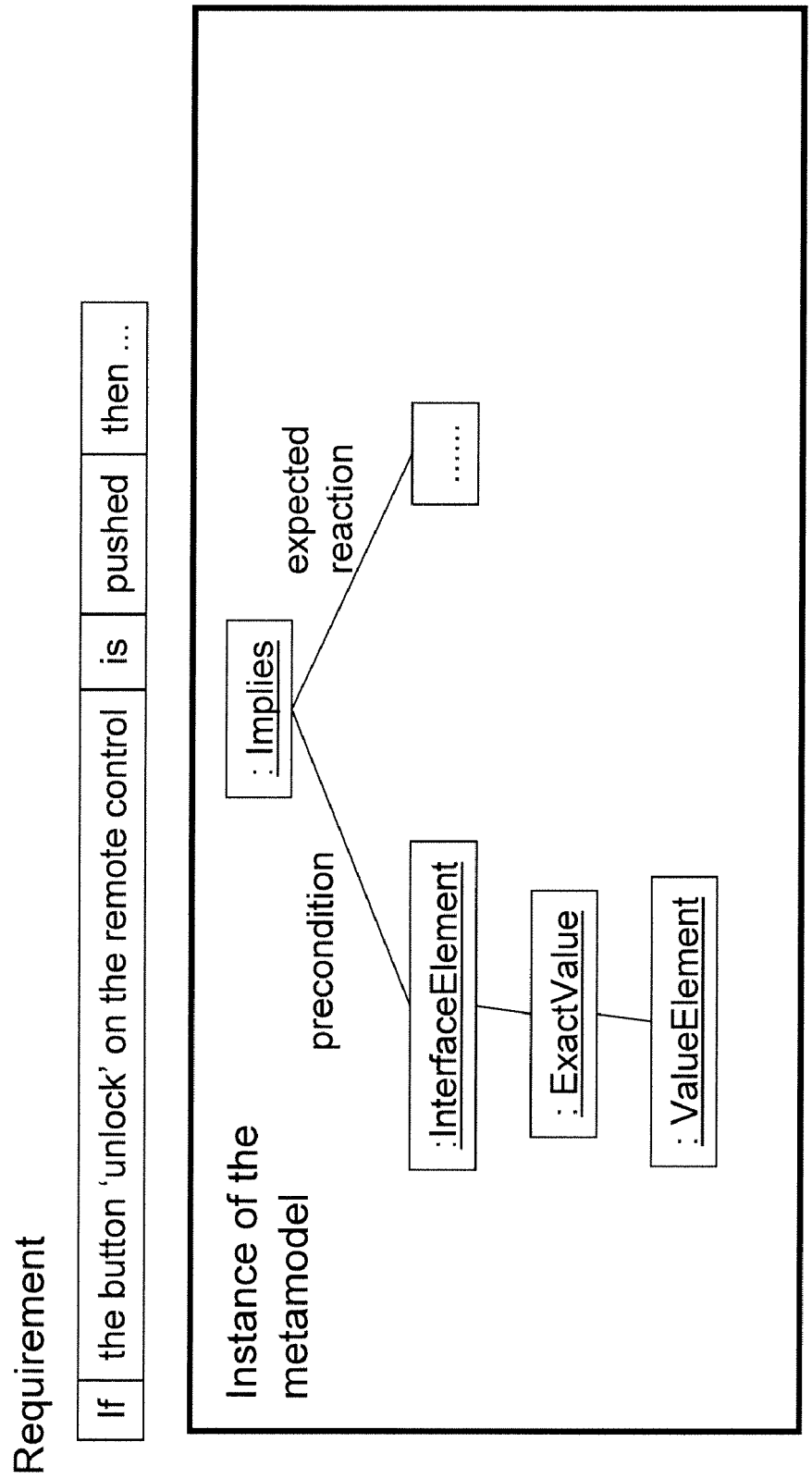
FIG. 24: Requirement without operator

This means that two InterfaceElement elements are assigned to the AND operator. The metamodel therefore requires an operator located between a BaseExpression and an InterfaceElement. Further, there must be a way of formulating a requirement without the operator. Thus, a BaseExpression can be followed by an operator, but also directly by an InterfaceElement, as FIG. 24 shows.

Figure 25:
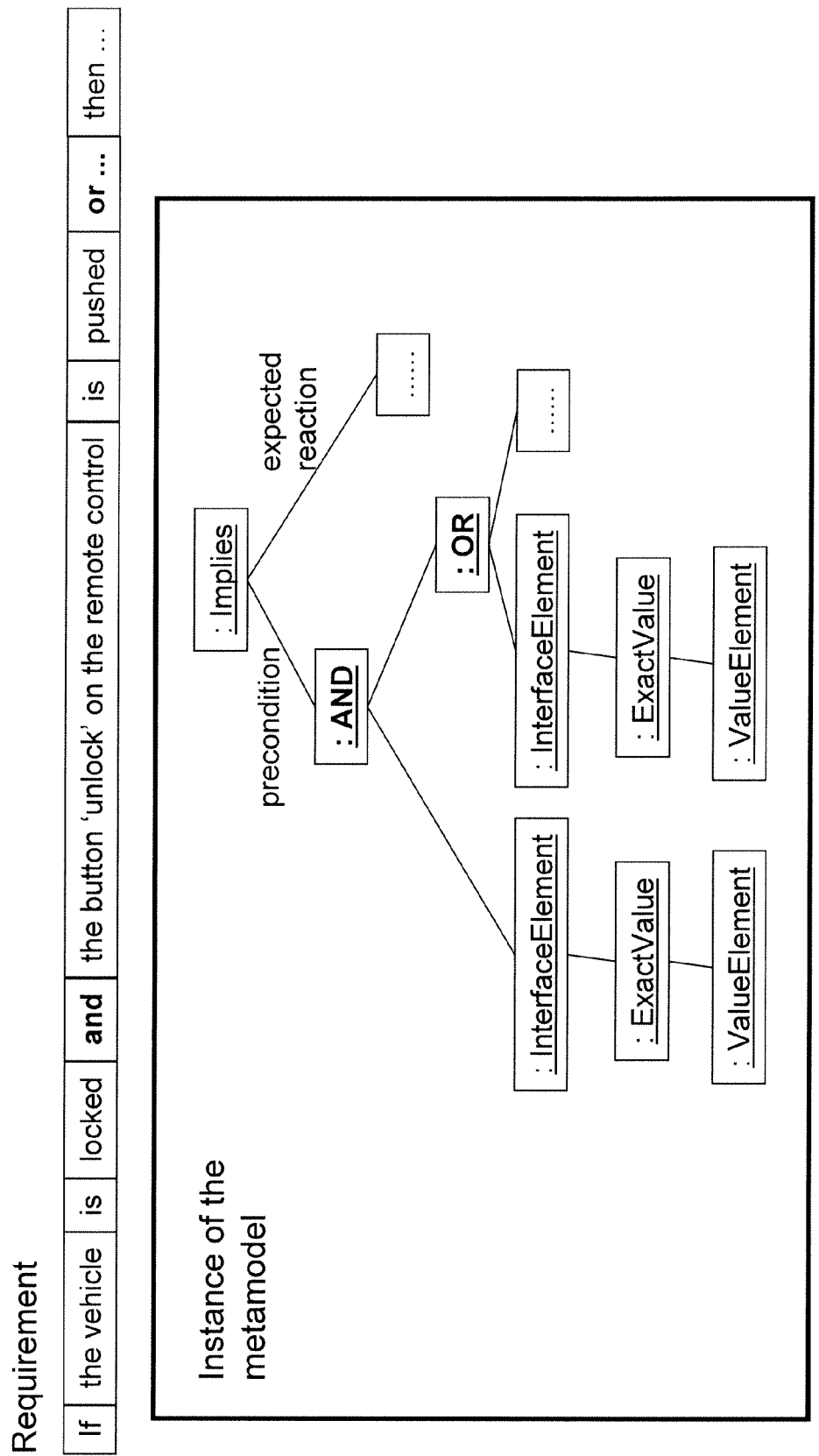
FIG. 25: Requirement with several operators

So that more than two elements can be linked, AND and OR operators can also be combined in a requirement, a way of nesting operators is required (FIG. 25). To sum up, three criteria for extending the metamodel by operators can be discerned:

1. An operator must be inserted in the requirement before the InterfaceElement, because elements of InterfaceElement type must be assigned to the operator as children.
2. Further, it must be possible to formulate requirements without operators.
3. It must be possible to implement the linking of several aspects by means of nesting operators.

Figure 26:
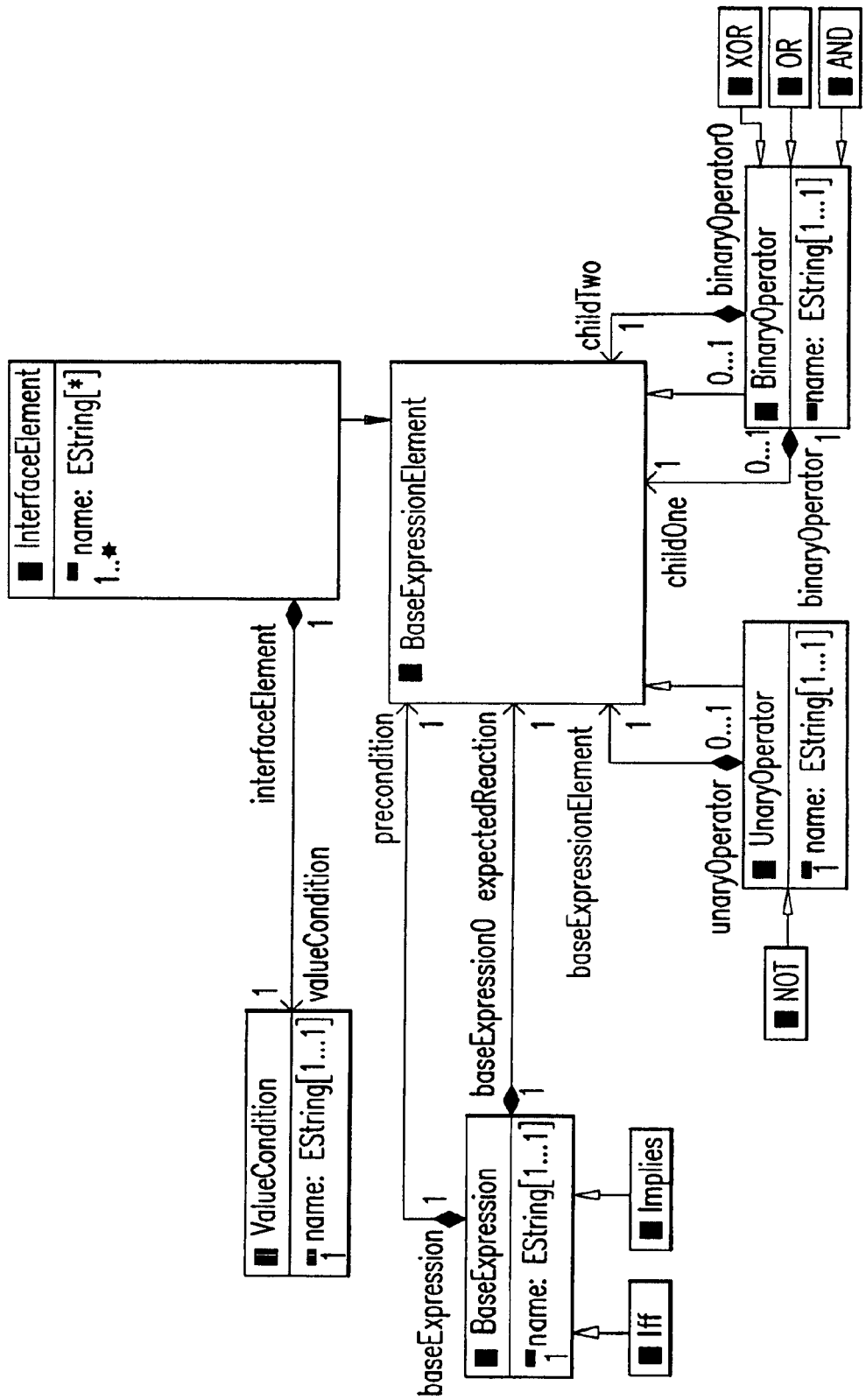
FIG. 26: Excerpt from the metamodel with operator modeling

This results in the operators being modeled by means of the compound design pattern [GHJV04]. FIG. 26 shows an extended excerpt from the requirement metamodel. There is an abstract element called "BinaryOperator", which inherits from the BaseExpressionElement element. It can therefore be a child of a BaseExpression. Concrete instances such as the AND, OR and XOR elements in turn inherit from this element. The BinaryOperator always has two children, which it has to link. The children are of BaseExpressionElement type, so that concrete elements of the InterfaceElement type and further operators are possible as children. Thus, the BinaryOperator has two elements of BaseExpressionElement type as children, and is itself a BaseExpressionElement. The "Unary-Operator" is modeled by analogy to this. This has only one child, and is used, for example, in the NOT operator to negate statements.

This operator modeling can be used to create instances like those shown in FIGS. 23, 24, and 25. The result is a tree structure in which the links are made unambiguous by operator nesting. In natural language, using several operators in one sentence can lead to ambiguities. The requirement "The ignition is on and the interior lighting of the vehicle is on or the interior lighting is out." could have two different meanings, which is made clear by putting different parts of the sentence in brackets: ("The ignition is on and the interior lighting of the vehicle is on) or the interior lighting is out." or "The ignition is on and (the interior lighting of the vehicle is on or the interior lighting is out.)" A structure like this is defined by the tree structure. To present a requirement with operators to the user unambiguously, means such as parenthesizing or highlighting parts of the sentence can be used. Then no ambiguities result from using several operators.

The information that a requirement can contain by means of the elements defined above is not sufficient for developing the software of embedded systems, however. The assignment of inputs and outputs can be formulated, but the question of when and how long a value must be applied to one of these interfaces remains unanswered. Frequently, there are details that are expected but not communicated. Incompletely specified requirements give rise to systems whose functionalities do not fulfill the desired requirements.

EXAMPLE

"If the button 'unlock' on the remote control is pressed, the vehicle is unlocked. When is the button activated? How long must it be pushed for the vehicle to be unlocked? How long does unlocking last?"

This problem makes it necessary to add elements for specifying temporal conditions to the metamodel. To model the point in time of an interface assignment, there is an element called "PointOfTime", which is assigned to the InterfaceElement. This is because each InterfaceElement has an association with a ValueCondition, which is connected to a "ValueElement". A variable of an interface is represented by a specific value assignment by this means. This assignment state may require a point in time and a duration to be defined, if temporal conditions are relevant to the requirements being defined. The InterfaceElement therefore also has an association with a "LengthOfTime" element to define the duration.

The elements PointOfTime and LengthOfTime are modeled as optional elements, since there can be requirements where defining temporal conditions does not make sense. Further, there are some scenarios in which time specifications must not be given exactly, but stated in terms of an upper or lower bound.

EXAMPLE

"If the button 'unlock' on the remote control is pushed for at least 4 seconds after 0 seconds, the vehicle is unlocked after at most 6 seconds and for at least 240 seconds."

Figure 27:
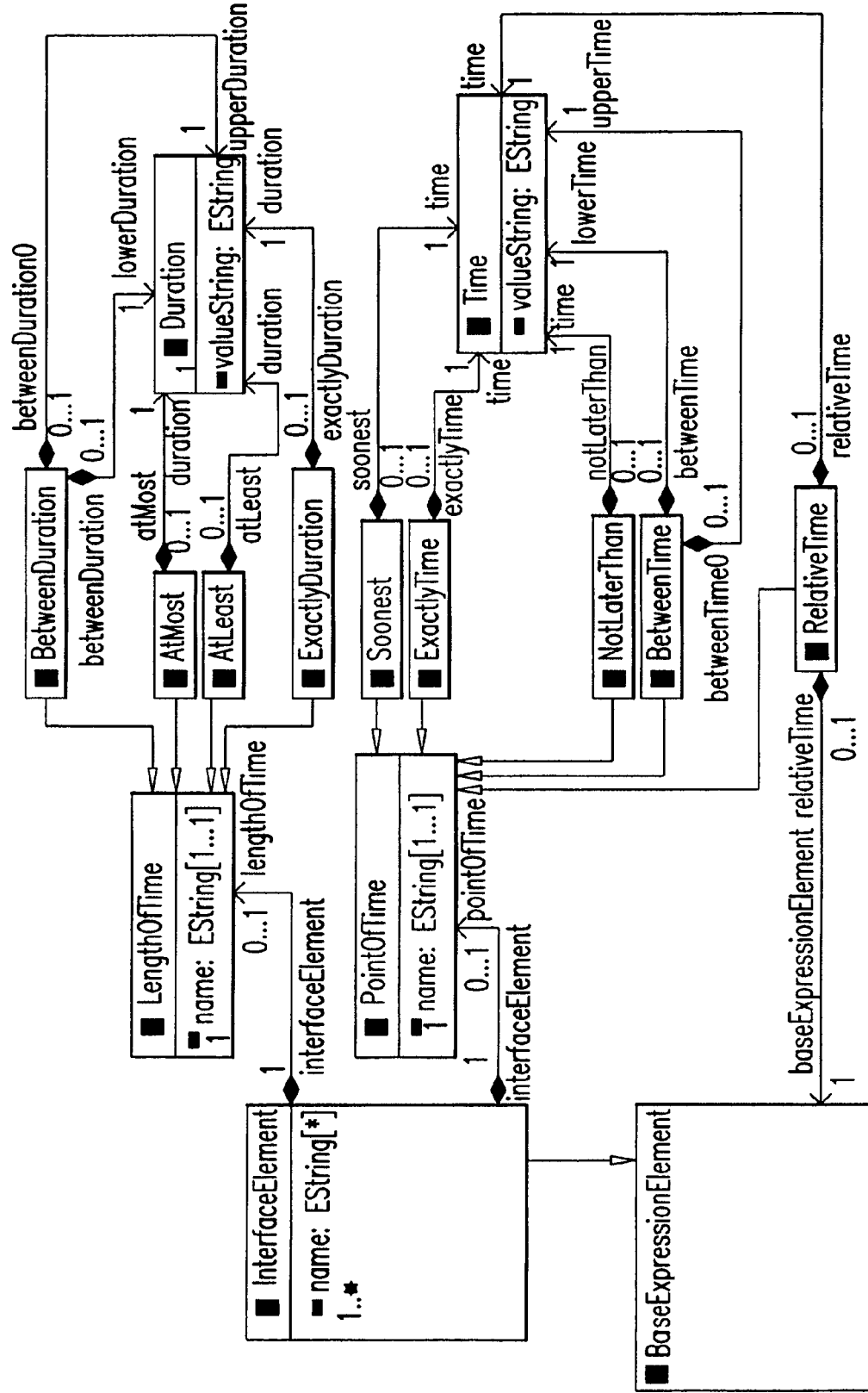
FIG. 27: Excerpt from the metamodel with temporal conditions
Figure 28:
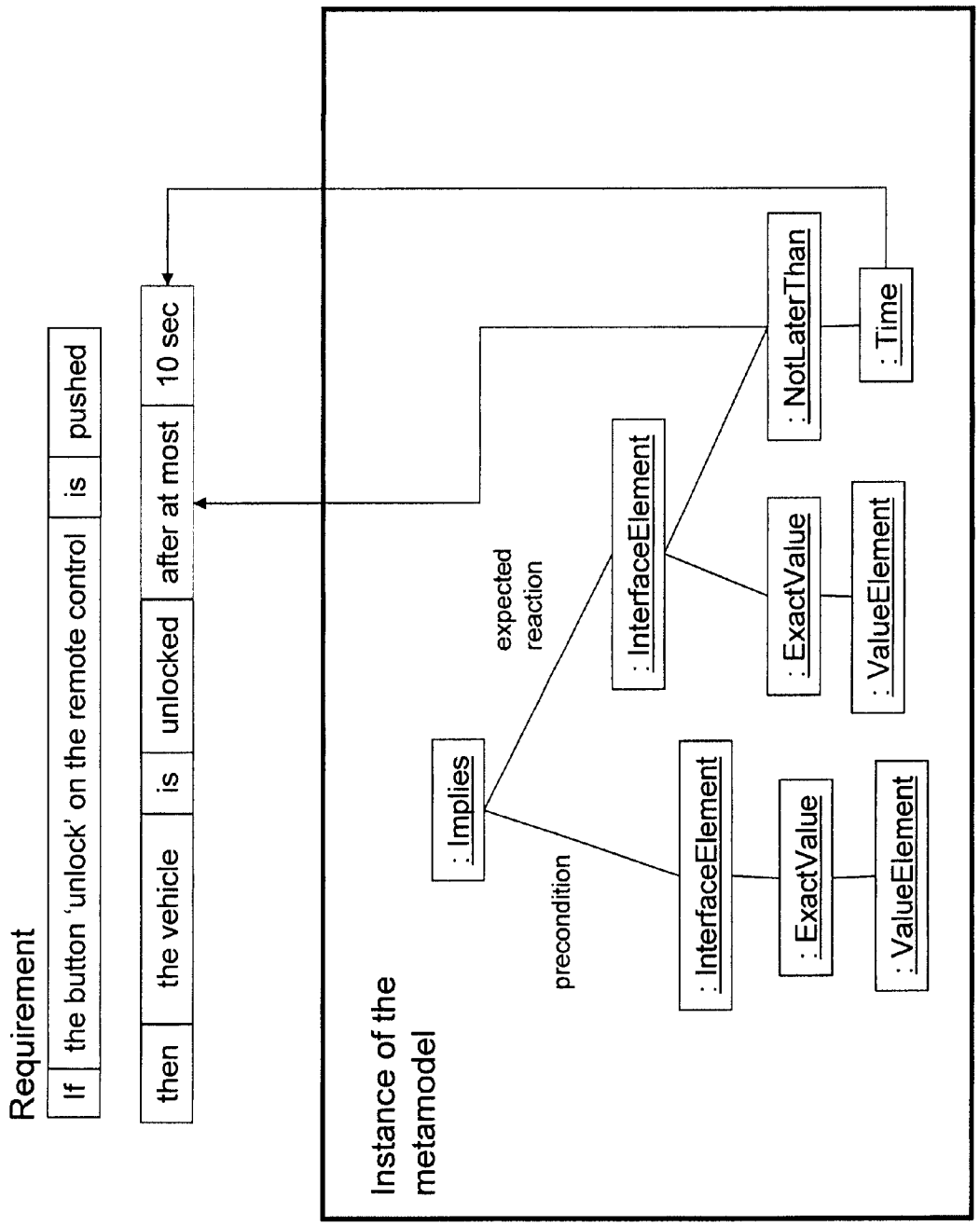
FIG. 28: Requirement with temporal condition

This shows the need for different point-in-time and duration elements, which are shown in the metamodel in FIG. 27. To describe the point in time, four different elements are modeled, which inherit from the PointOfTime:
ExactlyTime
NotLaterThan
Soonest
BetweenTime The "ExactlyTime" element is for handling a case by activating a precise time specification. To describe an upper bound, there is the "NotLaterThan" element, by means of which a variable of an interface is assigned to the specified value no later than the defined time. The "Soonest" element defines that the variable must not be given the value earlier than the time specification. To define upper and lower bounds, the "BetweenTime" element is used. All these elements have associations with the "Time" element, which contains the concrete time value to which the temporal conditions relate. FIG. 28 shows the elements' relationships to the text of a requirement.

As equivalents, there are four elements for describing duration specifications, which inherit from the LengthOfTime element:
ExactlyDuration
AtMost
AtLeast
BetweenDuration To define the duration with an exact length, there is the "ExactlyDuration" element. The upper and lower bounds of time duration specifications can be defined by means of "AtMost" and "AtLeast". The "BetweenDuration" element is for defining an interval in which the duration must be located. The elements presented here possess "Duration" elements that contain time duration specifications.

Figure 29:
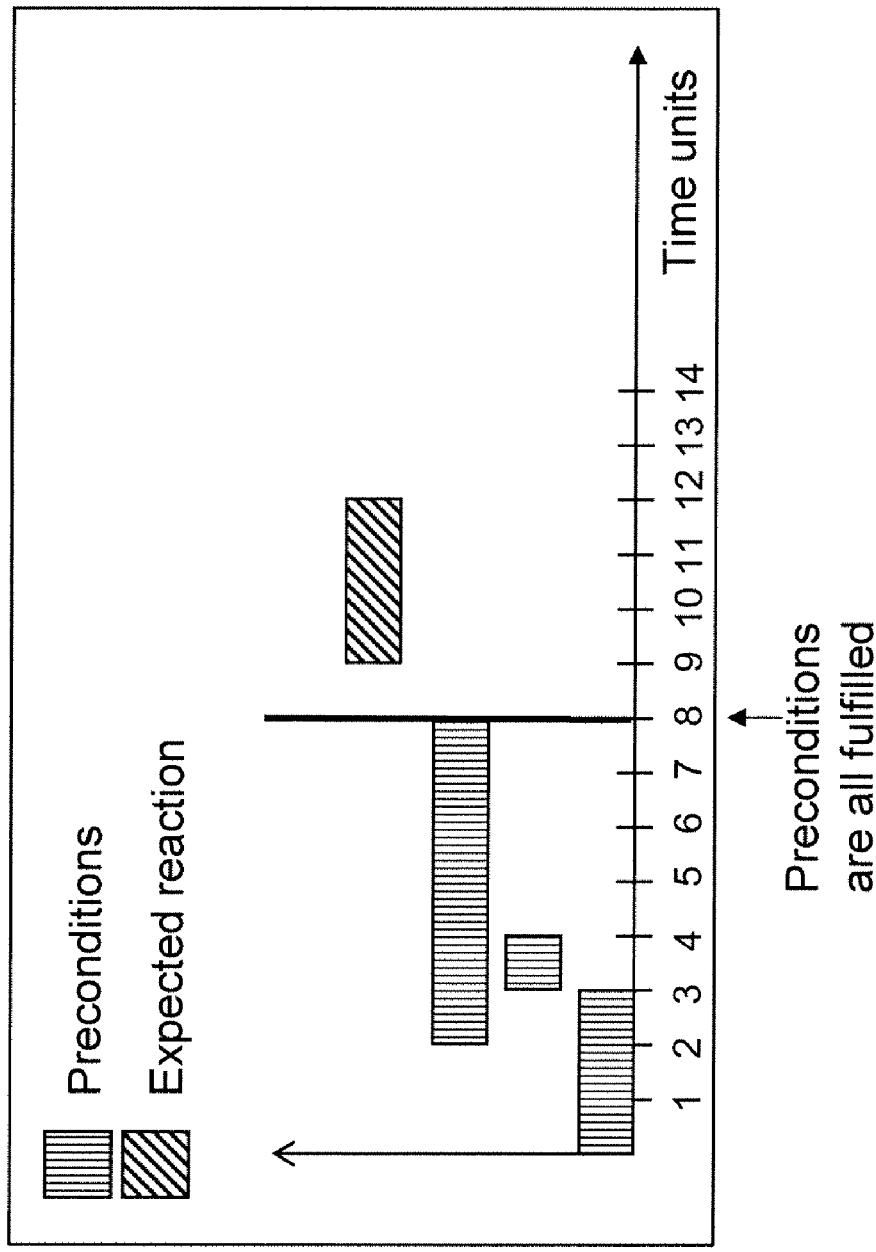
FIG. 29: Expected reaction after completion of all preconditions

The formal definition of the semantic of all elements for describing temporal conditions takes the form of mapping to the temporal logic RTCTL. Aspects arising from using the time specifications will be looked at here:
1. Reference point in time of the expected reaction
2. Temporal dependencies between conditions
3. The Soonest element in the expected reaction All point-in-time specifications in the precondition relate to a common zero point, so that parallel processes can also be described. Sequences of conditions can be specified by including different point-in time and time duration specifications. If a precondition is fulfilled, the reaction is expected to occur after that. Thus, the earliest point in time at which all preconditions are fulfilled could be taken as the zero point for a time specification defined in the expected reaction. A precondition is fulfilled or completed if the state was assigned to the interface object and the state remains for the specified duration. In FIG. 29, the expected reaction takes place one time unit after completion of all preconditions. This sequence can be specified in a requirement in which the expected reaction contains the point-in-time specification after exactly one time unit and the reference point in time for the expected reaction is not the zero point of the requirement observation, but the completion of all preconditions.

Figure 30:
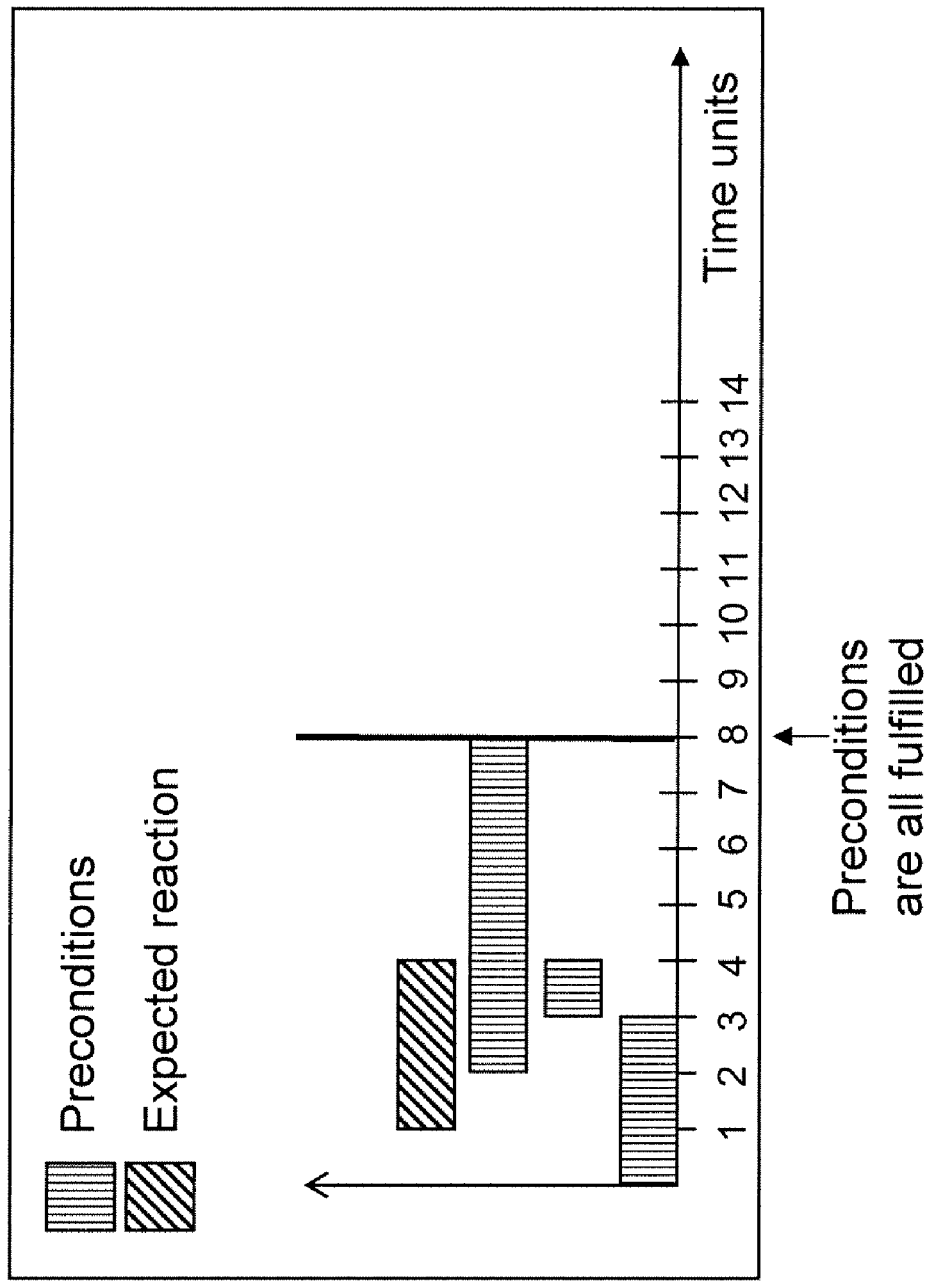
FIG. 30: Expected reaction parallel to preconditions

However, this assumption does not cover the case where the input of a concrete signal behavior requires output of another signal behavior, without the two signals occurring one after the other in time. FIG. 30 shows this case. To handle this case, the requirements metamodel can be extended by a further element, which defines that the time specifications in the requirement part of the expected reaction also relate to the same zero point as in the precondition.

Here is a summary of the reference points for time specifications:
In the precondition, all time points relate to the zero point of the entire requirement.
The rule for the expected reaction is that the earliest point in time at which all preconditions are fulfilled is the reference point for all points in time.
As an extension of the metamodel, an element can be added that provides a way of also relating the points in time of the expected reaction to the zero point of the entire requirement.

However, this reference point definition cannot express a case where conditions within the precondition are dependent on one another. The elements NotLaterThan, Soonest, AtLeast, . . . do not specify exact times, so that the end of a condition cannot be determined in advance. If condition B must be true on completion of condition A, this cannot be done by a simple time specification for condition B, as the end of condition A cannot be determined precisely by exactly defined time specifications. It is also not possible to describe dependencies between conditions of the expected reaction. This requires a new element, which is introduced below.

EXAMPLE

"When the vehicle is locked, the vehicle is unlocked for at least 240 seconds, 3 seconds after the button 'unlock' on the remote control was pushed".

In this example, the unlocking of the vehicle is time-dependent on the condition that the button on the remote control is pushed. To construct a requirement such as this, a new element called "RelativeTime" must be inserted into the metamodel. This is a concrete instance of the PointOfTime element, as that defines a time at which the condition must occur.

Figure 31:
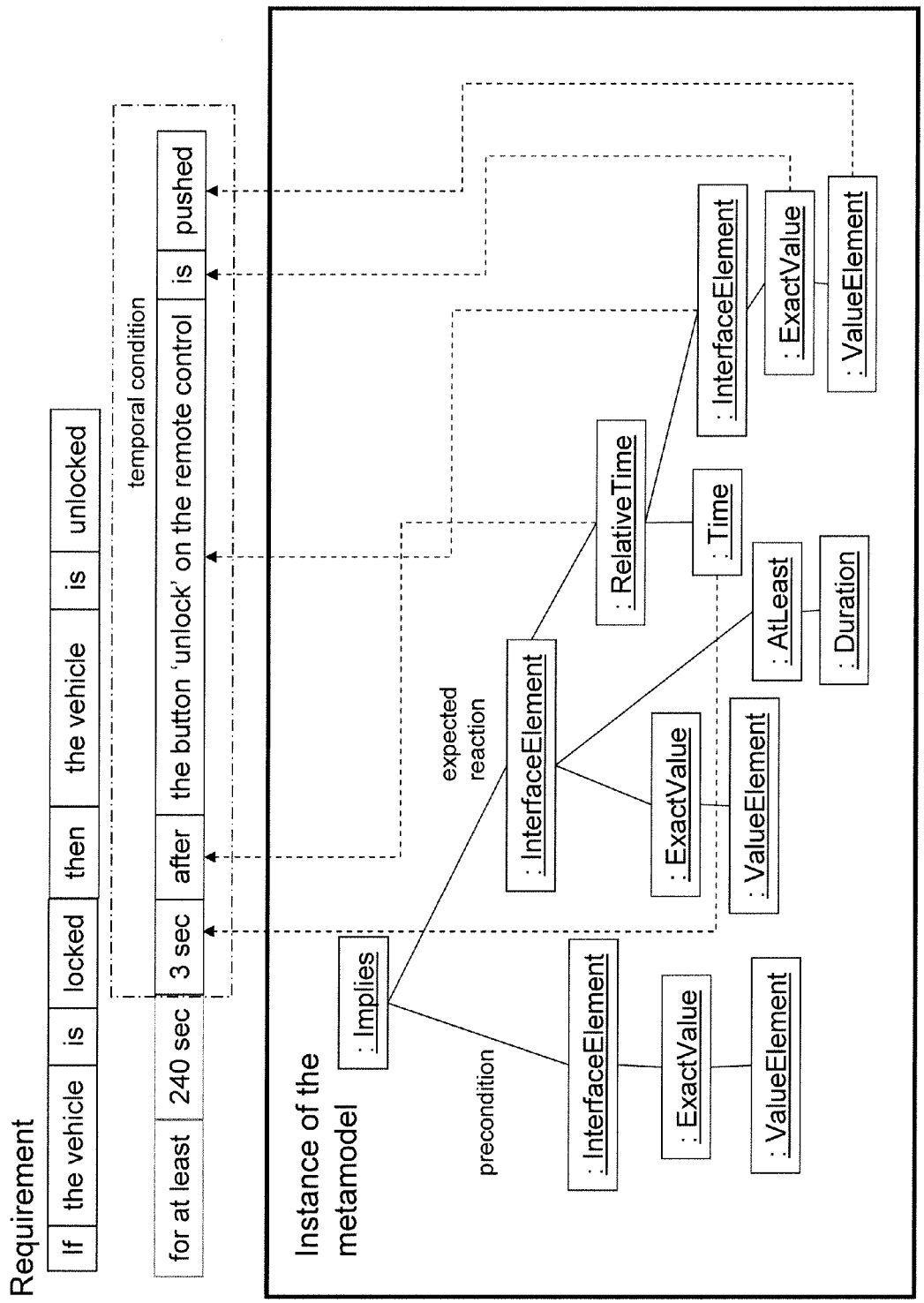
FIG. 31: Temporal dependencies

FIG. 31 shows the requirement as a text in combination with the associated instance of the metamodel. The RelativeTime element has the Time element as a child, and also a child called BaseExpressionElement, to which the dependency relates. Modeling relative dependency allows temporally consecutive assignments of states to interface objects to be expressed within the precondition and the expected reaction. This leads to reactive behavior. Reactive behavior describes a process in which a specific event is waited for, following which an activity can take place. In this example, the process waits for the button 'unlock' on the remote control to be pushed. 3 seconds after that, the vehicle is unlocked.

In summary, it can be stated:
The RelativeTime element allows reactive behavior to be described: Dependencies can be defined without knowing absolute points in time, as it is possible to wait for an event to occur.

Within the precondition and within the expected reaction, events can be described as following each other in time, even if absolute time specifications are not known.

The third aspect to be considered is the existence of a Soonest element in the expected reaction.

EXAMPLE

"After a vehicle was opened but neither started nor closed again after 4 minutes, the central locking system must lock the doors automatically so that no stranger can obtain access to the vehicle. The unlocking may have been inadvertent, or locking the vehicle was forgotten. However, the vehicle must not be locked again immediately, as people need time to get in and out. Automatic locking must occur no earlier than at the end of 4 minutes. To test this functionality, there must be a check that the vehicle remains unlocked between 0 and 4 minutes. Further, it must be checked whether the vehicle is locked some time after the 4 minutes."

Figure 32:
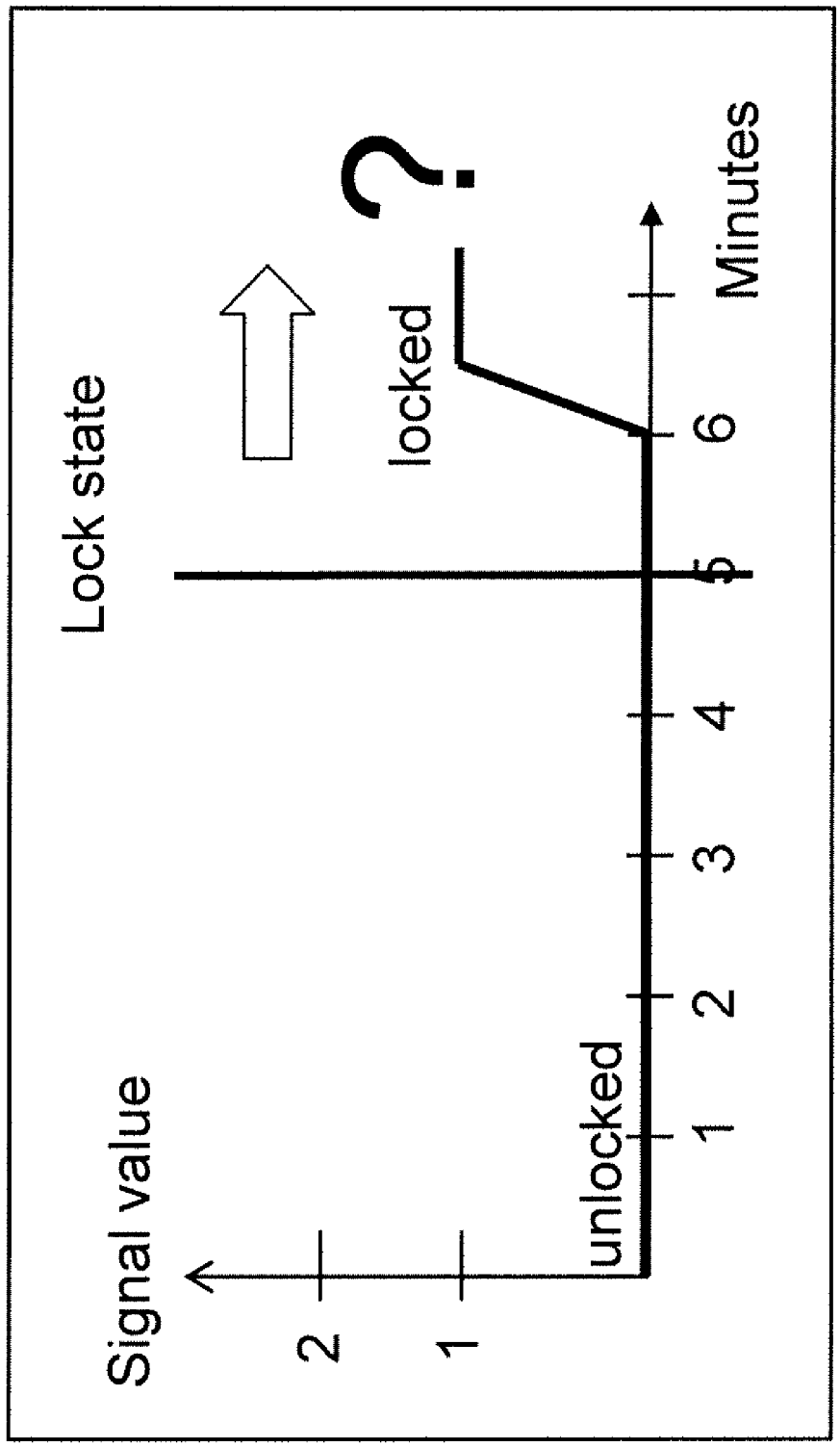
FIG. 32: The Soonest element in the expected reaction

The question therefore arises: how long must the system wait for this state to occur? It is not possible to test for an infinite duration. FIG. 32 shows the locking state of the vehicle in the period 0 to 7 minutes. When can the test be terminated? After 5, 6, 10, 60 minutes? If the test was terminated at point in time 5, it would not be possible to decide whether the test failed or whether the locking of the vehicle would still have occurred if the test had been continued.

To give the test a time framework, the user must define a timeout during requirement creation.

Elements for the requirement metamodel were defined in this section and in previous sections. These included descriptions of interface objects, states, operators, and temporal conditions. The interface objects and states are elements that are test-object-specific. Each test object has special variables for interfaces, which can assume specific values. Since these variables and values are dependent on the test platform used, but first a general description of a test must be produced, the requirements are described independently of the test platform. Platform independence is the subject of the next section.

To make the testing of software efficient, test reusability is desirable. Testing is optimally performed in varying stages of developing software, not only after development has been completed. As described above, nowadays there are executable models in the design phase. For example, these are block diagrams or state machines that can be executed in a simulation environment (e.g., MATLAB®/Simulink®). Thus, tests can be performed as early as the model stage. Further, the program code developed from the models, and subsequently a prototype, which in the case of an embedded system acts within a hardware environment, also have to be tested. Testing a test object requires a test platform on which the test object is executed. FIG. 12 shows a test object that is connected to a test platform. It was already shown that the model, program code, and prototype of an embedded system are executed on different platforms. For example, the model runs in a simulation environment, while the completed prototype is in a hardware environment. Each platform has specific variables with which inputs and outputs can be addressed, and specific value ranges for these interfaces.

Figure 33:
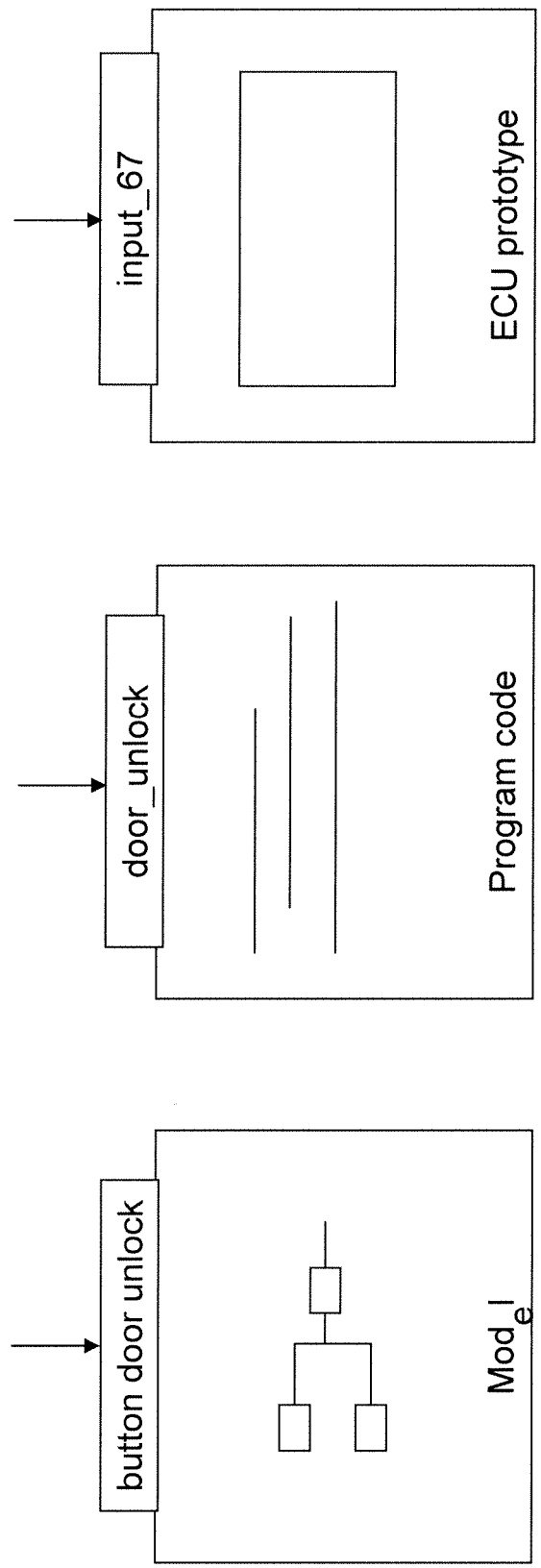
FIG. 33: Different types of interfaces on the test objects in the various software development stages

So that a test can be applied in every development stage regardless of the required platform, the test must be described in platform-independent form. A platform-independent test description must use designations for interfaces that must be mapped to variables that the real test platform understands. FIG. 33 represents the test objects that arise during the development of an ECU. Each of these test objects, whether they are a model, program code, or prototype of an embedded system, has inputs for applying values. When the button on the remote control for unlocking the vehicle is pushed, one input receives this information. The mapped inputs represent the same information in different ways. In a model, an input can be modeled by a signal. When program code is created from this model, the input can be represented by a function call with parameters. The input in the ECU can be implemented by applying an electrical voltage to pins. These different representations of the interfaces in the test objects are encapsulated away from the test platform. However, there are different implementations of test platforms that implement the interfaces to the test tool in different ways. The information represented by one input in one test tool can be modeled by several inputs in another test tool. Thus, there must be a platform-independent description of such an input in a requirement, and mapping to the real input designations, to allow reusability.

Platform-independent test description languages are today frequently used in exchanging tests between different departments and companies that are jointly involved on one project. Examples are TestML [GCF+06], TTCN-3 [Gra00], ATML and UML Testing Profile.

Figure 34:
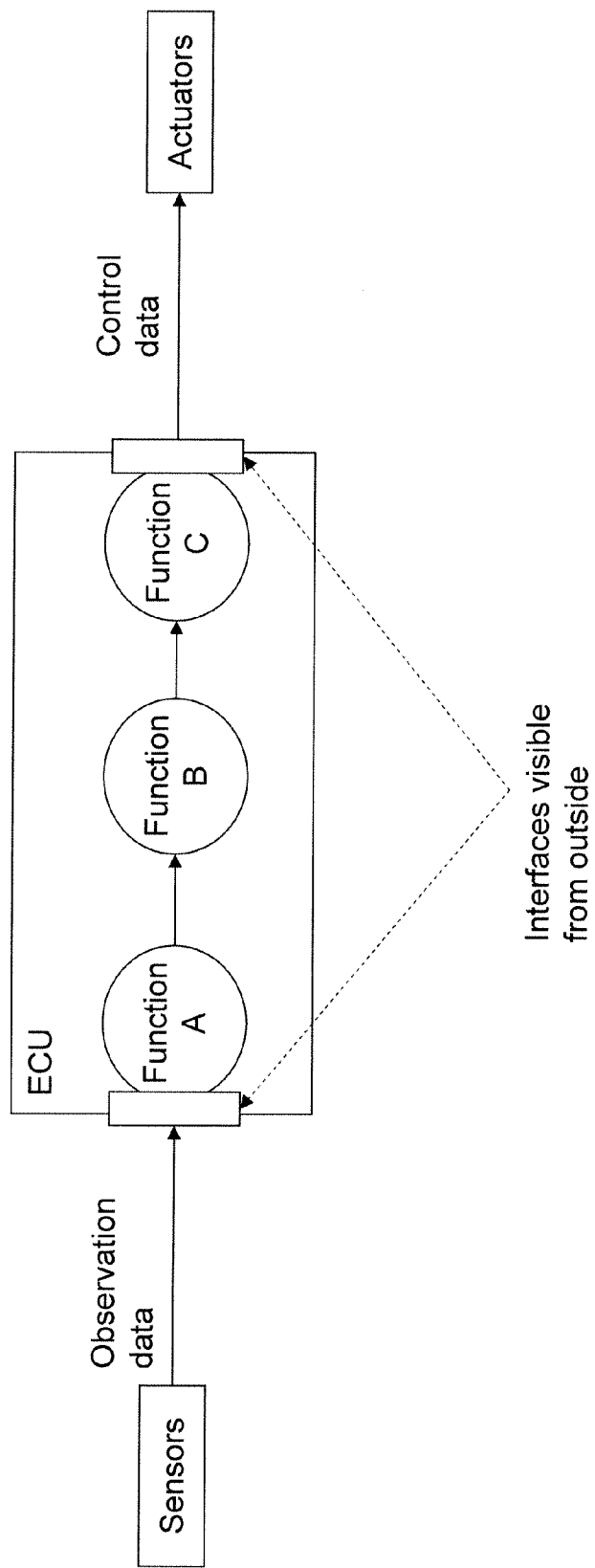
FIG. 34: Interface accessibility

In practice, however, difficulties arise in implementing the concept of platform-independent test description. To guarantee the reusability of a test throughout various development phases, it must be ensured that the only interfaces used in the test are ones that are accessible in all test objects (model, code, and prototype). When a test is developed for testing three consecutive functions independently of one another at model level, it can happen that only one of the functions is accessible from outside in the prototype. FIG. 34 shows the three functions in the software of an embedded system. Function A can be called from outside, while functions B and C are each activated by the upstream function and not accessible via interfaces. A test of such consecutive functions does not have the property of reusability. Thus, the interface accessibility of the software under development must be thought through in advance, so that these aspects can be incorporated into test creation.

For the metamodel to describe requirements that can be used for automatic generation of platform-independent tests, the elements of the metamodel themselves must be platform-independent. This has the advantage that tests can be created for all platforms. In the requirement model, interface objects represent the variables of the interfaces in the test object. Each interface object is unique, so that each interface object can be mapped to the corresponding variable of the test object. The platform-specific information such as inputs, outputs, and value ranges must be available for this mapping process.

Figure 35:
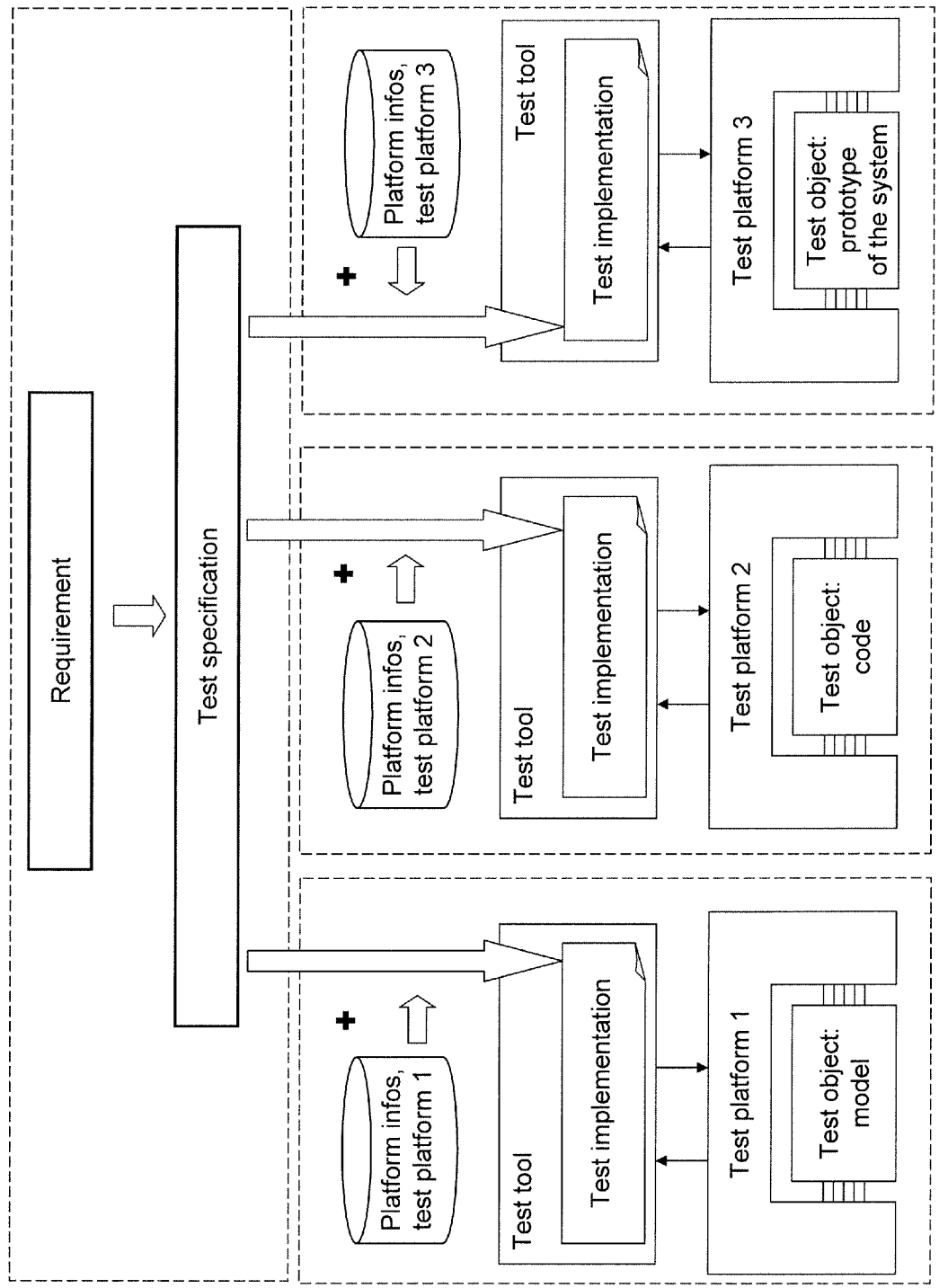
FIG. 35: From platform-independent requirement to platform-specific

FIG. 35 shows a platform-independent requirements description that is converted into a platform-independent test specification. A test specification describes the individual steps of a test, as explained above, and will be explained in greater detail below. A concrete test implementation is generated for each test object from the test specification. In this step, the platform-independent interface objects and their states are mapped to the platform-specific variables of the test object and their values, for which the platform information must be available. An interface object can be mapped to several specific variables, if the interface object described in the requirement is implemented by several inputs or outputs in reality. In many examples given for this invention, the sentence "the vehicle is unlocked" was used to express that all the doors of the vehicle are unlocked. If the platform has a variable for every door, the interface object "the vehicle" must be mapped to the variables for all doors as shown in FIG.

36. The platform-specific variables can assume specific values that implicitly define a value range.

The metamodel uses a subset of natural language with which users can formulate their requirements. Due to the restriction in linguistic means, there will always be requirements that cannot be expressed. This metamodel was therefore designed to be extendable. Research on finding a set of elements for the metamodel which would express virtually all situations go beyond the framework of this invention and remains to be done in the future. The elements available in the metamodel were selected on the basis of example requirements constructed according to the concepts presented here and examples from practice. So that the metamodel can be extended in later theses, extendibility is an important property.

Modeling the metamodel by means of UML means that new elements can be added as additional classes with little effort. New elements can also be defined as specializations of existing classes and can therefore inherit those classes' properties. A new binary operator would be a further implementation of the abstract BinaryOperator. In the course of extending a UML metamodel, only elements that are extended by an association are ones that have a direct relation to the new element. All other elements are unaffected by the extension. This shows that extending a metamodel is very simple.

The user must be able to formulate requirements by stringing together words, starting from the left, so that the process and the arrangement of words correspond to normal sentence construction. Intuitive readability is a very important property for a requirement, to make formulation as easy as possible for the user. At this point, inductively defined mapping of metamodel elements to sentence fragments is performed. The notation Iff(precondition, expectedReaction) means that the instances of the Iff element of the metamodel, with the instances of the elements reached by the precondition and expectedReaction associations, are mapped to the sentence fragment that follows. The elements achieved by the associations are in turn mapped to sentence fragments, so that finally a completely natural-language sentence arises.

BaseExpression
Iff(precondition, expectedReaction)→"If and only if <precondition>, then <expectedReacton>."
Implies(precondition, expectedReaction)→"If <precondition>, then <expectedReaction>."
BinaryOperator
XOR(childOne, childTwo)→"either <childOne> or <childTwo>"
OR(childOne, childTwo)→"<childOne> or <childTwo>"
AND(childOne, childTwo)→"<childOne> and <childTwo>"
UnaryOperator
NOT(baseExpressionElement)→"not <baseExpressionElement>"
PointOfTime
ExactTime(time)→"after exact <time.valueString> time units"
Soonest(time)→"after not less than <time.valueString> time units"
NotLaterThan(time)→"after no more than <time.valueString> time units"
BetweenTime(lowerTime, upperTime)→"after between <lowerTime.valueString> and <upperTime.valueString> time units"
LengthOfTime
ExactDuration(duration)→"for exact <duration.valueString> time units"
AtLeast(duration)→"for at least <duration.valueString> time units"
AtMost(duration)→"for at most <duration.valueString> time units"
BetweenDuration(lowerDuration, upperDuration)→"for between <lowerDuration.valueString> and <upperDuration.valueString> time units"
ValueCondition
ExactlyValue(interfaceElement, valueElement)→"<interfaceElement.name> is <valueElement.name>"
AtMostforValue(interfaceElement, valueElement)→"<interfaceElement.name> is at most <valueElement.name>"
AtLeastforValue(interfaceElement, valueElement)→"<interfaceElement.name> is at least <valueElement.name>"
WithinValue(interfaceElement, lowerValue, upperValue)→"<interfaceElement.name> is between <lowerValue.name> and <upperValue.name>"
InterfaceElement→"<InterfaceElement.Name>"

The abstract time unit "time units" is replaced by the time unit that the user selects.

Formulating requirements by means of natural language does not guarantee unambiguous understanding of the statements, since many individual words have several meanings. If ambiguous terms are combined, the ambiguity is multiplied, making understanding very difficult. To produce precise statements and define semantics, mathematics and computer science use logics. These are formal languages. Among the common logics are propositional logic and predicate logic, with which static statements can be formulated. However, embedded systems contain time-critical functionalities, such as the unlocking of the vehicle after an accident. Time aspects cannot be expressed in these logics. For describing logical statements with a temporal reference, there are temporal logics, used, for example, in the proof procedure for absence of error that is called model checking. The most frequently used are Computation Tree Logic (CTL) [CES86] and Linear Time Logic [Pnu77]. However, these can express temporal aspects only qualitatively. Quantitative statements, such as the number of time units until an event occurs, cannot be made. However, it is this type of condition that must be defined for embedded systems.

An example of such a condition is the number of time units after an accident that an airbag must react in. So that quantitative temporal statements can also be produced, additional temporal logics were developed. Real-Time Computation Tree Logic (RTCTL) in [EMSS91] is one of these. This grew out of the CTL logic, which was extended by quantitative constructs. RTCTL is defined via an alphabet $\Sigma$ of atomic statements by the following sentences:

1. Each atomic statement P$\in\Sigma$ is an RTCTL formula. is an RTCTL formula.
2. If p and q are RTCTL formulas, p and q are RTCTL formulas, p$\wedge$q and q$\neg$p are also RTCTL formulas.
3. If p and q are RTCTL formulas, A(p U q), E(p U q) and EX p are also RTCTL formulas.
4. If p and q are RTCTL formulas, and k$\in$N, then A(p $U^{\leq k}$ q) and E(p $U^{\leq k}$ q) are also RTCTL formulas.

The semantics of the first two sentences follows from propositional logic. The definitions of A(p U q), E(p U q) and EX p come from the CTL and state the following: As described above, embedded systems work with discrete time behavior. They are therefore in a specific discrete state at all times. This allows embedded systems to be modeled as state machines, with the execution duration of a transition corresponding to one time unit. Since there can be several successor states for each state, depending on the input value, there is a tree representing all the possible consequences of state transitions. States that occur consecutively are defined by a path in the tree. The formula p U q means that the RTCTL formula p applies until the first occurrence of q. A and E are the generally known "all" and "existential quantors", which define that the formula following them must apply to all paths or at least to one path of a tree. According to the definition of CTL, EX p states that p is true in at least one of the successor states.

The fourth sentence is defined in RTCTL. They extend the formulas A(p U q) und E(p U q) with the temporal component $^{\leq k}$ to form A(p U$^{\leq k}$ q) and E(p U$^{\leq k}$ q). These formulas state that q supersedes p within k state transitions. Thus, q applies after k transitions at the latest, and before that p applies in every state. This expression can be used to make statements on a behavior that occurs after k transitions or earlier. However, the requirements metamodel also contains temporal conditions for representing, for example, "after k or later" transitions or "between a and b" transitions. The above definition is not sufficient for this. So that all the temporal conditions in the requirement metamodel can be expressed, the definition has to be extended with the operators A(p U$^{\sim k}$ q) and E(p U$^{\sim k}$ q) where $\sim \in \{<, \leq, =, \neq, >, \geq\}$, and A(p U$^{[a,b]}$ q) and E(p U$^{[a,b]}$ q) where a,b$\in$ N, a$\leq$b, which follow from [EMSS91]. The restriction k$\in$N states that time is understood as discrete in RTCTL.

Another quantitative temporal logic to mention is TCTL [ACD93], which enables statements to be made by means of timed automata. Timed automata are finite automata extended by clocks to enable temporal aspects to be taken into account. In contrast to RTCTL, TCTL has a continuous time concept. This gives the temporal logic a high flexibility. However, the result of using a continuous time concept is that fulfillability cannot be decided [ACD93], so that as a consequence, it is not possible to detect contradictory requirements. However, it is very helpful for the user to detect contradictions in formulated requirements. One prospective continuation of this invention might be the analysis of requirements whose fulfillability must be decidable.

As described above, embedded software has a fixed time cycle in which it is executed. Thus, using a temporal logic with a discrete time concept is not a restriction. For these reasons, RTCTL is selected as the temporal logic to which the requirement constructs are mapped. In RTCTL, fulfillability is decidable, as was proven in [EMSS91].

Mapping to RTCTL expressions is done inductively. The notation Iff(precondition, expectedReaction) means that the instances of element Iff of the metamodel, with the instances of the elements reached by the precondition and expectedReaction associations, are assigned the semantic that follows it. The elements reached by the associations also have a semantic definition. For example, the associations precondition and expectedReaction are used to reach the elements of BaseExpressionElement type. Concrete instances of this element are AND, OR, XOR, NOT and InterfaceElement, whose semantics are defined. RTCTL formulas finally follow from all definitions.

BaseExpression
   Iff(precondition, expectedReaction)→precondition⇔expectedReaction
   Implies(precondition, expectedReaction)→precondition⇒expectedReaction
   BinaryOperator
   XOR(childOne, childTwo)→(childOne∧¬childTwo)∨(¬childOne∧childTwo)
   OR(childOne, childTwo)→childOne∨childTwo
   AND(childOne, childTwo)→childOne∧childTwo
   UnaryOperator
   NOT(baseExpressionElement)→¬baseExpressionElement The mappings of an InterfaceElement element to PointOfTime and to LengthOfTime cannot be performed independently of one another, since a common time reference is needed. The mappings for an InterfaceElement are therefore performed within its context (InterfaceElement(pointOfTime, lengthOfTime, valueCondition)).

Let t be k$\in$N and V an associated ValueCondition in RTCTL, which is formed as follows:
   ValueCondition
   AtMostforValue(interfaceElement, valueElement)→ interfaceElement$\leq$valueElement
   AtLeastforValue(interfaceElement, valueElement)→ interfaceElement$\geq$valueElement
   ExactlyValue(interfaceElement, valueElement)→ interfaceElement=valueElement
   WithinValue(interfaceElement, lowerValue, upperValue)→ lowerValue$\leq$interfaceElement$\leq$upperValue V is true at the point in time ExactTime(time) for duration ExactDuration(duration)→
A(true U=time V)∧¬E(true U[time,time+duration]¬V)∧¬E(true U>time+durationV)

This expression defines that the associated ValueCondition V always occurs after "time" time units. There must be no point in time between time and time+duration at which the ValueCondition is not fulfilled. Further, the ValueCondition must cease to be true after time+duration.

V is true at the point in time ExactTime(time) for duration AtLeast(duration)→A(true U=time V)∧¬E(true U[time,time+duration]¬V)

This formula differs from the previous one in that the last constraint is not present. This uses the AtLeast element, which states that the ValueCondition must be fulfilled for at least duration time units, so there is no upper bound.

Appendix A contains the definitions of the semantics of all further combinations of PointOfTime and LengthOfTime elements.

Before the user is given an executable test program that is generated from the requirement that he/she created, it is important to tell the user what test steps take place. Otherwise, the situation could occur that the user specifies a requirement and executes the generated test program without knowing exactly what is being tested. In that case it would be difficult to understand test results.

The requirement "If the button 'unlock' on the remote control is pushed, the vehicle is unlocked after 2 seconds" would result in the following test step:
   Set the button 'unlock' on the remote control to pushed.
   Wait 2 seconds.
   Check whether the vehicle is unlocked.

The test specification metamodel containing elements for describing the test steps is presented below. One instance of this metamodel represents a concrete test sequence and is derived automatically from an instance of the requirement metamodel, so that a test specification arises from a concrete requirement. To show how the test specification metamodel fits into the context of the overall concept of requirement-based test generation, FIG. 32 repeats the schematic from FIG. 35 with the metamodels for requirement and test specification added.

Figure 38:
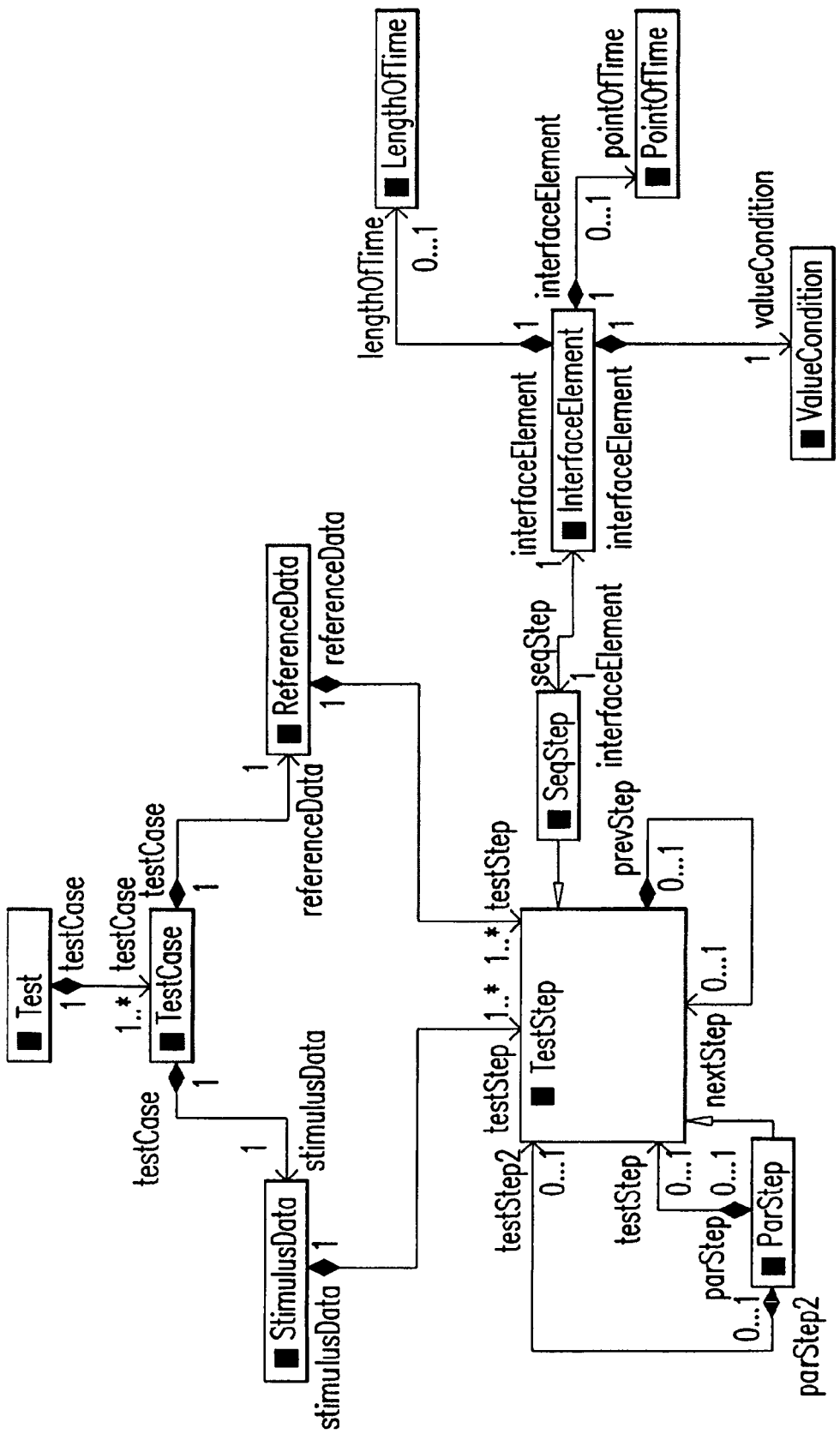
FIG. 38: Excerpt from the test specification metamodel

FIG. 38 shows an excerpt from the test specification metamodel. The basic element of the test specification metamodel is the "Test" element. A test consists of one or more test cases that are modeled by the "TestCase" element. For example, several test cases can be invoked by the "Iff" element of the requirement metamodel. As described above, using this element means that the linguistic expression "If and only if . . . then" is used in the requirement. For a requirement like this to be fulfilled, the following statements must be true: If the precondition occurs, the expected reaction must occur, and if the precondition does not occur, the expected reaction must not occur. These two statements must be tested and in the test specification. They represent two test cases that belong to a test. A TestCase contains the elements "StimulusData" and "ReferenceData", which represent the precondition and the expected reaction. Thus, in the context of the test specification, the terms stimulus part and reference part can be used instead of precondition and expected reaction.

Each stimulus part consists of several test steps that must be executed. The reference part also tests several test steps. A single test step is represented by the abstract element "TestStep". StimulusData and ReferenceData both have an association with a TestStep element that represents the first test step in the stimulus and reference parts. Each TestStep element can in turn have a TestStep element as a successor, resulting in a sequence of test steps. This is implemented by associating the TestStep element with itself, as can be seen in FIG. 38.

Figure 39:
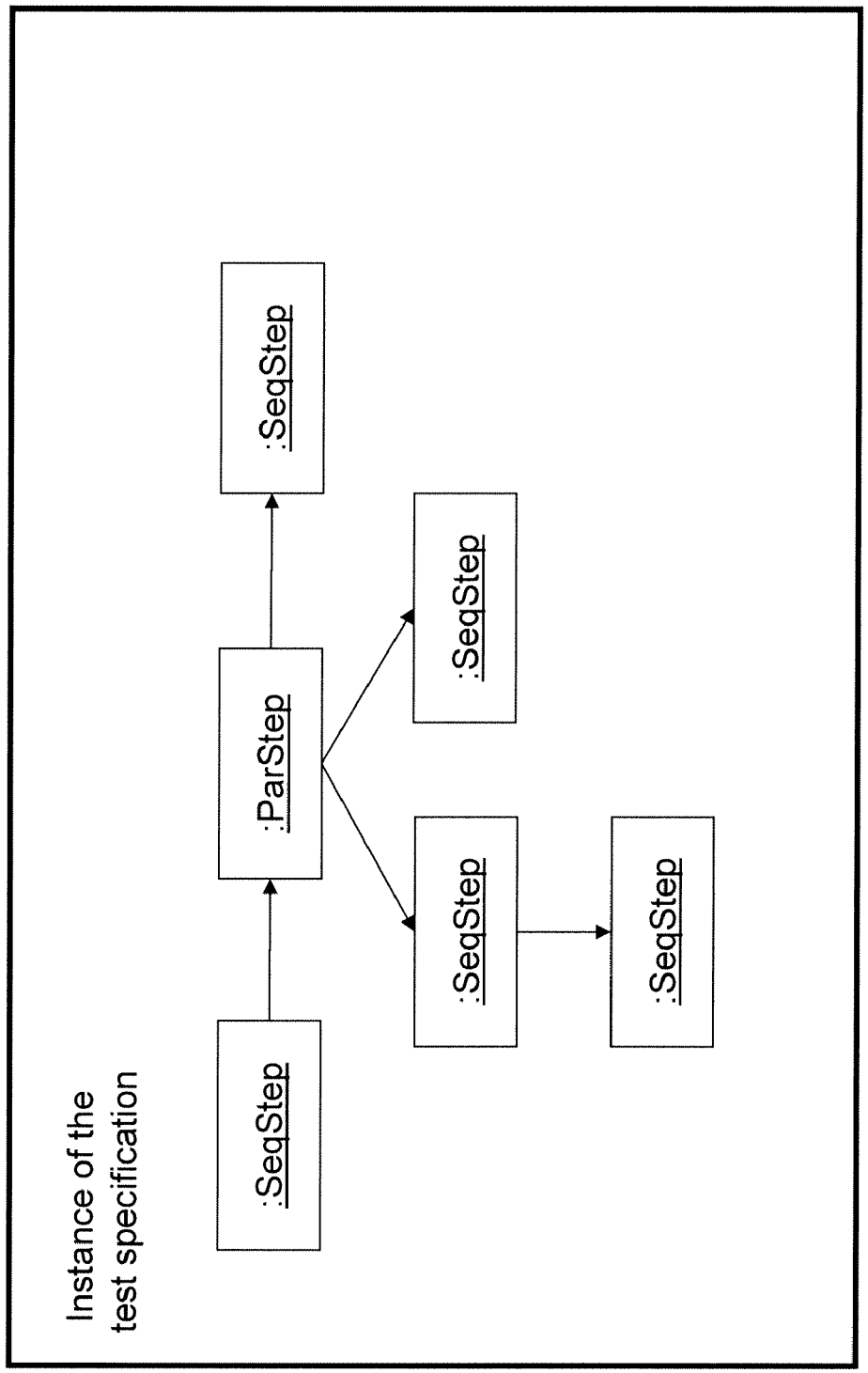
FIG. 39: Test sequence with some test sequences modeled in parallel

An abstract TestStep element is concretized by the elements "ParStep" and "SeqStep". ParStep provides a way of executing two test steps in parallel, since it possesses two TestStep elements. Entire test sequences can also be modeled in parallel. This case arises whenever a TestStep element of a ParStep element has a further TestStep element as a successor. Test sequences like that shown in FIG. 39 can be created in this way.

The SeqStep element represents a single test step. It has an association with exactly one InterfaceElement, whose semantic differs from the InterfaceElement of the requirement metamodel. The InterfaceElement of the test specification is used to model the fact that exactly one input or output is addressed in a test step. In each test step, a value is assigned to an input or output. As in the requirement metamodel, the InterfaceElement possesses the elements ValueElement, PointOfTime and LengthOfTime. The InterfaceElement of the requirement metamodel also specifies an assignment between an input or output and a value. In the precondition, such an assignment meant "If input==value, then" and was therefore a kind of query whether this assignment is true. In the stimulus part of the test specification, an assignment defines the instruction to set "input=value", so that the system's reaction can then be tested. This is an assignment. The temporal conditions in the test specification metamodel are equivalent to the temporal conditions in the requirement metamodel.

The semantics of the test specification are defined by mapping it to the test implementation, since test implementations themselves have semantics. For example, the semantics of test sequences of executable tests in the AutomationDesk test automation tool are defined implicitly by the implementation of that test automation tool.

The test steps should be presented to the user in the form of natural language. Although some elements of the metamodel of the test specification are identical to elements of the requirement metamodel, the sentence fragments to which the elements are mapped are different, since the semantics of the elements are different. This section deals with how metamodel elements of the test specification are mapped to sentence fragments.

In the stimulus part, inputs and outputs are assigned values, and in the reference part, there has to be a check on whether the inputs and outputs possess specific values. Since these two processes are different, the InterfaceElement element is mapped to natural language in two different ways, depending on whether it belongs to a StimulusData element or a ReferenceData element. The notation InterfaceElement(ExactlyValue, valueElement) means that an InterfaceElement with the ValueCondition ExactlyValue assigned to it and the associated ValueElement valueElement is mapped to the sentence fragment that follows. The expression <InterfaceElement.name> indicates the name of the InterfaceElement element, which was specified by the user.

StimulusData: InterfaceElement
  InterfaceElement(ExactlyValue, valueElement)→"Set <InterfaceElement.name> to <valueElement.name>"
  InterfaceElement(atMostforValue, valueElement)→"Set <InterfaceElement.name> to at most <valueElement.name>"
  InterfaceElement(atLeastforValue, valueElement)→"Set <InterfaceElement.name> to at least <valueElement.name>"
  InterfaceElement(withinValue, lowerValue, upperValue)→ "Set <InterfaceElement.name> to between <lowerValue.name> and <upperValue.name>"

ReferenceData: InterfaceElement
  InterfaceElement(ExactlyValue, valueElement)→"Check if <InterfaceElement.name> is <valueElement.name>"
  InterfaceElement(atMostforValue, valueElement)→ "Check if <InterfaceElement.name> is at most <valueElement.name>"
  InterfaceElement(atLeastforValue, valueElement)→ "Check if <InterfaceElement.name> is as least <valueElement.name>"
  InterfaceElement(withinValue, lowerValue, upperValue)→ "Check if <InterfaceElement.name> is between <lowerValue.name> and <upperValue.name>"

The temporal condition PointOfTime is mapped to sentence fragments as follows:
PointOfTime
  ExactTime(time)→"Wait exact <time.valueString> time units"
  Soonest(time)→"Wait not less than <time.valueString> time units"
  NotLaterThan(time)→"Wait no more than <time.valueString> time units"
  BetweenTime(lowerTime, upperTime)→"Wait between <lowerTime.valueString> and <upperTime.valueString> time units"

Figure 40:
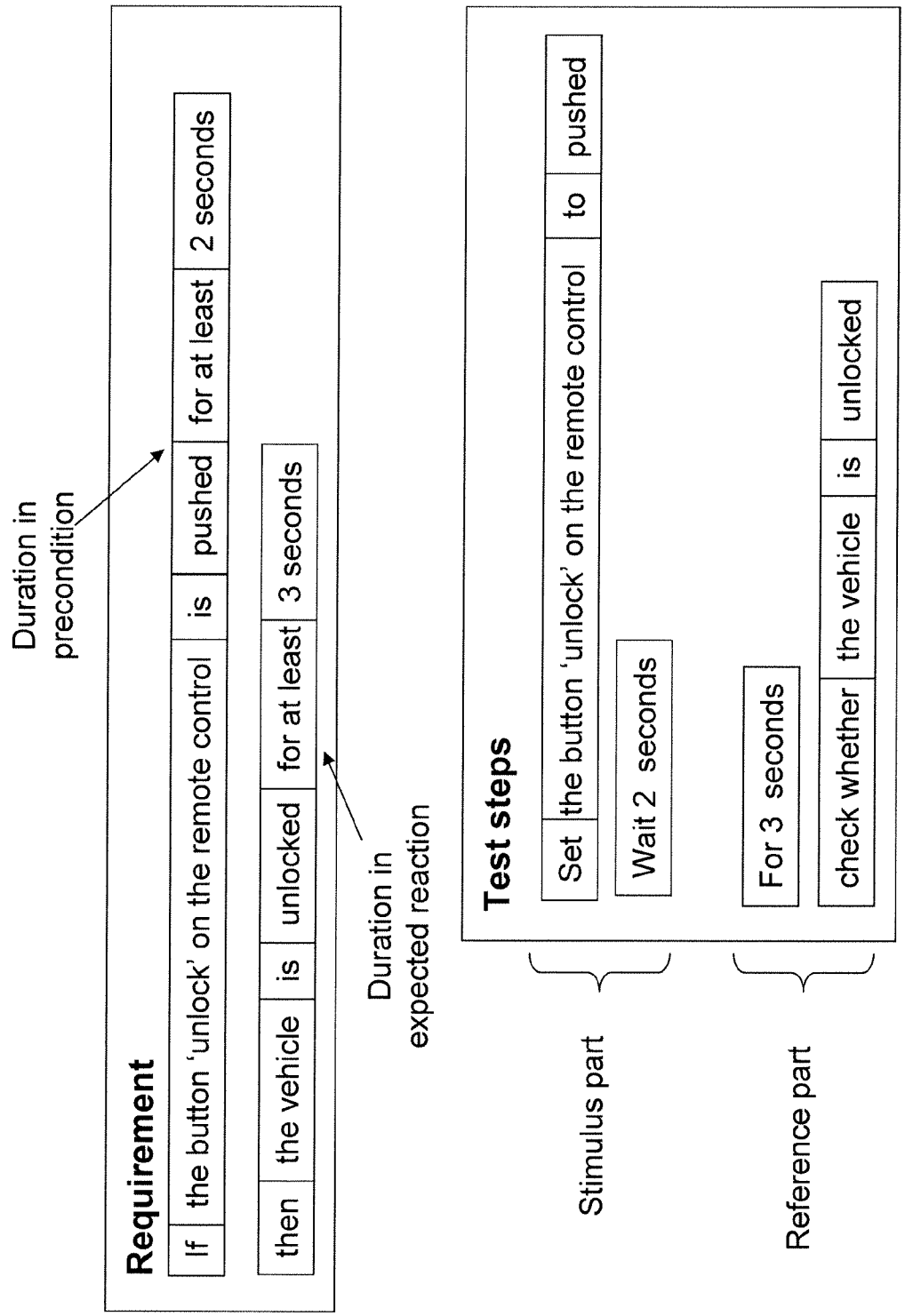
FIG. 40: Mapping the duration to different language constructs

In the test specification, the temporal condition LengthOfTime is given different meanings in the stimulus and reference parts. The duration specification in the stimulus part states that the assignment of a state to an interface object must be provided for the period of time defined by the duration. The reference part has to check whether the assignment of the described state to the interface object in the reference part is true for the specified duration. These two situations involving duration represent two different procedures in the test specification. It therefore makes sense to present these two procedures to the user in different ways in natural language. FIG. 40 shows a requirement with a duration "for at least 2 seconds" in the precondition and a duration "for at least 3 seconds" in the expected reaction. Both duration specifications have the same linguistic representation in the requirement. In the test specification, these duration specifications are represented by different sentence fragments. In the stimulus part, the duration is represented by the sentence "wait 2 seconds", and in the reference part by the expression "for 3 seconds", since the subsequent check instruction must be performed for 3 seconds.

In the stimulus part, the user must be shown that after assignment of the state to the interface object, the process waits for the specified duration. This ensures that the assignment is true for the specified duration.

StimulusData: LengthOfTime
ExactlyDuration(duration)→"Wait for exact <duration.valueString> time units"
AtLeast(duration)→"Wait for at least <duration.valueString> time units"
AtMost(duration)→"Wait for at most <duration.valueString> time units"
BetweenDuration(lowerDuration, upperDuration)→"Wait for between <lowerDuration.valueString> and <upperDuration.valueString> time units"

In the reference part, the specified duration determines for how long the check on the defined assignment of state and interface object must be performed. The duration is therefore given a different position in the sentence order in this case. The duration is placed before the assignment of state and interface object.

ReferenceData: LengthOfTime
ExactlyDuration(duration)→"For exact <duration.valueString> time units"
AtLeast(duration)→"For at least <duration.valueString> time units"
AtMost(duration)→"For at most <duration.valueString> time units"
BetweenDuration(lowerDuration, upperDuration)→"For between <lowerDuration.valueString> and <upperDuration.valueString> time units"

To assign these assignments of the InterfaceElement and ValueElement elements with the associated temporal conditions to the test steps and to structure the test steps to make a test sequences of an entire test, the following mappings apply:

Test(testCase1, . . . , testCaseN)→TestCase: "<testCase1> . . . TestCase: <testCaseN>"
TestCase(stimulusData, referenceData)→"<stimulusData> <referenceData>"
StimulusData(testStep)→"<testStep>"
ReferenceData(testStep)→"<testStep>"
TestStep
  SeqStep(interfaceElement)→"<interfaceElement>"
  ParStep(nextStepOne, nextStepTwo)→"parallel: first parallel step: <nextStepOne> <parStep.operator> second parallel step: <nextStepTwo>"

The elements, that are available via the requirement metamodel for formulating a requirement, were already described. The test specification metamodel contains elements for describing the individual test steps in a test sequence. A concrete requirement in the form of an instance of the requirement metamodel must now be transformed into a concrete test specification on the basis of the test specification metamodel. To do so, rules must be defined for each element of the requirement metamodel to govern how it is mapped to one or more elements of the test specification metamodel. Thus, the transformation rules describe what test steps are invoked by the elements of a concrete requirement, thereby determining the meanings of the requirement elements for the test sequence. Since a transformation is performed on an instance of the requirement metamodel, in which no instances of abstract classes can occur, no mapping rules are required for the abstract elements.

Figure 41:
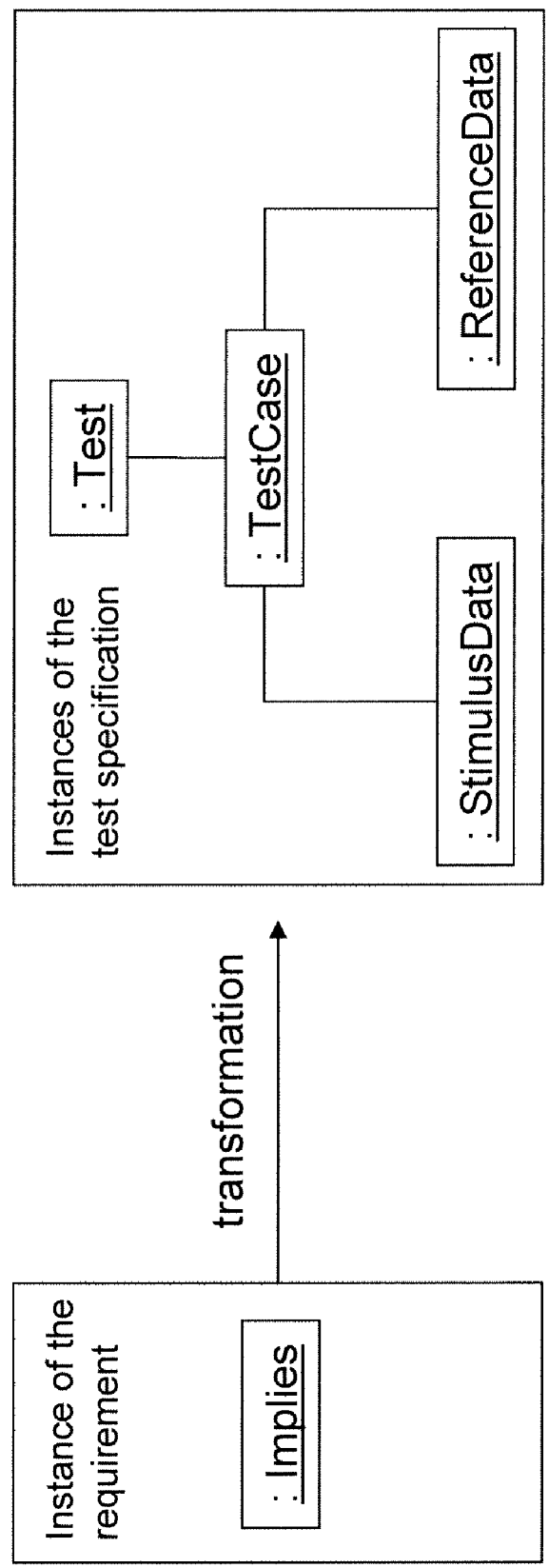
FIG. 41: Transformation of an Implies element

As shown in FIG. 41, the Implies requirement element is mapped to the following element structure in the test specification: A Test element has an association with exactly one TestCase element. The TestCase element has a StimulusData element and a ReferenceData element.

Figure 42:
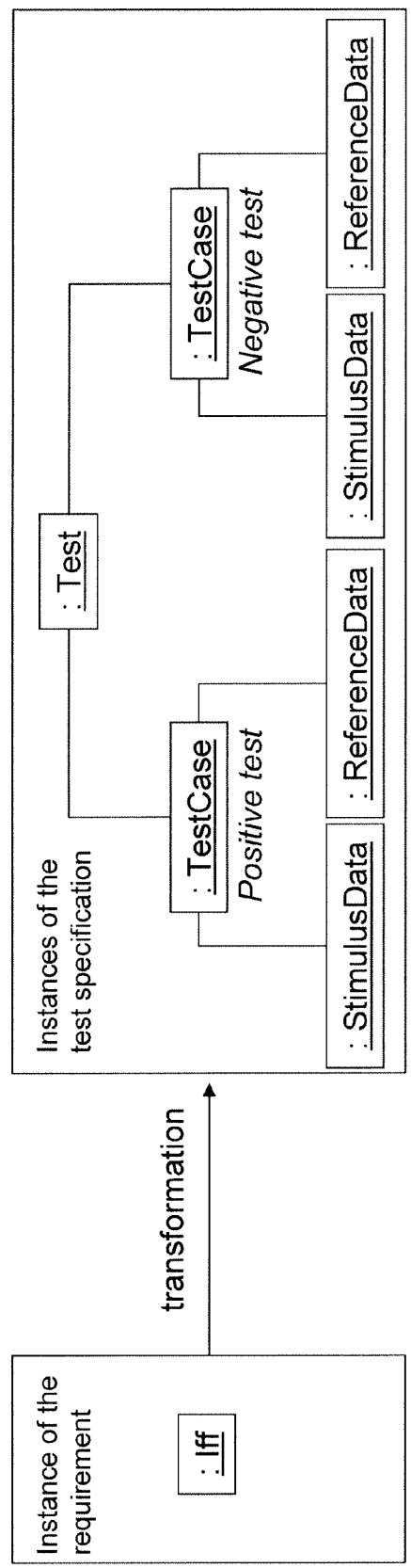
FIG. 42: Transformation of an Iff element

The Iff element is mapped to almost the same structure. However, since two test cases are derived from this element, as described above, the Test element has two TestCase elements, each with one StimulusData element and one ReferenceData element. One of the test cases is turned into a negative test by the assignment of a negation via an attribute of each single InterfaceElement element. FIG. 42 shows this transformation step.

Figure 43:
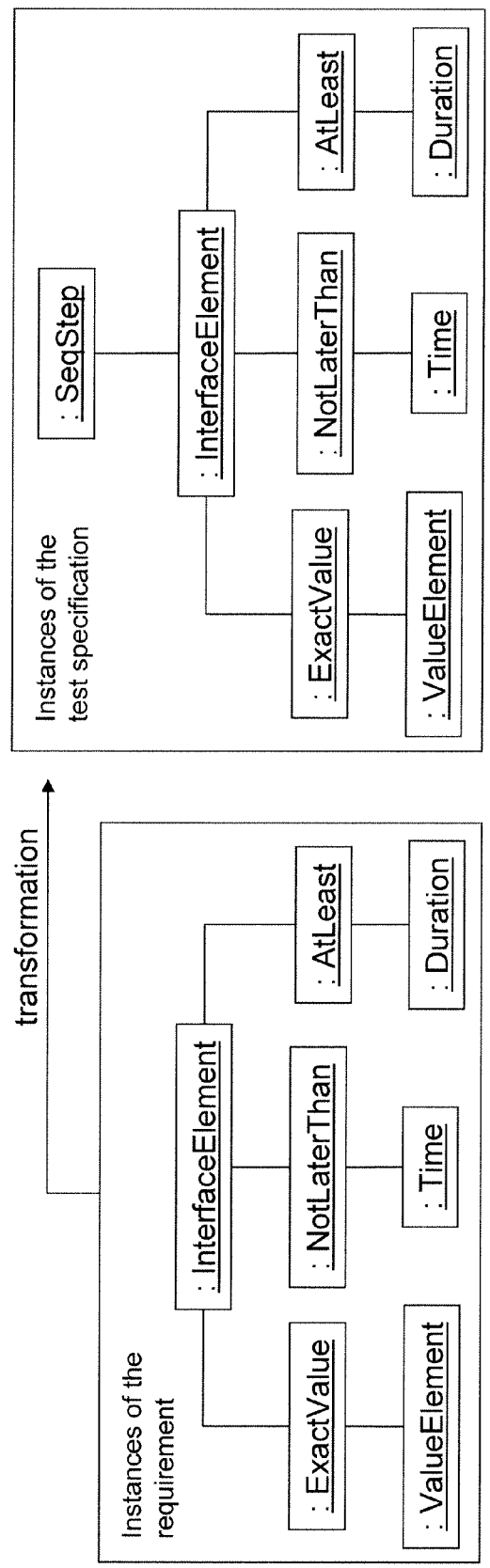
FIG. 43: Transformation of an InterfaceElement element

An InterfaceElement of a requirement is mapped to a SeqStep element and to an InterfaceElement of the test specification connected with that. This InterfaceElement has exactly the same elements as the InterfaceElement of a requirement. These include, for example, a ValueCondition. FIG. 43 shows the mapping of an InterfaceElement element. The transformation rules for operators are described below.

Figure 44:
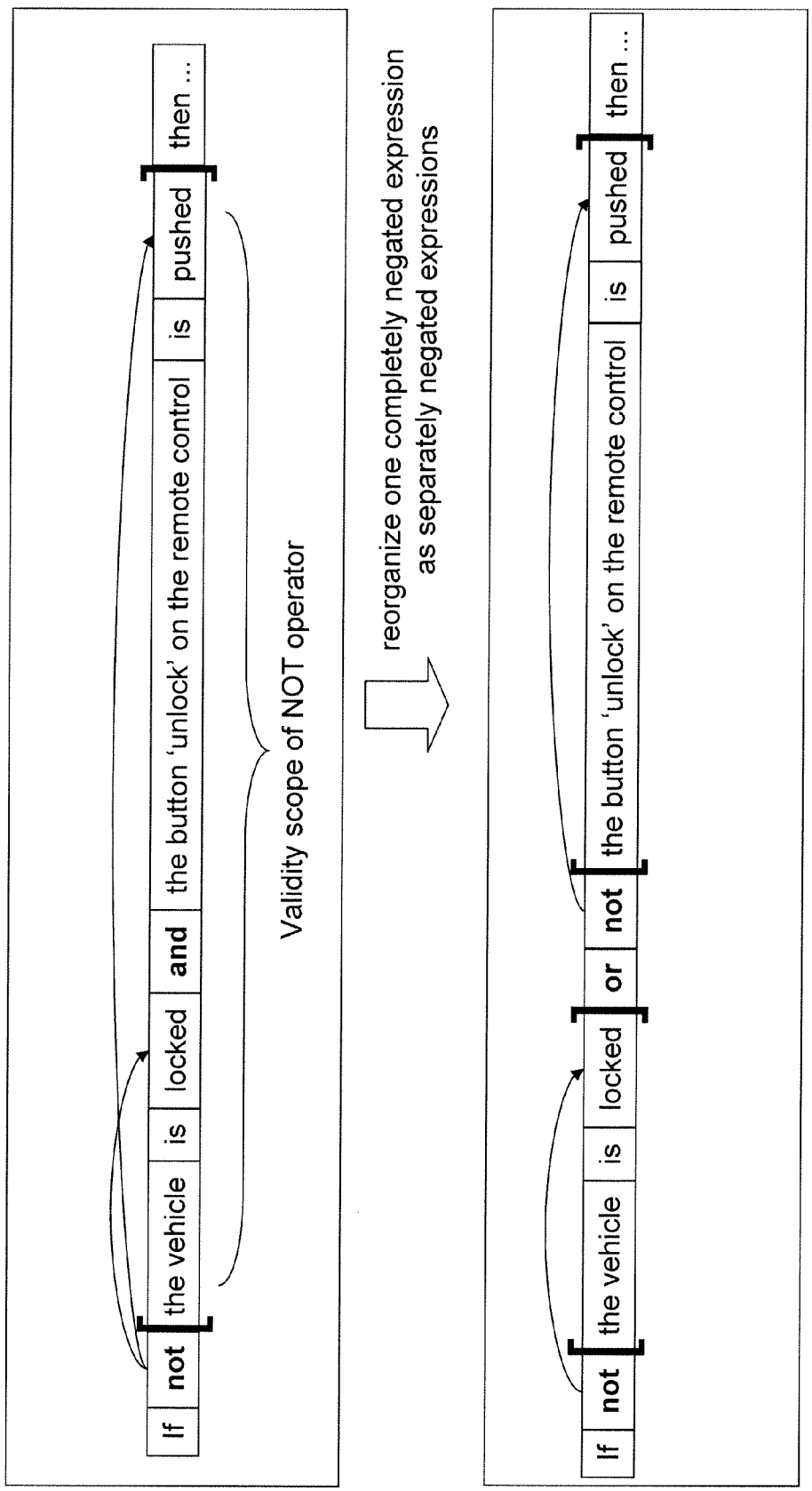
FIG. 44: Converting an expression negated as a whole into separately negated expressions

The NOT operator can negate the state that is assigned to an interface object. Further, this operator can also negate entire expressions that are connected by a binary operator. Since all assignments of a state to an interface object form a separate test step in a test specification, before the transformation, the negation of an entire expression in a requirement must be resolved to produce separately negated conditions which are transformed into separately negated test steps. For each InterfaceElement, NOT operators are used to determine whether the state belonging to that InterfaceElement must be negated or not. FIG. 44 represents the transformation of an entire negated expression into separately negated expressions. The laws of propositional logic [Sch00] are used for this, for example, de Morgan's laws, which define the negations of conjunction and disjunction as follows:

$$\text{not } (a \text{ and } b) = (\text{not } a) \text{ or } (\text{not } b)$$

$$\text{not } (a \text{ or } b) = (\text{not } a) \text{ and } (\text{not } b)$$

In the example in FIG. 44, transformation of the entire negated expression into individually negated expressions turns the "and" into "or".

Figure 45:
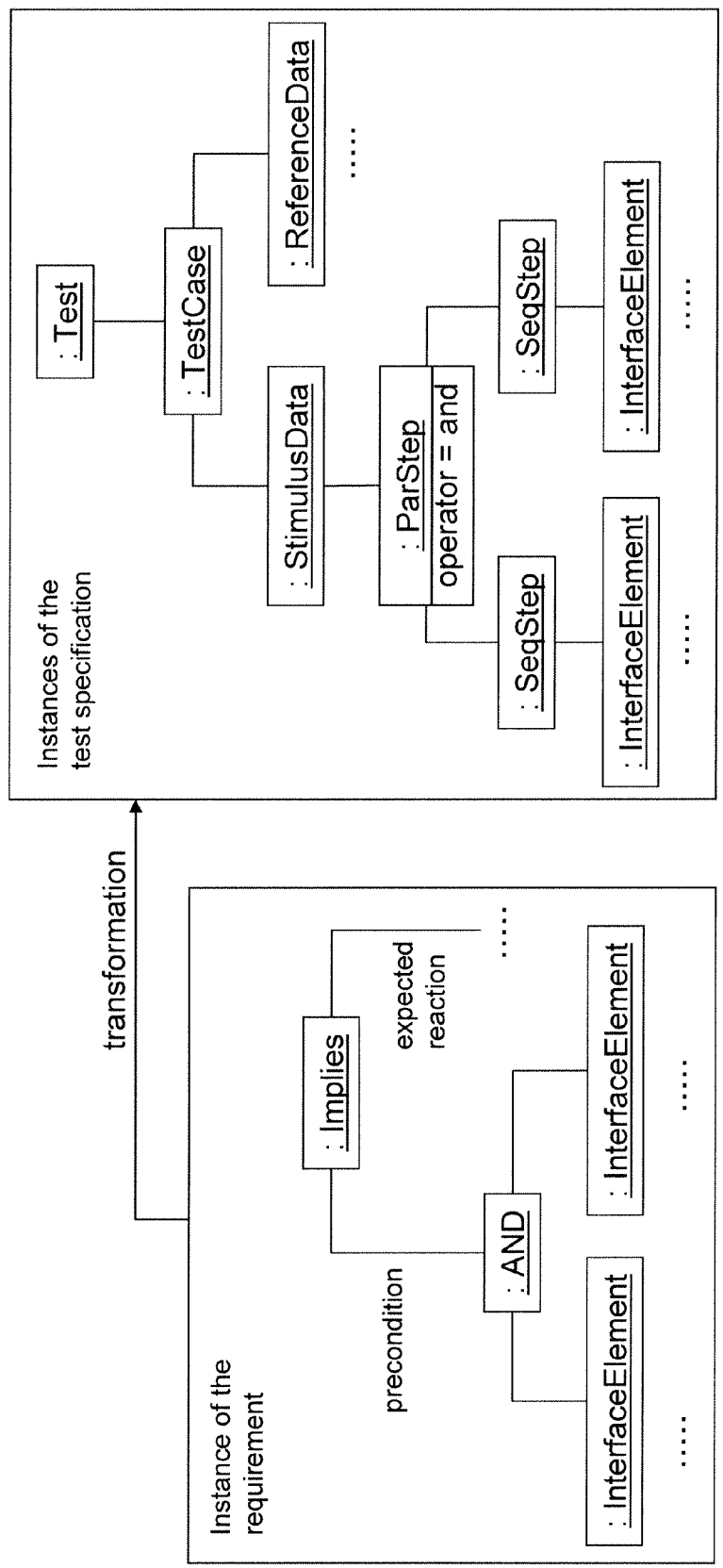
FIG. 45: Transformation of a binary operator

The occurrence of binary operators in a requirement causes the creation of a ParStep element in a test specification, that stores the type of the binary operator in an attribute. This turns the test specification statements that are linked by a binary operator into test steps or test step sequences that must be executed in parallel. FIG. 45 shows the transformation of the instance of an AND element of the requirement metamodel. The result is an instance of a ParStep element of the metamodel of the test specification, which stores the type of the operator as an attribute. Even if all binary operators are mapped to ParStep elements, the type of the operator must not be forgotten, since every operator has a different semantic and therefore invokes different processes in the executable test.

According to the laws of propositional logic, the operator XOR (EXCLUSIVE OR) can be expressed by the operators AND, OR and NOT, so that the XOR element itself is not transformed.

The requirement metamodel provides a very flexible description of temporal aspects via elements such as "AtMost" and "AtLeast". For example, the AtMost element describes only the upper bound of a time duration, so that the concrete duration is not yet known from this specification. This provides the freedom to execute tests with several values. However, a time specification like this is not sufficient for executing a concrete test. For test execution, it must be defined exactly when an input or output is to be given a value, since these assignments in the stimulus part are established under concrete temporal conditions, in order to test the reaction of the test object. There must therefore be an exact specification of the temporal condition somewhere between requirement creation and concrete test execution in the overall sequence. The question therefore arises of when the time specifications must be concretized. The missing items of information for executing a concrete test are called degrees of freedom.

One way of concretizing the temporal conditions consists in offering users a test specification with a functionality that they can use to complete the temporal conditions of the test specification with exactly specified time specifications, thereby resolving the degrees of freedom.

However, with this approach, flexibility is lost at an early stage of the sequence between requirement and test. The person executing the test may not be the same person who creates the requirement and is given the test specification. The flexible information can be lost in this way, so that only a single test can be executed. An example is shown below.

A requirement can be seen in FIG. 46. The test cases derived from it cannot be executed until the degrees of freedom are resolved. There has to be a definition stating whether the button 'unlock' on the remote control must be pushed for 2 or 3 seconds or perhaps much longer, so that the precondition can be set during the test. The test steps in FIG. 46 use the expressions "2+how many seconds" and "3−how many seconds" to show the degrees of freedom which can be specified more precisely. Tests are often executed with different values. If a temporal condition is fixed at a concrete value too early, only the fixed value can be used for testing.

Further, the exact time specifications may not be known to the user at the time of creating the test specification, so that he/she is not able to resolve the degrees of freedom.

On these grounds, the specification of the exact temporal conditions is shifted further back in the process leading from requirement to test, so that flexibility is preserved longer. Thus, the test specification metamodel contains the same elements for defining points in time and time durations as the requirement metamodel.

Since the user can use an InterfaceElement an arbitrary number of times in a requirement, assigning to it different elements of ValueElement type at different times, it can happen that the user defines inconsistent requirements. The requirement in FIG. 47 contains a precondition in which the speed InterfaceElement must assume the values "20" and "30 km/h" at different times. The time specifications for the two state assignments are defined as intervals that overlap. The overlap in the time intervals specified for assigning different values to an InterfaceElement can produce an inconsistent requirement.

To ensure that the requirement is not inconsistent before a concrete test is generated, an algorithm can be used to test for inconsistencies. One example is the backtracking algorithm [CLRS01], which attempts step by step to produce a complete solution from a partial solution that was obtained. Either the algorithm finds a solution if one exists, or there is no solution to the problem. An inconsistency test on requirements using the backtracking algorithm was tried out. If the backtracking algorithm does not find a solution, the requirement is inconsistent. The backtracking algorithm is only a simple example, as it can have an exponential execution time. If an inconsistency test had to be performed on the prototype for the user, a more efficient algorithm would have to be developed.

However, some fundamental assumptions would have to be made for computing the detection of inconsistencies in this way. For example, if "at most 2 seconds" was specified as the duration in the requirement, the concrete time duration to be inserted in the computation would have to be defined. Thus, the degrees of freedom would have to be resolved beforehand. In addition, the temporal conditions for every assignment of a ValueElement to an InterfaceElement would have to be defined. However, since the elements for specifying temporal conditions were modeled as optional elements, as described above, time specifications do not necessarily exist. For example, reactive tests first wait for an event and then test whether a further event occurs in reaction to it. Since it is not known when the event that the test is waiting for will occur, this cannot be included in testing for the inconsistency of the requirement. This shows that such a test of inconsistency is not helpful at this point in time and like the resolution of degrees of freedom, it is shift further back in the chain leading from requirement to concrete test.

The test can simply be executed optimistically by executing its test instructions in parallel. Test steps invoke accesses to variables of the test object. If multiple test steps being executed in parallel attempt to access a variable simultaneously, the test tool aborts the test. Inconsistent instructions are therefore detected during run time.

Figure 48:
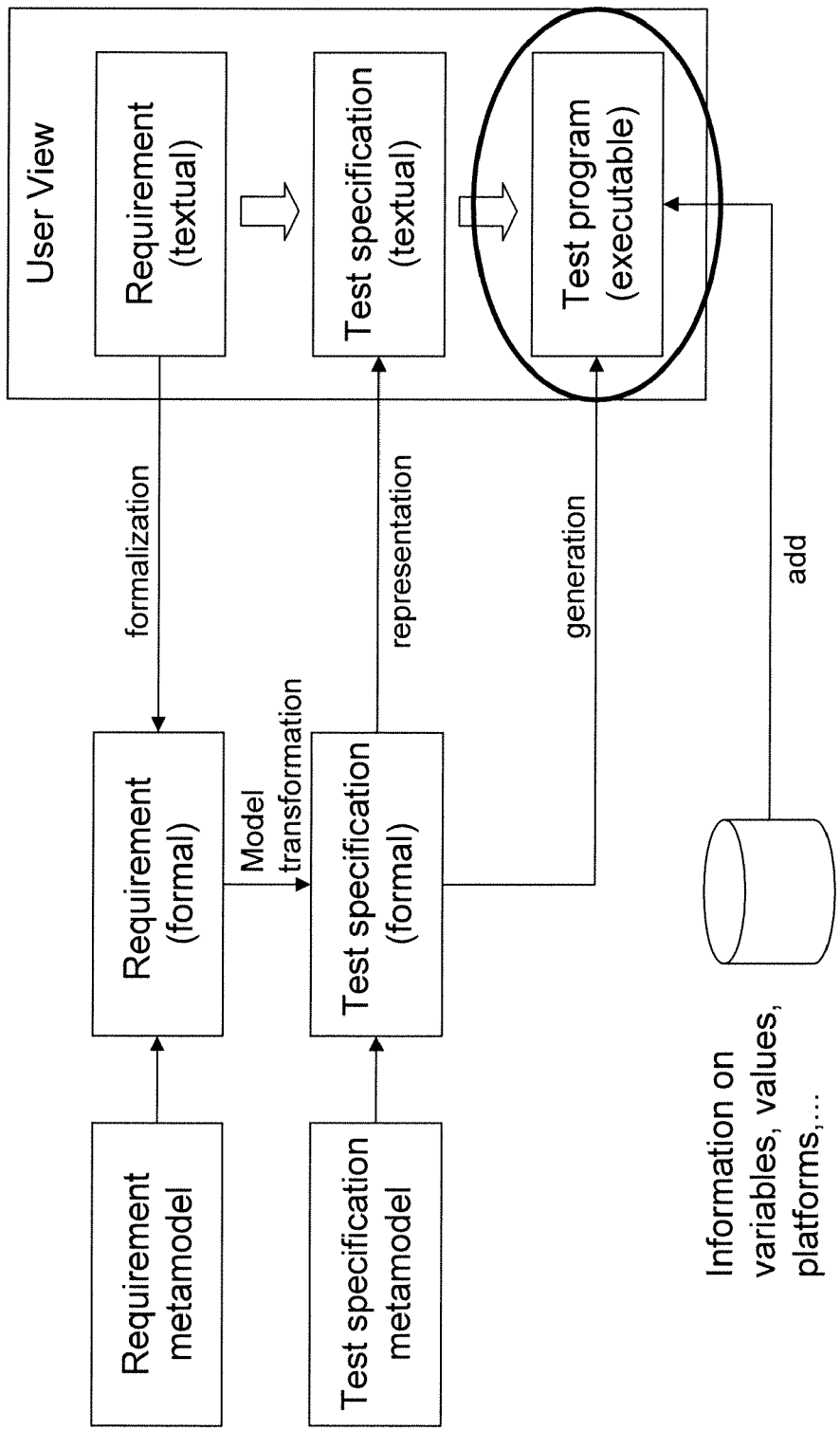
FIG. 48: Test implementation in the context of the concept

Testing a test object requires an executable test program, which is called the test implementation below. FIG. 48 shows the test implementation in the context of the overall concept of this invention.

The requirement initially describes which state is assigned to which interface object. The test specification describes the assignment of interface object and state in the individual steps of a test.

Figure 36:
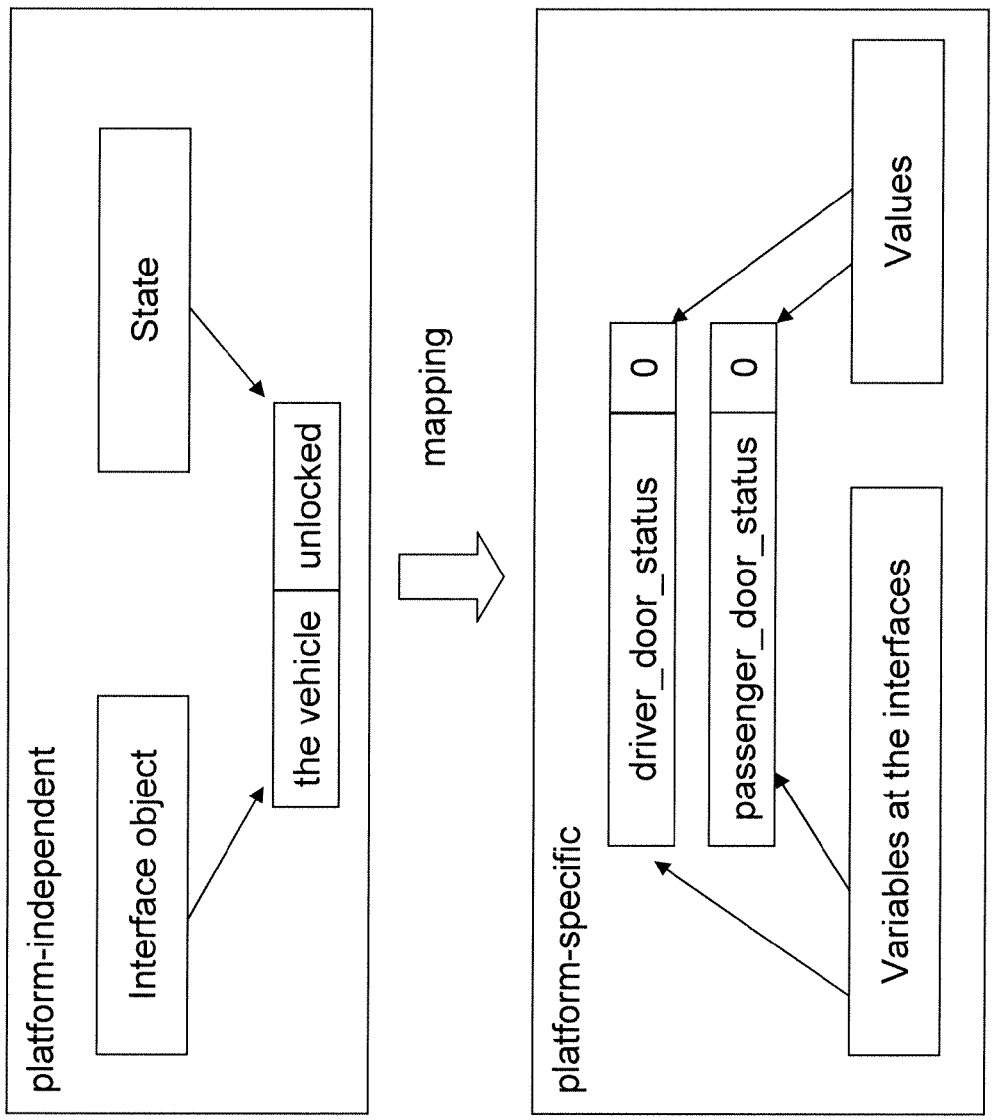
FIG. 36: Mapping a platform-independent interface object to several platform-specific variables
Figure 37:
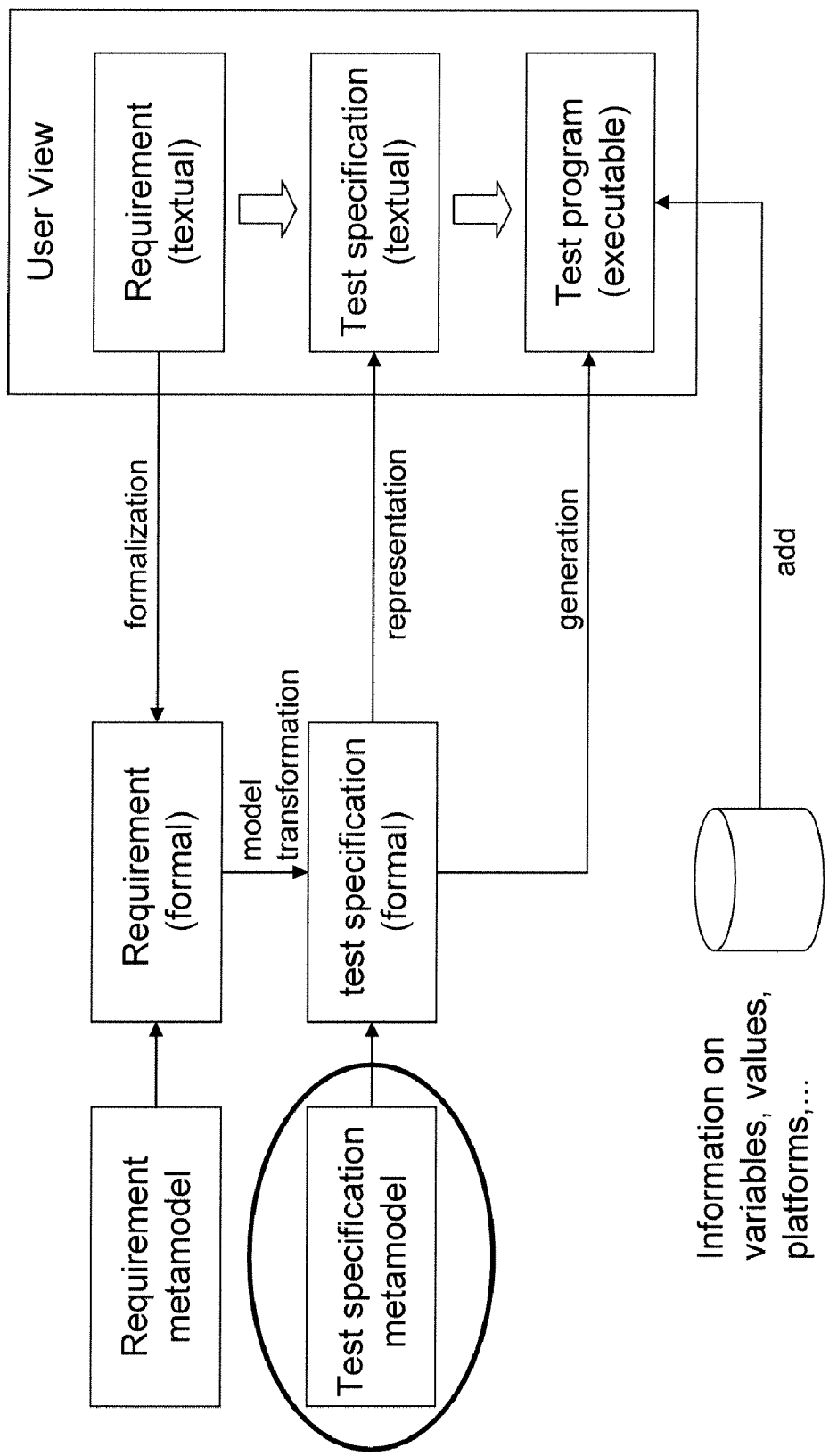
FIG. 37: Test specification metamodel in the context of the overall

As described above, the execution of a test consists in applying values to the inputs of the test object and reading out the values at its outputs. The values that are read are compared with the expected values. To generate an executable test, the interface objects must be mapped to the variables of the test object. Mapping of states to concrete values is also required. The relationship between interface object, variable, state, and value was shown in FIG. 19. Each test platform can describe the variables of the test object and its values in different ways. An interface object used in the test specification can be mapped to exactly one variable in the test platform. However, it is also possible for the interface object to expresses a situation that is implemented as several variables in the test platform. This results in one interface object being mapped to several variables. This case is shown in FIG. 36.

The test tool used can provide functionality for the user to map interface objects and states to the variables and values of the test platform. Mapping requires knowledge of which interface objects and states must be assigned to which variables and values in the test object.

All further elements of the test specification, such as the temporal conditions or the ParStep element for parallel execution of test steps, must be mapped to elements provided by the test tool in order to create an executable test sequence in the test tool. As a rule, test tools have elements for modeling temporal conditions and parallelism, among others.

As described above, temporal conditions can have degrees of freedom that arise from specifications such as "at least 500 milliseconds". However, exact time specifications must be defined in the test implementation so that concrete instructions can be executed. Degrees of freedom must therefore be resolved. As shown above, to preserve flexibility this concretization of temporal conditions must be performed as late as possible in the chain leading from requirement to test implementation. The degrees of freedom are therefore still retained in the test specification, so their resolution must be performed in the test implementation step. The greatest possible flexibility can be achieved by using parameters in the test implementation to represent temporal conditions that have degrees of freedom. The person running the test must be able to set the value of such a parameter. This provides a way of executing the test with different parameter inputs and therefore with different concrete temporal conditions, resulting in test execution with several test cases.

Figure 49:
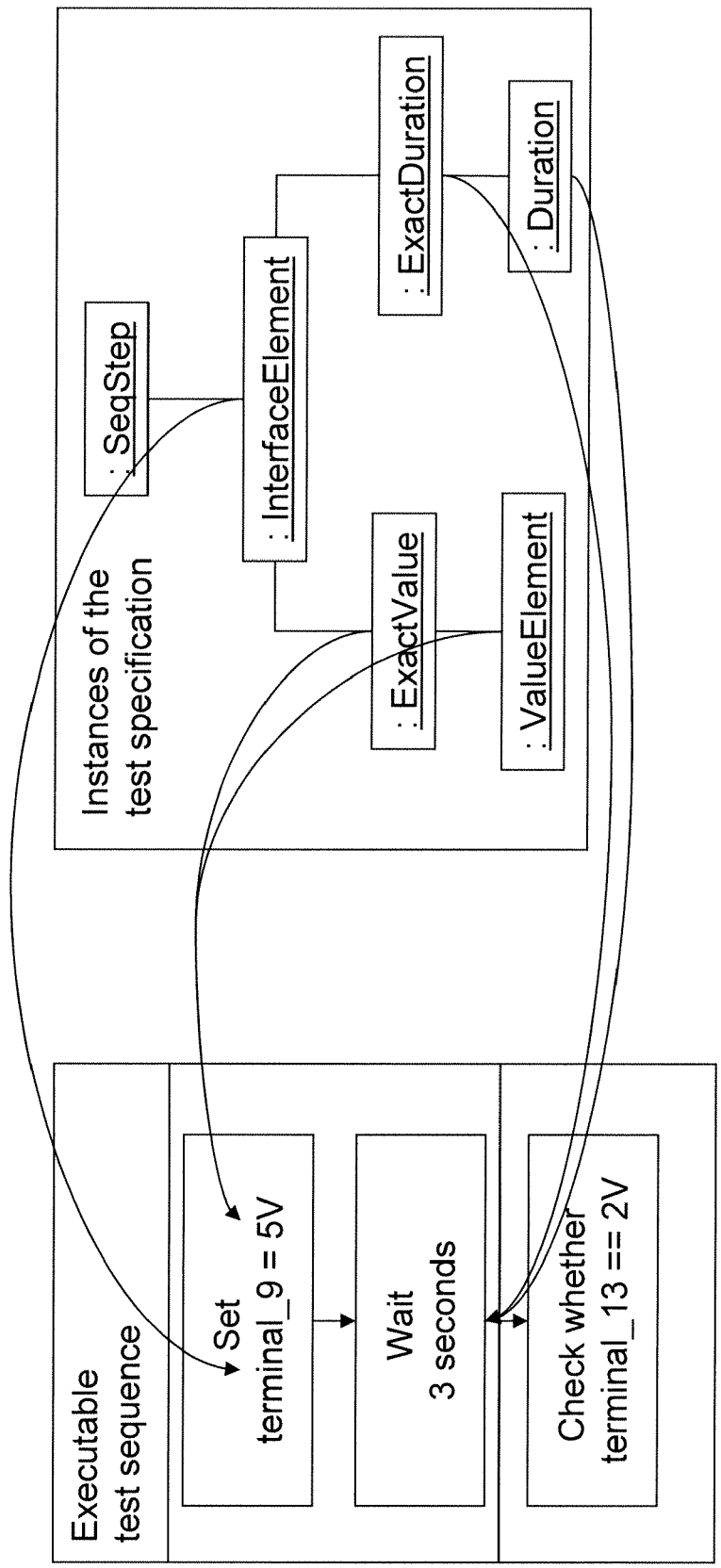
FIG. 49: Mapping instances of the test specification to test steps of an executable test
Figure 50:
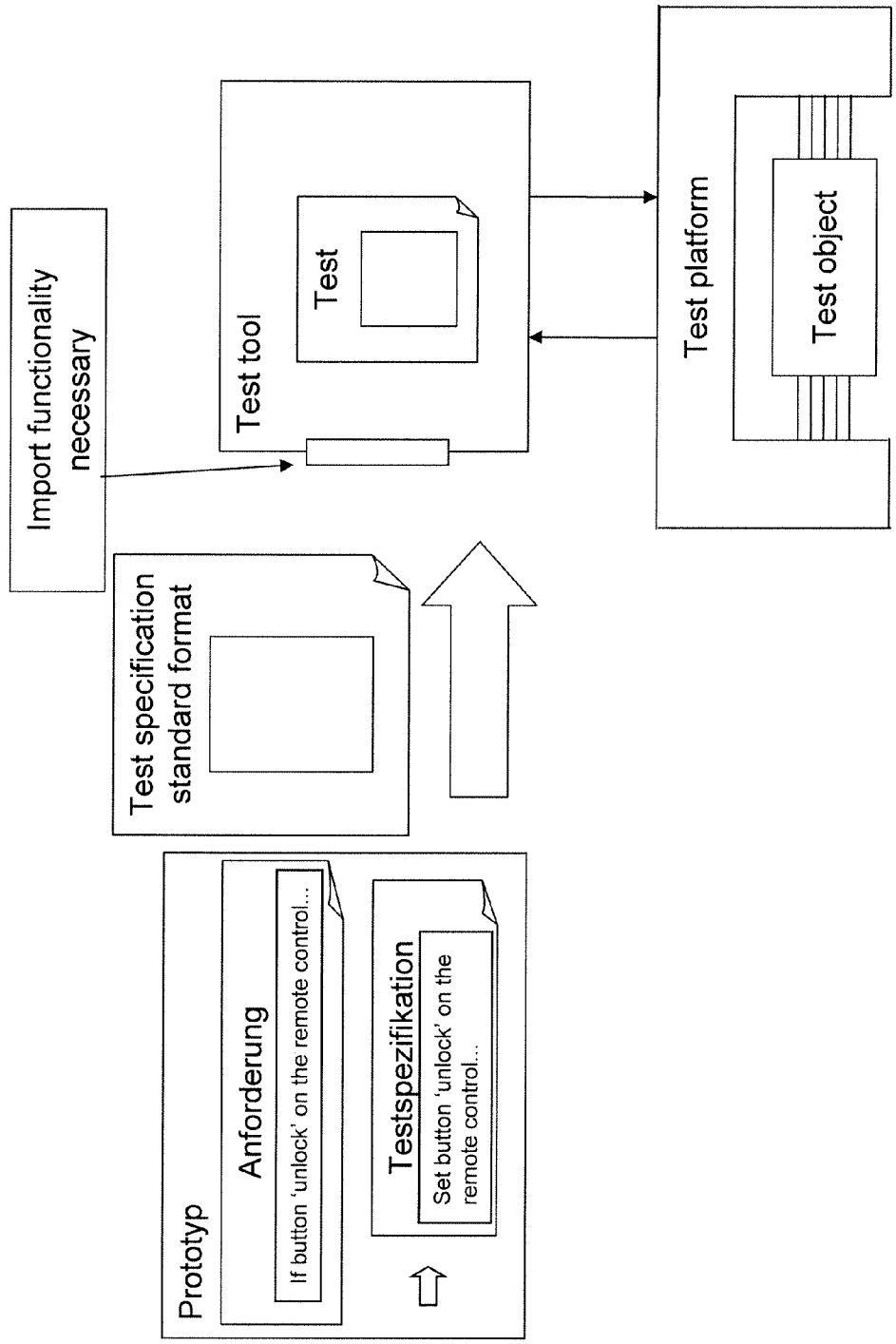
FIG. 50: From test specification to test implementation
Figure 51:
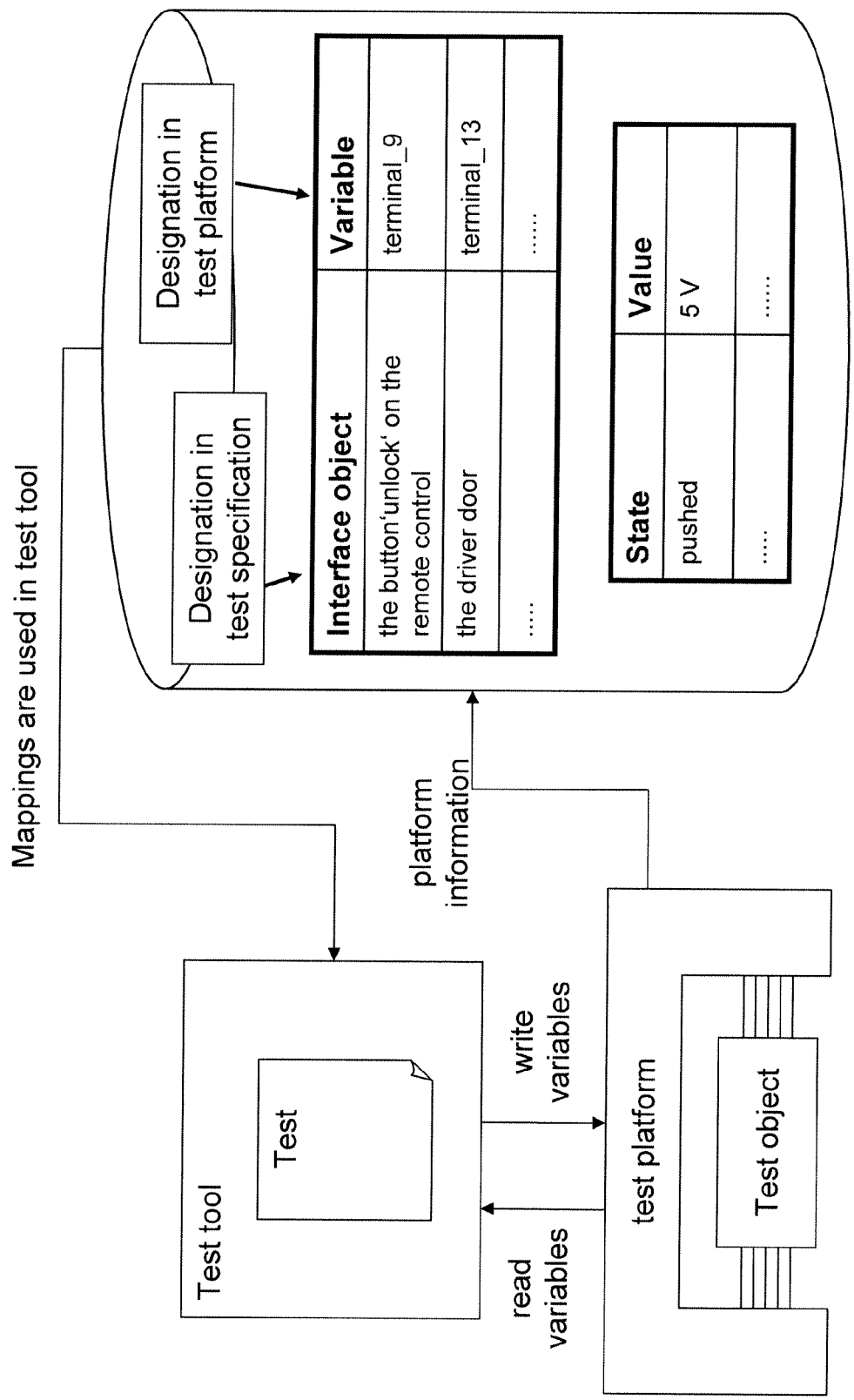
FIG. 51: Mapping interface object and state from the test specification to variable and value in the test platform

FIG. 49 shows an executable test sequence. The first two test steps result from the instances of a test specification shown on the right. An assignment with the ExactlyValue, ValueCondition and the ValueElement is created from the InterfaceElement, and a wait instruction is generated from the duration. This mapping process can be automated by extending a test tool by an import functionality that would implement the mapping of test specification elements to the tool-specific test elements. Standardizing a format for a test specification would be an important step. Every test tool could then be extended by import functionality for the standard format and would have to implement only one mapping of the standardized test specification elements to tool-specific elements. Without such standardization, all tools that provide a test specification as output would use a different format. A test tool would need separate import functionality for each format. All formats that were not supported by a test tool could not be imported, and the consequence would be manual processing. A standardized format for test specification is a prospect for the future. FIG. 50 shows the entire chain from a requirement to a test implementation which would be almost completely automated by a standardized test specification. The information on which interface objects are mapped to which variables, and which states must represent which values, will still have to be added manually. This information could be stored in tables, for example, as shown in FIG. 51.

The implementation for mapping a test specification to a test implementation will be shown below, using the AutomationDesk test tool as an example.

This section presented the conception of metamodels of requirement and test specification, along with the transformation rules by which a test specification can be generated from a requirement. The mapping of a test specification to a test implementation was also presented. Since the most important criterion for assessing software quality is the number of customer requirements that were fulfilled, the requirement-based tests created by means of this approach play an important role in quality assurance. The cost of test creation is reduced by automation.

The requirement-based test generation approach presented in this invention is based on natural language, to allow users to create their requirements intuitively. At the same time, using a vocabulary that is defined by the requirement metamodel means that requirements can be machine-processed. Tests can therefore be created from these requirements. Since the requirement metamodel provides a way of specifying temporal conditions in requirements, the properties of embedded systems can be described very precisely. The correct behavior of embedded systems is frequently dependent on temporal conditions, so that time aspects need to be modeled in order to create complete requirements. It was demonstrated that every approach existing to date lacks at least one of the properties described here.

Generating test steps from a requirement means that the executable test that is then created can be understood by the user. The test specification containing these test steps was designed to be not editable, so that no information can be changed or refined. The reason for this is that an editable test specification would cause inconsistency between the requirement and the test specification. The test specification should describe the test steps that are necessary for testing the requirement from which it was generated. If a test had to be modified, perhaps so that additional tests could be performed independently of a requirement, it would be useful to create further test specifications directly, and to create executable test programs from those. A further concept that provides a way of creating test specifications independently of a requirement could be evolved in a future project.

A prototype that implements the concepts presented here, demonstrating the potential for practical use, is described below.

As part of the work on this invention, a prototype for automatically generating tests from requirements was developed that implements the concept presented above. The prototype provides a graphical user interface for formulating requirements from the vocabulary presented above. The requirement is presented to the user in the form of natural language, with an instance of the metamodel for defining the requirement running in the background. To show the user what must be tested according to his/her requirement, the requirement model is mapped to an instance of the test specification metamodel. This test specification appears on the user interface, also in the form of natural language. To complete the chain leading from requirement to concrete test, an executable test, which can be executed in a test tool, is generated from the test specification. The AutomationDesk test tool is presented as an example, after which the process leading from a test specification to a test sequence in AutomationDesk is described.

The prototype was created as a Java application in the Eclipse development environment. The Java programming language was chosen because of its platform independence. This has the advantage that the execution of developed Java applications is not tied to a specific operating system. The Eclipse development environment is useful not only as a convenient implementation environment. Many Eclipse plug-ins were developed as part of open source projects, and these plug-ins provide supporting programs for a wide variety of programming challenges. The Eclipse plug-in Omondo is for modeling UML diagrams graphically and generating code from them automatically. In the development of this invention, Omondo was used for modeling the metamodels already described.

Developing a graphical editor involves application-specific functions as well as standard operations such as save, load, undo, and redo, and is very complex. So that these standard operations do not have to be developed from scratch for every editor, and to support the entire development of a graphical editor, the Eclipse Modeling Framework (EMF) and the Graphical Editor Framework (GEF) were created. These provide a more convenient way of creating a graphical editor based on a formal model. They are based on the Model View Controller (MVC) architecture [GHJV04]. Elements of a formal model are presented to the user as graphical elements (view). The graphics can be modified. The controller has the task of transferring modifications of the graphics to the model and accordingly changing how the graphical components are displayed.

EMF provides a way of creating models. From a model such as this, EMF can automatically generate Java code that can be used as a basis for an arbitrary Java application [MDG+04]. A model created by means of EMF represents the model in the MVC architecture.

GEF is a framework for creating a graphical editor. This provides standard operations so that the person developing the editor does not have to created functionalities for actions such as saving a graphical model. The model code already created by EMF is integrated into the GEF editor, forming a basis for implementing the editor. To obtain a complete editor, however, the Java code of the EMF model still has to be completed. Suitable graphical elements have to be designed to display the parts of the available model to the user. These graphical elements form the view. Further, the functionalities that allow the user to manipulate the graphics have to be implemented. For example, for the user to assign a textual designation to a graphical element, a dialog in which the user can enter text has to be implemented.

To connect the view and the model, each element of the model has to have a definition of which graphical element it is represented by (controller). The user can then use the functionalities of the graphical elements to perform operations on the model elements.

Thus, large models cause a large amount of implementation work if they have to be used for an editor. To bridge this gap between EMF and GEF, the Merlin Generator provides the functionality for generating a GEF editor from an EMF-based model [Ani05]. This editor can be extended and adapted according to requirements. It contains a graphical object for each class in the model, and for each association between two classes, it contains a connection for linking two objects of those classes. The objects and associations can be dragged and dropped from a menu to an area and available operations can be applied.

In the framework of this invention, the graphical editor must be designed differently. The elements of the requirement metamodel must be presented to the user as text segments. However, the ability to select text segments freely and to connect them does not give the user sufficient support in formulating a requirement in this case. Such a concept would not specify the sequence in which the text segments can be arranged so that correct sentence structure results. The user would have the option of connecting all the text segments defined in the model, so a tree structure would result. The user could begin doing this with any of the available text segments. The requirement metamodel defines the association of one class with another by means of part-whole relationships. The associations are therefore unidirectional, so the classes are put in a sequence. In the metamodel, the classes are arranged such that the sequence defines how the text segments are strung together to form a grammatically correct sentence. The user needs to be given this information as an aid. This is made possible by a menu presenting for selection only text segments that preserve grammatical correctness when appended to the sentence. In addition, the aim is to produce a generic editor that processes the classes currently present in the metamodel, so that modifications or extensions to the metamodel are automatically included in the editor. Since a GEF editor created by means of the Merlin Generator does not fulfill the requirements of this invention, a special editor was created without using that framework. However, EMF is needed for modeling the requirement metamodel. From the metamodel, EMF generates an XML document that is used in the prototype.

The following fundamental requirements were applied to the prototype editor created in the framework of this invention. The vocabulary defined by the requirement metamodel must be made available to the user as text segments. The purpose of selecting text segments is to make formulation easier for the user. One useful objective is the automatic integration of new text segments, to avoid manual modifications having to be made to the editor when the requirement metamodel is extended.

The above described requirements mean that the editor needs a generic design. This means that the text segments that are available for selection are not firmly integrated into the editor, but instead, the editor processes all the elements present in the metamodel dynamically to produce menu elements.

The steps that a user performs in the course of requirement creation are described below. The processes that are triggered by user interaction in the prototype are also outlined.

The first step is to define user-specific text constructs that need to be available for formulating requirements. On the one hand, the user requires interface objects in the form of natural language to represent the interfaces of the system that the requirements will be applied to. By using an interface object in a requirement, the user can reference the variable of an interface to assign values to it. Further, states describing the input and output values of the variables must also be defined. To illustrate this, a simplified example in the form of a requirement is given below; for clarity's sake, it has no temporal conditions.

EXAMPLE

Figure 52:
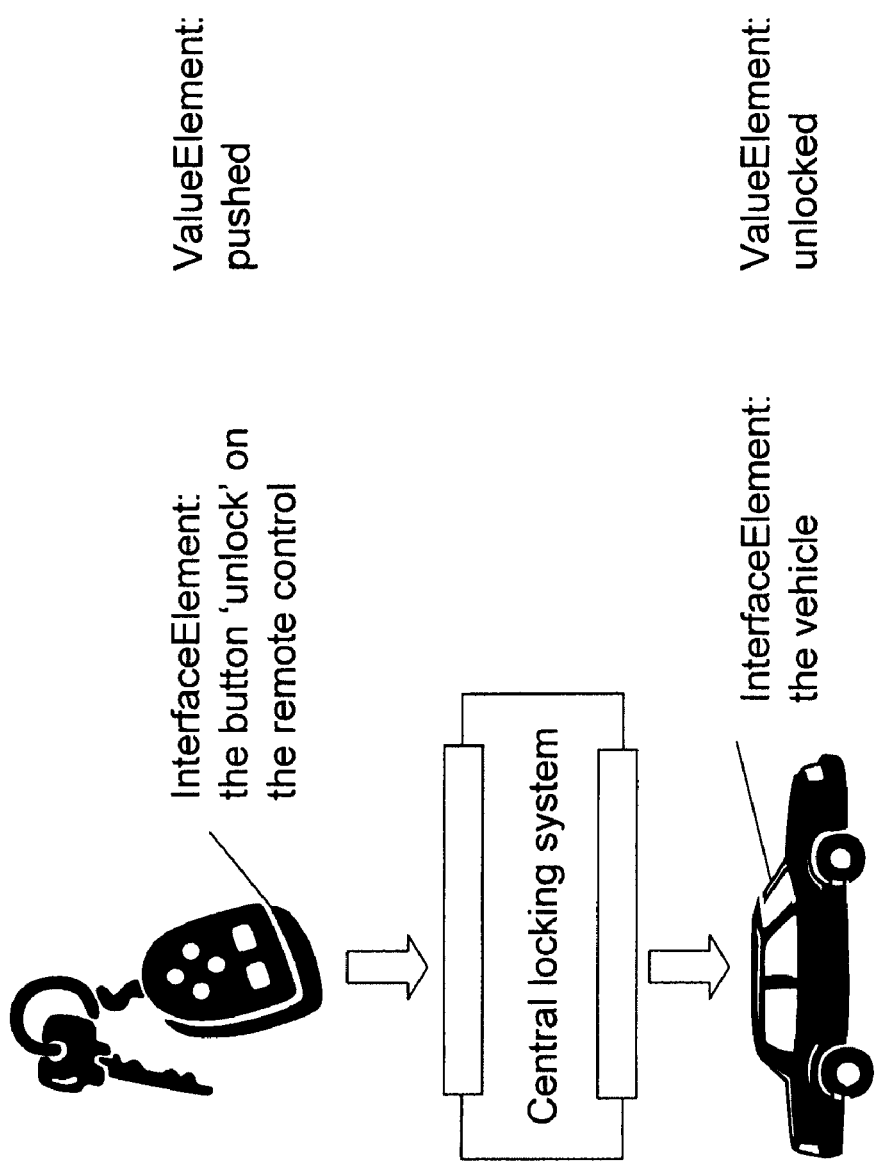
FIG. 52: Requirement

"For the requirement "If the button 'unlock' on the remote control is pushed then the car is unlocked", which is to be applied to a central locking function, the remote control button with the label the "the button 'unlock' on the remote control" describes an interface object of an ECU that is involved in implementing the function of central locking. When the user presses the button, the interface object is assigned the "pushed" state. The user expects an unlocked vehicle as the reaction. The interface object "the vehicle" must be given the "unlocked" state. To be able to describe such a requirement, the text constructs "the button 'unlock' on the remote control" and "the vehicle" are required as interface objects. The states "pushed" and "unlocked" are also necessary. Thus, these text constructs must be defined by the user before the description of a requirement can be produced. FIG. 52 shows the requirement in graphical form."

Figure 53:
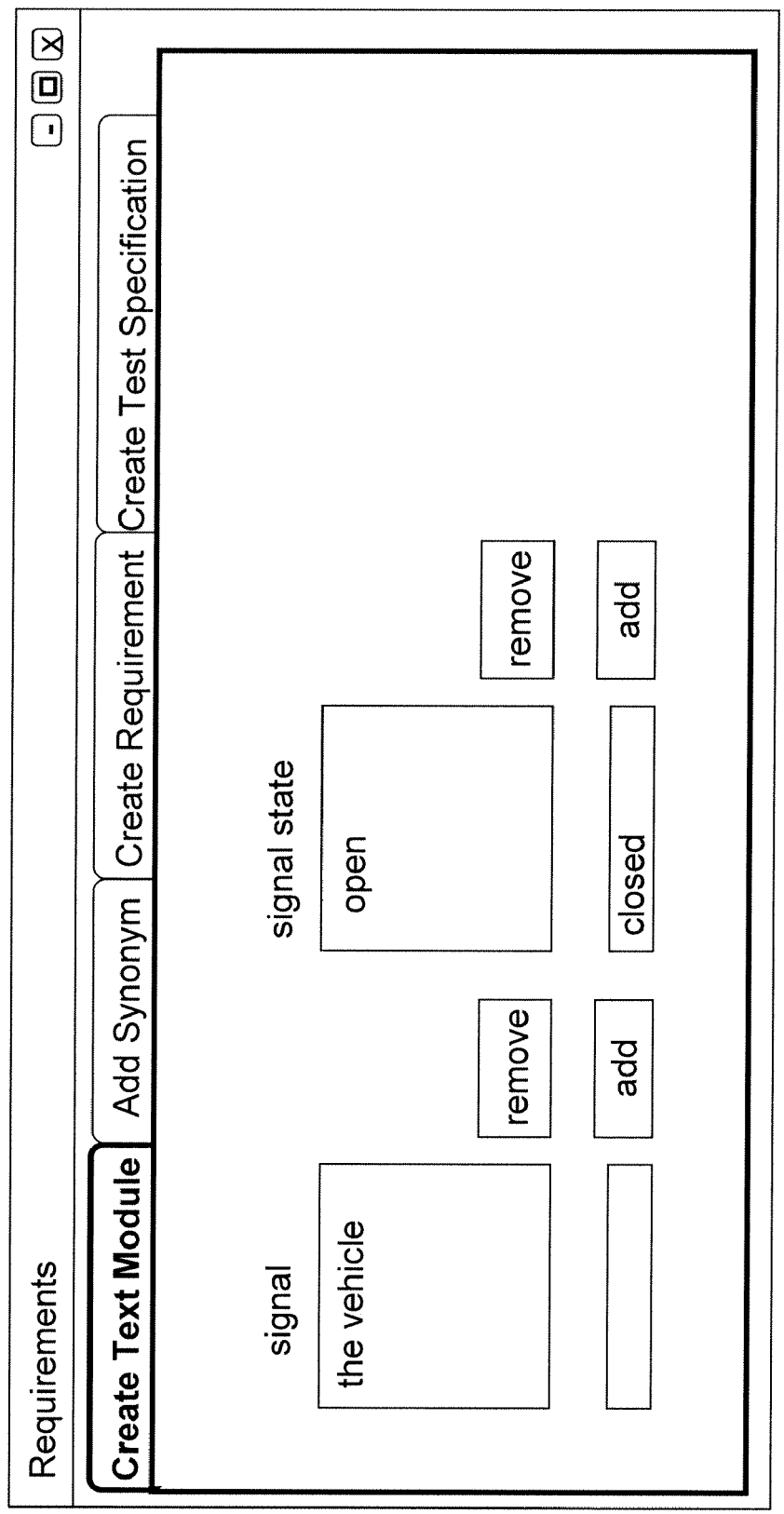
FIG. 53: Graphical user interface for creating text constructs

The screenshot in FIG. 53 contains a list of text constructs already created for interface objects on the left. Further text constructs can be added by entering text in the box underneath and pressing the 'Add'-button. The 'remove'-button deletes the highlighted element from the list concerned. On the right is a list with equivalent functionality for defining states that can be assigned to interface objects. These text constructs that are created form the basic elements for formulating a requirement. They are saved as instances of the InterfaceElement and ValueElement classes, which were introduced above.

The defined metamodel and the vocabulary completed by user inputs must be made available to the user in the form of text segments from which he/she can put together a requirement. These text segments are generated dynamically from the elements of the requirement metamodel. These are either general elements to be used for every requirement, such as operators and temporal conditions, or user-defined interface objects and states. A requirement is formed by selecting text constructs from the vocabulary. An instance of the metamodel is constructed step by step in the background.

As well as the vocabulary, the metamodel contains information on the structure of a requirement. By means of associations between classes, it defines which elements must be available and which can have a relationship with one another. Thus, the user does not see the entire set of words of the metamodel vocabulary at any one time. If the user were at all times able to select from all the terms, there would be a danger of defining a requirement that had a structure that did not comply with the metamodel. With the aid of the prototype, only requirements with that structure can be created. In the same way, the prototype can process only requirements with that structure to produce test specifications.

To make requirement creation as intuitive as possible, typical human behaviors during sentence construction were taken into account. A sentence is formed by stringing together words. Each sentence has a specific sentence structure. In English, sentences frequently consist of subject, predicate, and object. These elements are also arranged in that order. The prototype must therefore present the text segments in the order in which they are required for requirement formulation. The metamodel contains the individual elements for creating a requirement, and their relationships to one another, but no specification of the sequence in which the elements are presented to the user. The information on word order is therefore added to the prototype by an XML document. For each element present in the metamodel, this has a definition of position within the sentence, and the mapping of the element to natural language already defined. FIG. 54 shows an excerpt from this XML document. It defines that the text "and" is displayed to the user for every occurrence of the AND element. The two BaseExpressionElement elements that are linked by this operator must appear to the left and to the right of the text. The XML element "displayOrder" in FIG. 55 defines that the first BaseExpressionElement must be displayed to the user first. The XML element classInstance states that the element itself, namely the AND element, must be displayed next. The second BaseExpressionElement is placed last.

The metamodel was designed so that all the elements necessary for a requirement must exist in an instance of the metamodel, thereby preventing a requirement from being specified with incomplete syntax. Every requirement must contain a precondition and an expected reaction. These consist of at least one InterfaceElement and one ValueElement, so that an interface object and the state assigned to it are described in each case. Without these fundamental elements, a requirement would not make sense. The elements that are mandatory for a requirement must therefore be presented to the user.

Temporal conditions are offered to the user, because these are necessary for many requirements, but the user is frequently not aware of this. For example, the requirements, "When the button 'unlock' on the remote control is pushed, the vehicle is unlocked." lacks temporal conditions for testing an ECU for this requirement. For example, there should be a definition of how long the button has to be pushed for the vehicle to be unlocked. However, it is not mandatory to define temporal conditions, as temporal conditions do not make sense in every requirement.

The prototype offers the user a guide to creating a requirement by allowing him/her to select only from the next elements that have to be created in order to create an instance of the metamodel. When the user selects a text segment for his/her requirement, a new set of text segments is then displayed. These are text constructs that are successors to the selected text segment in the metamodel. These successors are determined by means of an algorithm that is presented below.

Figure 55:
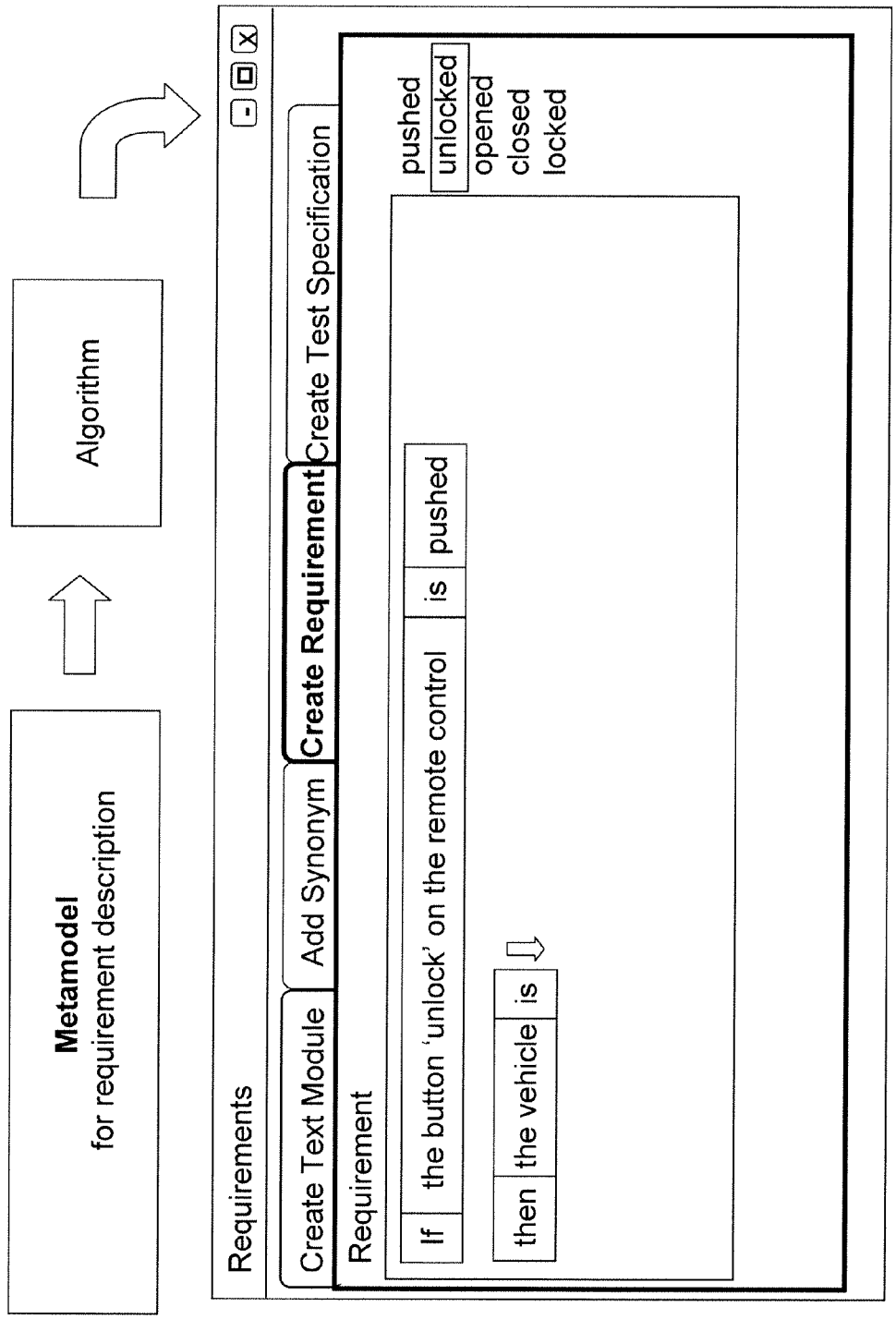
FIG. 55: Creating a requirement

When a text segment is selected, the user can be shown at what point it would be inserted in the part of the requirement already created. The point is marked by an arrow, as can be seen in FIG. 55. This preview functionality is for user orientation and can support the process of deciding whether the selected text segment should be added to the requirement. The user can still cancel the adding of the selected text segment at this time by not placing the text segment in the requirement. The preview functionality can be activated and deactivated.

FIG. 55 uses an example to show the creation of a requirement. On the left are stringed-together text segments that the user already selected. In the example, they form the sentence part "If the button 'unlock' on the remote control is pushed then the vehicle is . . . ". The menu can be seen on the right. This contains the elements that can be appended to the existing sentence fragment by drag & drop. In the background, an instance of the metamodel is formed from the selected elements. To append a new element to this instance, the program has to find the element to which it must be connected.

Figure 56:
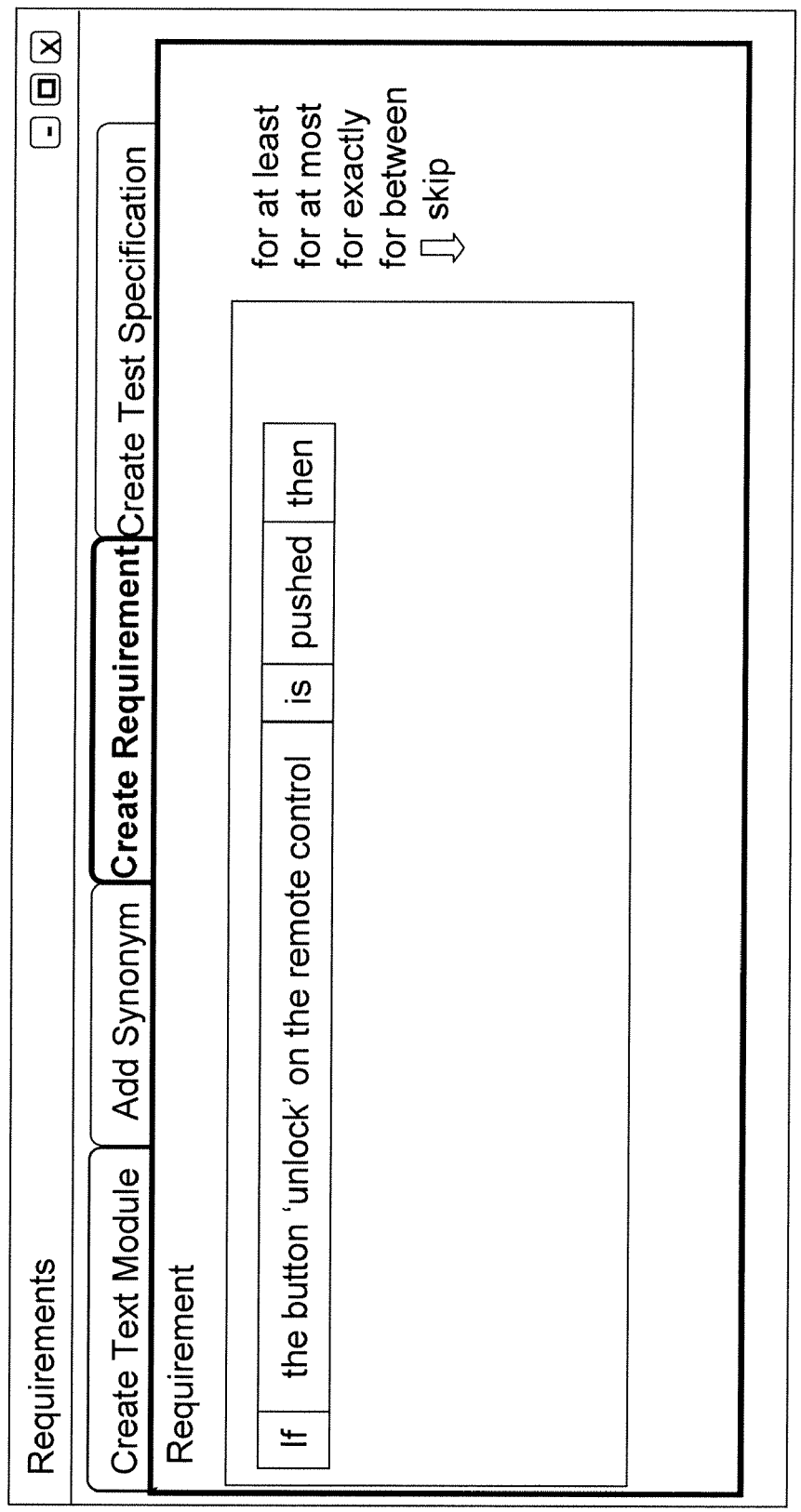
FIG. 56: Skip command for skipping the specification of temporal

Because it is not mandatory to specify temporal conditions, it is possible to skip the selection of text segments with temporal aspects. The menu command "skip" shown in FIG. 56 is used for this.

Figure 57:
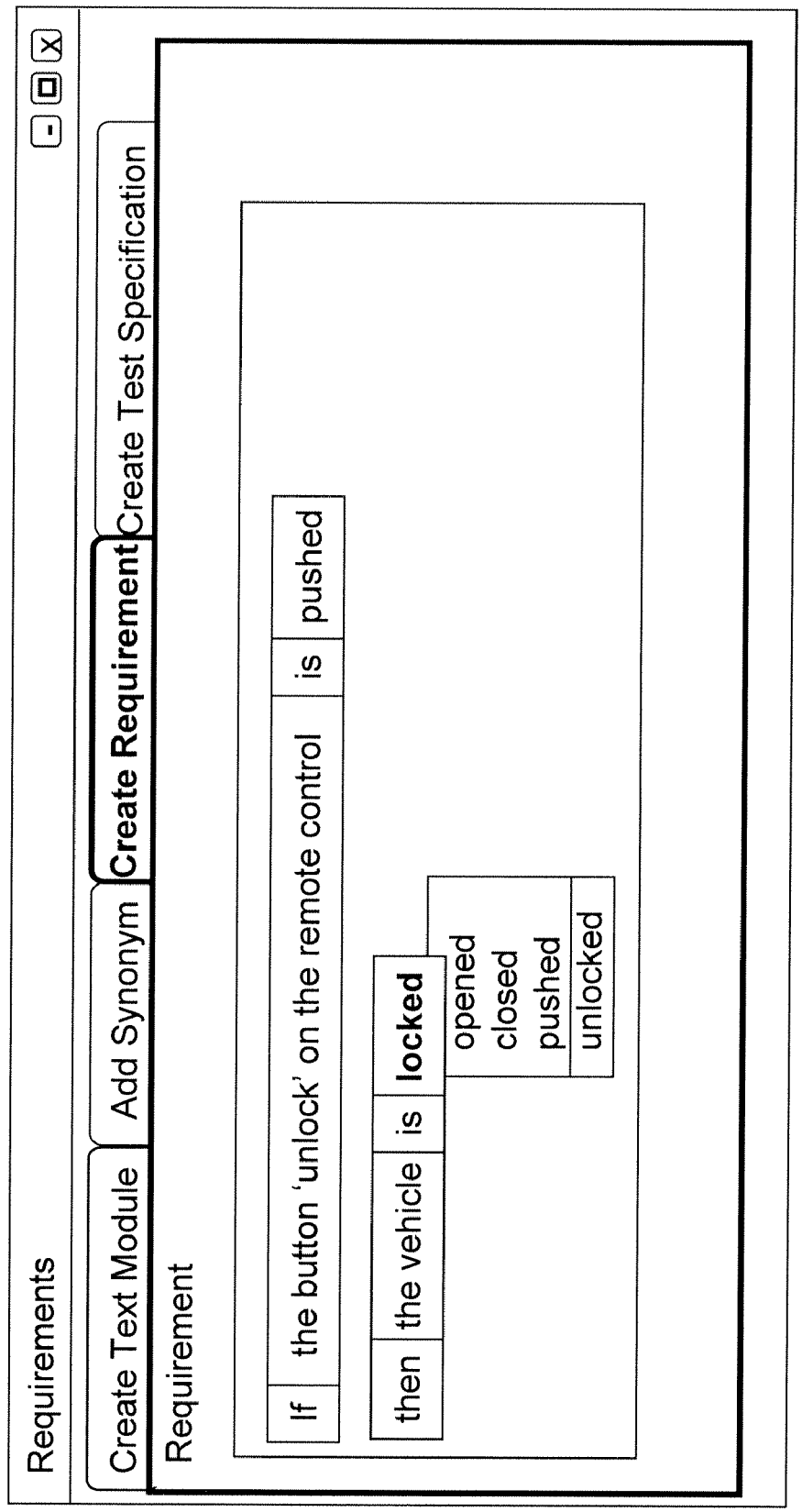
FIG. 57: Replacing a text construct

So that a requirement does not have to be created from scratch if the user wants to replace a selected element by another, it is useful to provide a functionality that meets this purpose. In this generic editor, the user can select a text construct to display a list of elements that can take the place of the element previously selected. FIG. 57 shows such an element list. For example, the text "locked" can be replaced by "unlocked".

The necessity of operators and a conception for operators for this invention was already described. The operators require special treatment in the implementation, because they insert an additional sentence part within a requirement. During requirement creation, the user may wish to insert an extra sentence part, to be appended via an operator, at a specific point in the sentence.

Using operators is optional. Another special feature is that operators can be used in several places. Thus, the way in which operators can be added differs from the way other elements are specified. To use an operator, the user must first select a sentence fragment to append the operator to. This is done by highlighting the sentence part concerned. Since operators cannot be appended to arbitrary elements, only elements belonging to the sentence part to which the operator can be appended are colored gray. The highlighting action displays an additional menu at bottom right, containing the list of possible operators. A completely created requirement is contained in FIG. 58. This now has to be extended by an additional sentence part. The grayed text segments form the sentence part to which the new one is to be appended by means of an operator. The Operator menu can be seen at bottom right. After an operator text segment has been selected, the system appends it to the highlighted sentence part.

Figure 59:
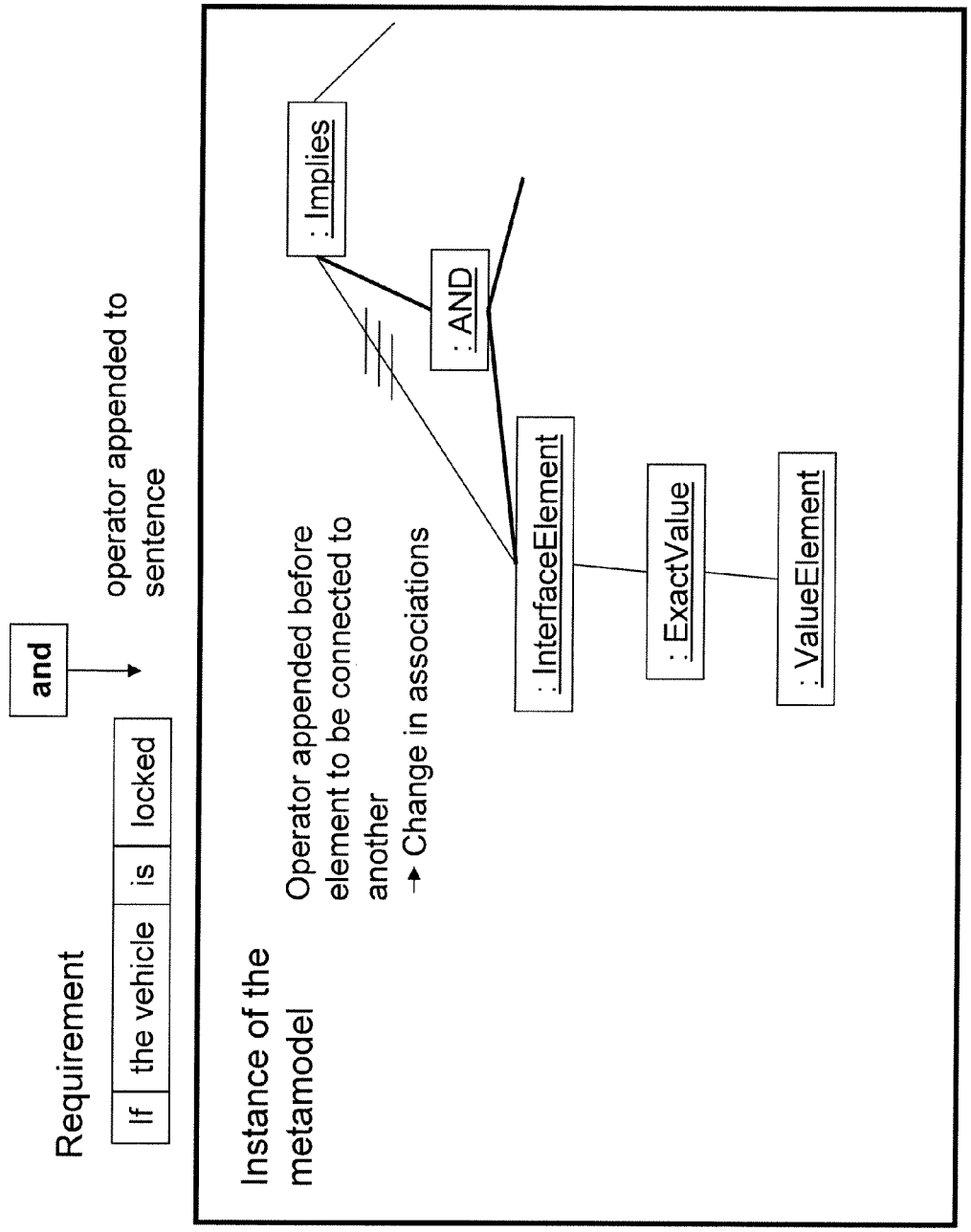
FIG. 59: Adding an operator

Internally, however, an operator is not appended to the InterfaceElement that is represented by some of the highlighted elements, but due to the structure of the requirement model, it is appended before that InterfaceElement, so that associations have to be updated. FIG. 59 shows a sentence part to which an operator is appended and the corresponding instance of the metamodel. The association between the Implies and InterfaceElement elements is removed there, and an operator that has an association to both these elements is appended in between. If it is a binary operator, it must link the InterfaceElement to a further InterfaceElement or to a further operator, depending on what the user selects next.

As described above, a natural-language sentence can contain ambiguities if several operators are used. Since the requirements are given an unambiguous structure by means of the metamodel, the requirements can be presented to the user unambiguously. This can be done, for example, by displaying parentheses. In the prototype, the unambiguous structure is represented by highlighting sentence parts that belong together.

The position of the operator depends on which operator is selected. The operators AND, OR and XOR come at the end of the highlighted sentence part. The NOT operator, on the other hand, is placed at the beginning of the highlighted elements, so that the word order can be constructed as correctly as possible and the requirement can therefore be read like a normal sentence. In FIG. 60, a requirement was extended by a NOT operator.

After a requirement was extended by an operator, if it is a binary operator, an additional sentence part must be created. The elements that were defined in the metamodel as successors to operators are provided for selection in the menu at bottom right. If text elements are still missing at another point in the requirement, the requirement is completed by means of elements that are displayed in the menu at top right.

To create a requirement, the user is first given text segments that a requirement can begin with. As described above, these are the elements Iff and Implies, which represent specializations in the BaseExpression. After one of these text segments has been selected, the metamodel is used to determine which text segments can be appended to the element already selected. The possible next text constructs are determined by an algorithm that starts from the element currently selected in the requirement model in order to find the possible next elements.

The requirement metamodel was modeled by a UML diagram in the EMF framework. EMF creates an XML document representing the contents of the diagram from a UML diagram. This XML document forms the basis on which the algorithm acts. The algorithm searches the XML document for classes. The algorithm, which is shown in the form of pseudocode in FIG. 51, will now be described.

Figure 62:
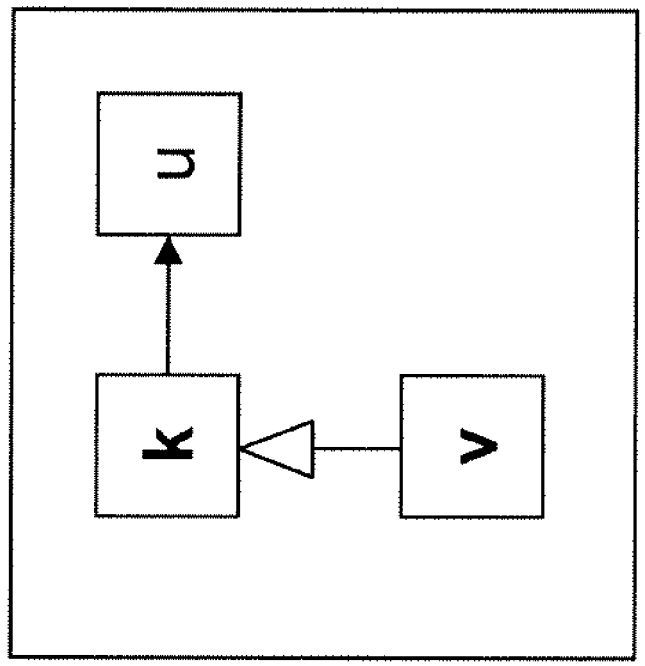
FIG. 62: Successor of v
Figure 62:
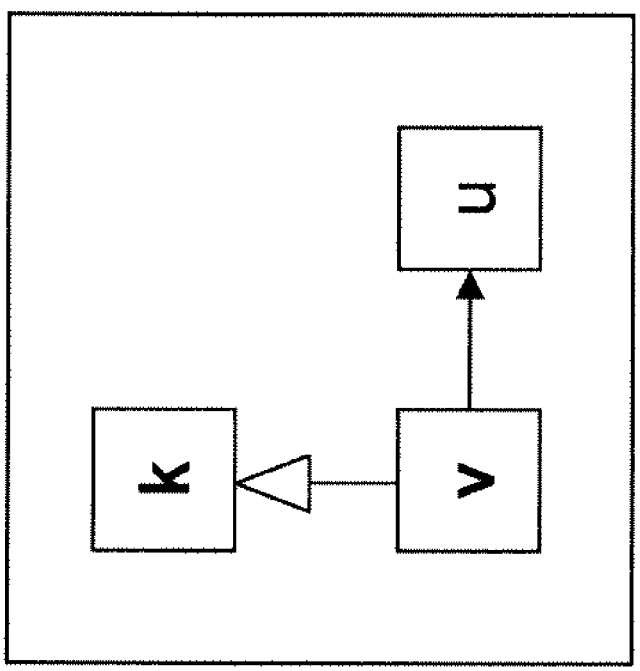

The basic functionality of the algorithm consists in running through the requirement metamodel to find a set of elements for the user, from which he/she must select the next element for the requirement. The starting point is the element last selected, which is called the "chosenElement" in FIG. 61. At the beginning of a requirement definition, the algorithm is run through with a concrete implementation of the BaseExpression element as a starting point, since at this point in time there is no selected element. An element of BaseExpression type defines the basic structure of a requirement and forms the beginning of the sentence. The following formal description defines the algorithm:

Let V be the set of all classes of the metamodel and $E \subseteq V \times V$ the set of all associations. Two classes a, b$\in$V possess an association if (a, b)$\in$E. In this case, a represents the source class and b the target class of the association. The associations are therefore unidirectional. Further, a$\triangleleft$b where a, b$\in$V means that a concrete implementation of abstract class a is in this case of type b. Thus, a is a specialization of the more general class b and inherits its properties and associations. Due to the transitivity of inheritance, this operation is transitive. Let v, u, k, s, x$\in$V and the user last selected class v of the metamodel to add an instance of it to the requirement. This instance is presented to the user in the form of a text segment. Following that, all the classes that can appear after v in the metamodel are found. Let U={u|(v, u)$\in$E$\vee$(k, u)$\in$E} where k$\triangleleft$v the set of all elements that are next presented to the user for selection for sentence formulation. A class that follows v must either be a target class of v itself or it can be a target class of an abstract class that inherits from v and therefore also inherits the associations. FIG. 62 shows these two cases. The search for the next element is performed in FIG. 63 by means of the "getNextElements" function.

The successor that is found might be an abstract class. In the metamodel, elements that are to appear in a requirement as sentence constructs are modeled as classes that are not abstract. Abstract classes represent bundles of properties and associations that several classes have in common, and do not themselves represent a sentence construct. Thus, the user must be offered only specializations of abstract classes for requirement creation. Let A$\subset$V be the set of all abstract classes. If a successor that is found is an abstract class, a search is run for the set of all its specializations: S= {s|u$\triangleleft$s$\wedge$$\neg\exists$x|(x$\triangleleft$s$\wedge$(s, x)$\in$E)} \A. Let u be a successor that is found and an abstract class, and S the set of all specializations of u that are not abstract.

Figure 63:
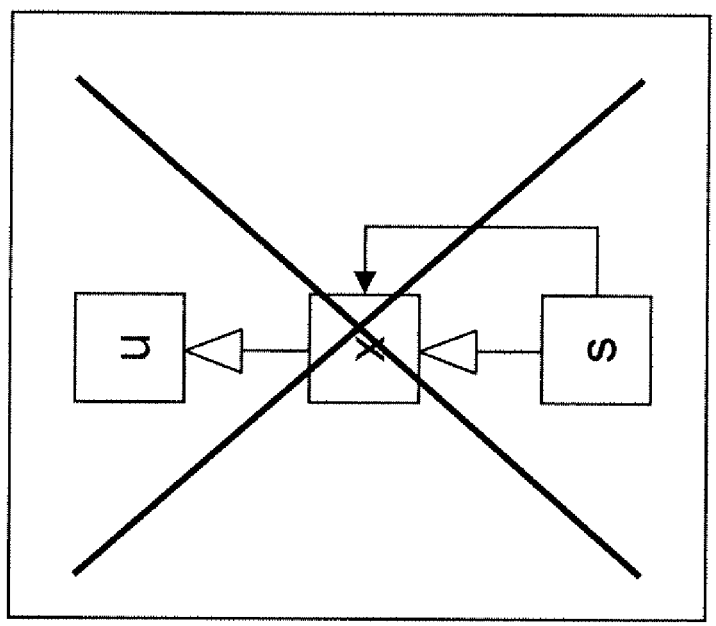
FIG. 63: Composite

In the pseudocode in FIG. 61, the "getSpecialisations" function returns all the specializations of an abstract element. The specializations s can inherit either directly from u or indirectly when s inherits from k, which in turn inherits from u. This is a transitive operation. In this step, the algorithm searches only for classes that were not modeled as composites. A specialization that is found must not have an association to a class from which it inherits. FIG. 63 shows the structure that is produced from the composite. As already described, operators were modeled by means of the composite design pattern in the metamodel. As it is not mandatory to use these in a requirement, they must be offered to the user in a different way.

The elements that are found by the "getSpecialisations" function are offered to the user in a menu, so that he/she can select one for the requirement. In FIG. 61, the "addToUserMenu" function represents the functionality for adding elements to the menu. If a successor that is found is not an abstract class, it can be added to the menu directly.

Figure 64A:
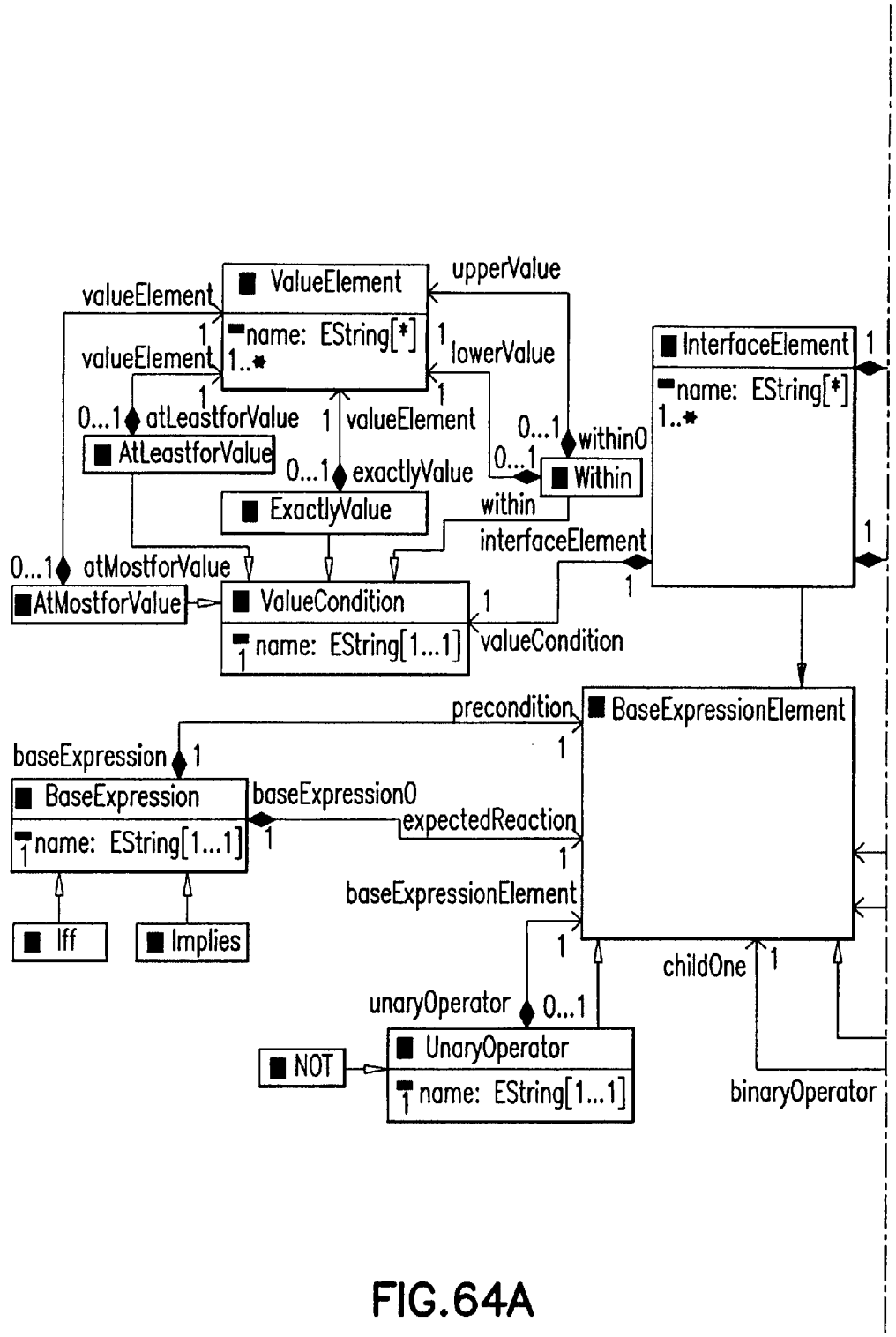
FIG. 64: Metamodel of the requirement description
Figures 64, 64B:
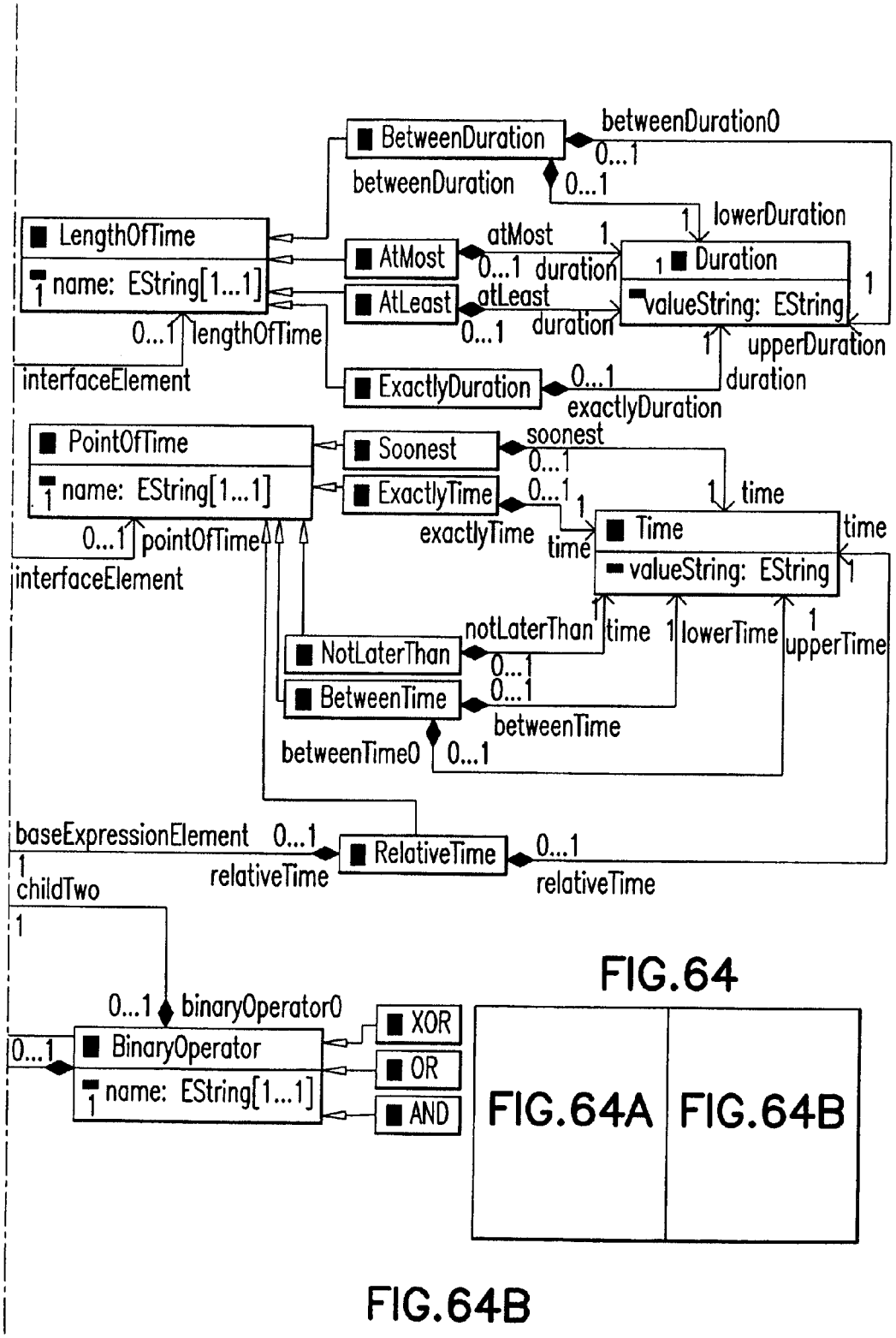

The algorithm is now described using a concrete iteration through the algorithm as an example. FIG. 64 shows the requirement metamodel, where the description can be tracked for easier understanding. At the beginning of requirement creation, the user requires a sentence construct of the BaseExpression element type. The algorithm is given this element as the starting element. Because BaseExpression was modeled in abstract form, the first iteration starts with a search for concrete instances. The set of found elements consists of one Iff and one Implies.

Because these sentence constructs are mapped to natural-language expressions, the user is given two easily understood alternatives for beginning the requirement. Assuming the user decides to use the Implies element, this forms an input for the algorithm. First the elements that can be successors to Implies in the metamodel are searched for. Via the Composition association type, the relationships between classes have a direction, so that there is a source-target relationship. The Composition association type is used to model part-whole relationships. One class is part of another and can therefore not exist without the class of which it is a part. The class that models the whole is the source class and the part class is the target class. The target classes of Implies are its successors, as are also all target classes of all classes from which Implies inherits. Two successor elements of BaseExpressionElement type are found in this iteration. Implies does not itself have target classes, but inherits the two associations precondition and expectedReaction from BaseExpression. Because the two successors are abstract classes, their concrete instances are searched for next. This search is performed for every successor. The set of specializations of elements of BaseExpressionElement type is restricted to the InterfaceElement.

At this point there is an obvious need to exclude elements modeled with Composite. The user must not be able to select an operator before he/she has created a sentence part to which a further sentence part can be appended via an operator. This rule is due to the fact that people normally want to describe one fact first and then another one after that. In computer science, it is customary to represent two elements that are linked by an operator in a tree structure, since a tree structure ensures nonambiguity when operators are nested. To create a link via the tree structure, first an operator has to be selected, and then the two elements to be linked are appended to that. However, a human being does not think in tree structures. In natural language, enumerations are performed by a sequence of facts strung together. This aspect is taken into account here in the algorithm.

The result of this iteration consists in two InterfaceElement elements. User-defined instances were created for this type of element while the user created text constructs for interface objects. These instances are presented to the user for selection in this step. Since the two elements found in this iteration are InterfaceElement elements, the user is twice given the option to select one of these elements. The one selected first is given the role of precondition, and the second represents the expected reaction. After user selection, the algorithm continues with the class name InterfaceElement as input.

As described above, the requirement metamodel can be extended simply by adding further classes. Because the generic editor gives the user elements to select from on the basis of this metamodel, new elements of the metamodel are automatically available in the editor for requirement formulation. For example, if, in addition to the elements Iff and Implies, there is a new concrete element of the type "While the precondition is valid, the expected reaction must occur", an element called "While" can be added. This element can inherit from the BaseExpression element and would therefore have a precondition and an expected reaction.

Adding a new element to the UML metamodel for requirement description means that program code is created automatically for the new class. This must be extended by a couple of methods, which is easily done by copying and modifying the methods of existing classes. For the While class, which inherits from BaseExpression, it would only be necessary to create a "transform" method defining the mapping to elements of the test specification metamodel. It inherits other methods from the BaseExpression class.

From the UML metamodel, an XML document is generated, and the algorithm searches the document for classes as described above. When the UML metamodel has been extended, the XML document can be regenerated. The algorithm then also finds the new classes, which the prototype offers to the user as additional text segments for the requirement description.

A test specification can be created from a previously created requirement. To do so, the user can load the created requirements to the prototype by means of the menu sequence "Requirement"→"load all" to get a list of all requirements. The user must select one requirement, which is presented in natural language, from this list.

Figure 65:
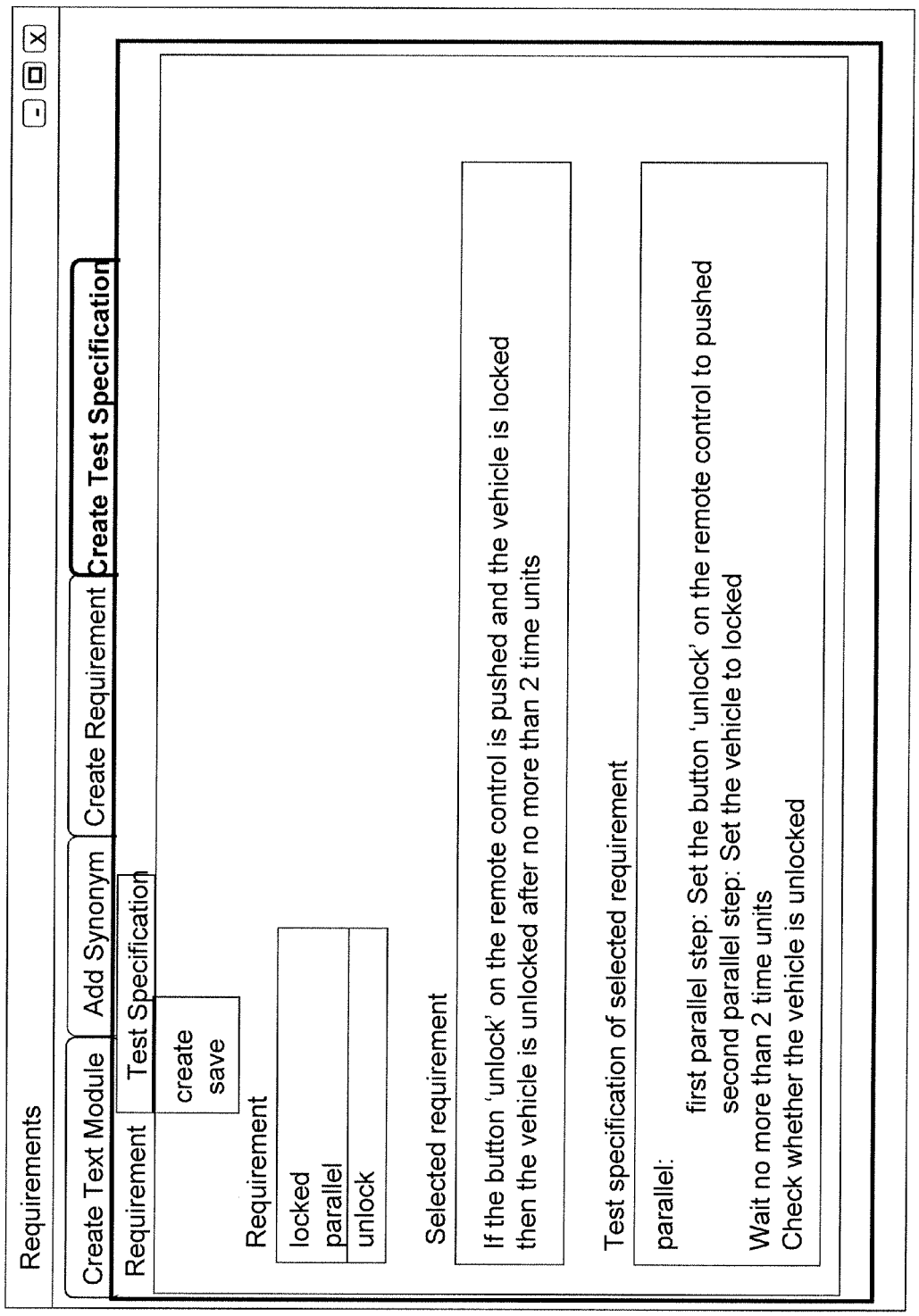
FIG. 65: Screenshot: Generating a test specification

Performing the menu sequence "Testspecification" →"create" triggers the transformation of the selected requirement into a test specification as described above. Instances of the elements of the test specification metamodel are created and linked by associations, so that an instance of the entire metamodel of the test specification results. The transformation complies with the transformation rules that were described. The test specification is also displayed in natural language. Because the test steps described by the test specification are performed sequentially, they are listed one below the other. Steps to be performed in parallel are announced by the expression "parallel:" and indicated by indentation. FIG. 65 shows the list of all requirements, the selected requirement represented in natural language, and the generated test specification.

The generated test specification can be saved in XML format. XML was chosen as the storage format because the structure of XML and well-thought out naming of XML elements makes an XML document understandable to human beings. Since parsers are available for XML, the test specification can be read in XML format and further processed.

To create an executable test from a requirement, first the requirement is mapped to a test specification, and this then has to be converted into a test implementation. This section introduces the TestML test description language and the AutomationDesk test automation tool. Then the mapping of individual elements of the test specification to elements of the test implementation is described, along with the concrete AutomationDesk test.

The TestML test description language was developed as part of the IMMOS project. The increasing automation of development processes in the automobile industry is resulting in various test tools being used for support. Intensified cooperation between companies and their suppliers is resulting in ECU development and testing being spread across several companies which use different test tools. This prevents integrated test development and the exchange of test scenarios between companies, because all these tools can support different file formats. One partial objective of the IMMOS project is therefore to close the gap between the different test tools.

TestML is an XML-based, tool-independent exchange format for test descriptions that is being produced, aimed at overcoming the technological obstacles resulting from the heterogeneous tool world. Test tools can be extended with import and export functions that perform mapping between a test-tool-specific notation and TestML. This solution makes it possible to continue using existing tools in the future, with additional functionality for exchanging tests and thus reusing them.

The AutomationDesk tool simplifies the automated and model-based testing of ECU software. A graphical user interface allows users intuitive handling. Test sequences that are similar in structure to UML activity diagrams can be specified by means of AutomationDesk. Among the items this tool provides is a library that provides access to hardware-based test platforms. Blocks such as "Read" and "Write", which represent elements necessary for test description, are available in graphical form for this. For example, assigning a value to a platform-specific variable of the test object is an action within a test. A block of "Write" type performs this function. To read out a variable of the test object, for example, the "Read" block is available. These blocks can be put together to form a test sequence using drag & drop. The test can run on the test object automatically by assigning the blocks to the variables of the test object.

To obtain an executable test, the test specification generated from a requirement must be converted into a concrete test implementation. The AutomationDesk test automation tool can be extended with an import functionality that creates a test implementation from a test specification. An import functionality for the TestML format was created experimentally in AutomationDesk, so that mapping from TestML to a test implementation in AutomationDesk can run in automated form.

However, the test specification described in this invention contains elements that cannot be expressed by means of TestML. The existence of parallelism is one example of this. TestML would have to be extended to form a bridge between the test specification and the test implementation. The prototype for this invention makes functionality available for storing the test specification in XML format.

Figure 66:
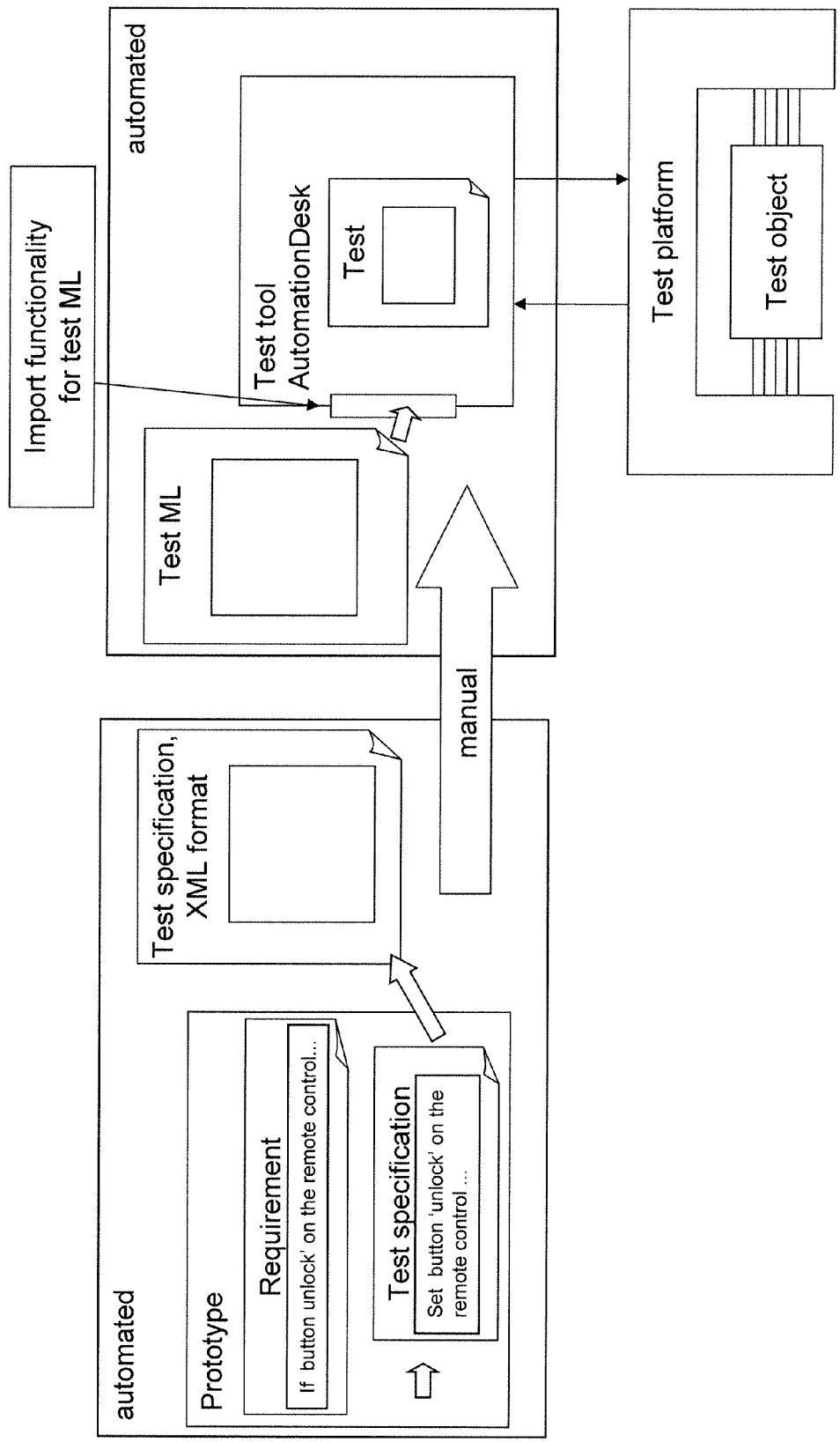
FIG. 66: From the test specification to a test implementation in a test tool

FIG. 66 shows the prototype, which returns a test specification in XML format as output, and the AutomationDesk test tool with the import functionality for TestML. Manual mapping between the XML format of the test specification and TestML is still needed to complete the chain from requirement to test implementation. To achieve complete automation of this sequence, it would be very useful to develop a standard format for a test specification and to extend every test tool by import functionality for that standard format. Another possibility would be to extend TestML so that all the elements of the test specification could be expressed in TestML. In that case, the prototype could be modified so that it converts the test specification into TestML.

Figure 67:
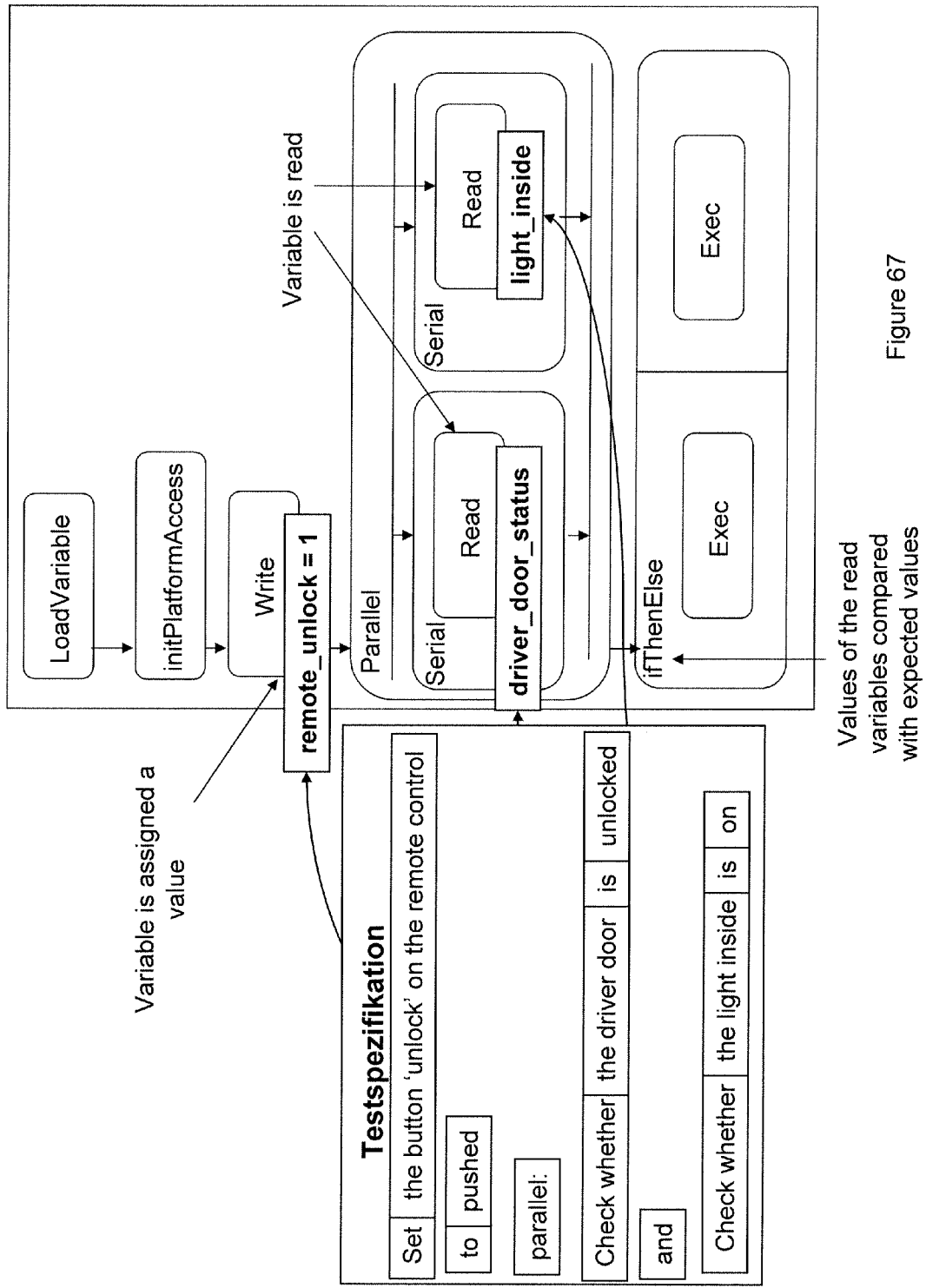
FIG. 67: From the test specification to a test implementation in AutomationDesk

As already described above, in AutomationDesk tests are described by test steps in the form of blocks that together form a test sequence. FIG. 67 shows a test specification and the corresponding test implementation in the form of a test sequence. This was created manually because of the elements missing in TestML. The test sequence begins by loading information on the test object, for example, the variables. At the same time, information on the test platform is loaded. Then blocks that address the test platform are initialized. The test specification shown in FIG. 67 is mapped to blocks in AutomationDesk. An assignment of a state to an interface object in the stimulus part of the test specification is mapped to a Write block. The interface object "the button 'unlock' on the remote control" is mapped to the variable "remote_unlock" and the state "pushed" is expressed by the value "1". Assigning a state to an interface object in the reference part of the test specification causes the appropriate variable of the test object to be read out and the value that is read to be compared with the expected value that is represented by the state.

The operators AND and OR in the test specification produce different implementations of test behavior. In the example in FIG. 67, there is an AND link in the reference part. This results in a test that checks whether both of the linked expressions are true. Only if both these expressions are fulfilled has the test been completed successfully. In contrast, if an OR operator is used in the test specification, just one fulfilled expression must return a successful test in the test implementation.

This section showed the procedure by which the user can create a requirement and generate a test specification from it with the aid of the prototype. Fundamental implementation aspects were also presented. Now that the mapping of a test specification to a concrete test has been demonstrated using the AutomationDesk test automation tool as an example, application examples are given below.

This section contains examples demonstrating the possible applications for automatic test generation. Each example begins with a requirement for which a test specification is generated by the prototype. Then the test specification is mapped to test steps in the AutomationDesk test tool. Together, the test steps form a test sequence. The test sequence represents the executable test.

The requirements relate to the example already used and therefore describe the functionality of a central locking system. Each requirement aims to show the use of particular elements in the prototype. The first requirement contains only the mandatory elements, interface objects, and states. Temporal conditions, operators, and relative dependencies are added in the next examples.

The expression "The vehicle is locked" is used synonymously with "All doors are locked". If all doors are locked, it is always true that one door is locked.

The first application example shows the simplest case of a requirement. Only interface objects and states that are mandatory in a requirement are used. The requirement describes that the vehicle must be unlocked if the button 'unlock' was previously pressed on the remote control.

Requirement:

"If the button 'unlock' on the remote control is pushed then the vehicle is unlocked."

The test specification shows the test steps of a test that checks the requirement. The button 'unlock' on the remote control is put in the pushed state as the precondition. The expectation is that the vehicle is then unlocked. This must be tested.

Test Specification

"Set the button 'unlock' on the remote control to pushed. Check if the vehicle is unlocked."

Figure 68:
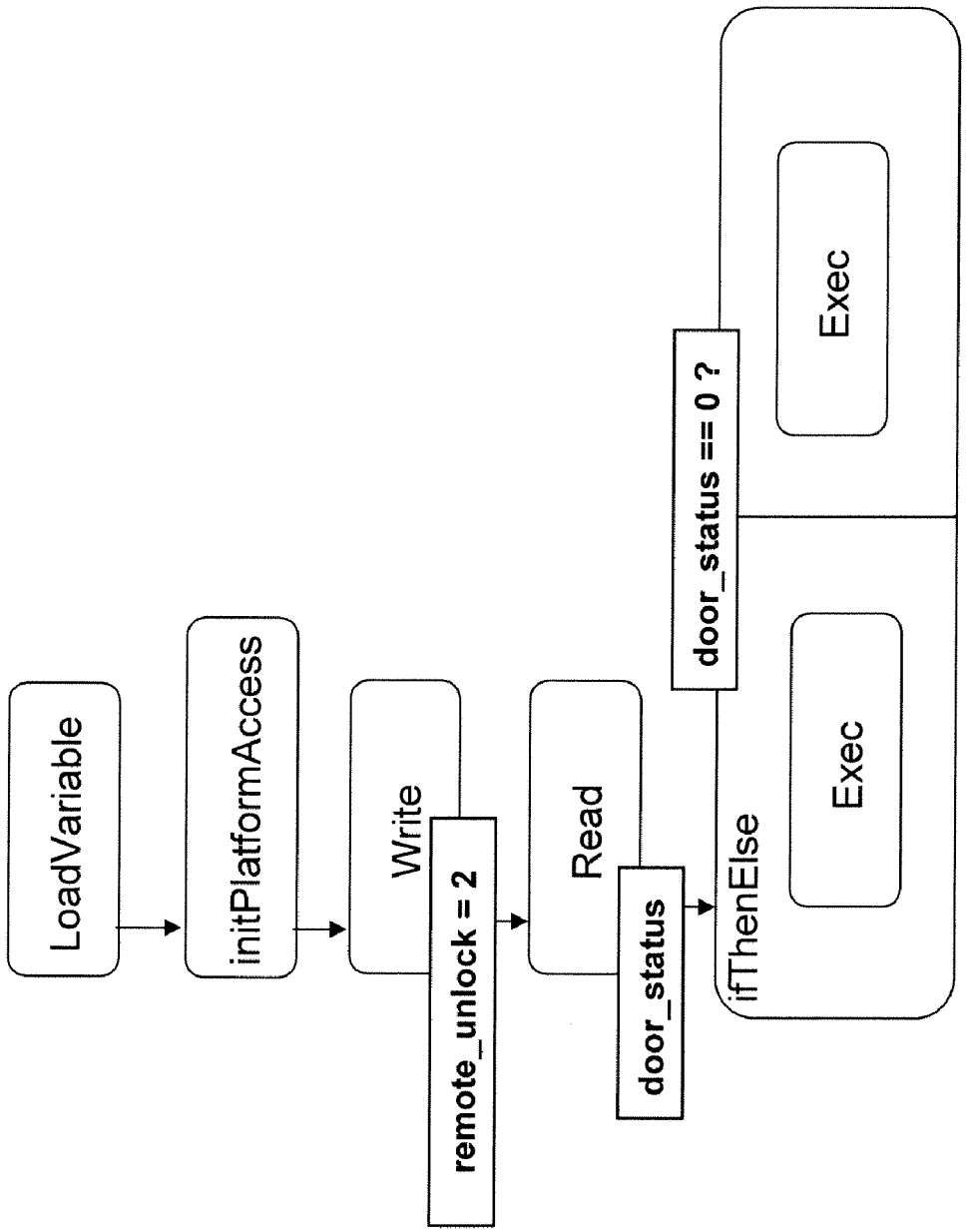
FIG. 68: Test sequence in AutomationDesk: basic elements

FIG. 68 shows the test sequence in AutomationDesk which contains the test steps of the test specification. The textually described interface objects the "button 'unlock' on the remote control" and "the vehicle" are mapped to the platform-specific variables "remote_unlock" and "door_status". The states "pushed" and "unlocked" are also mapped to the values "2" and "0". At the beginning of the test sequence, the variables and the platform, such as MATLAB®/Simulink® or a processor board, are initialized. To execute the test step "Set the button 'lock' on the remote control to pushed", a Write block is used to set "remote_unlock=2". The "door_status" variable is ready out by a Read block and then its value is checked. The test is successful if the value is "0", as this is the expected value.

This example adds temporal conditions. The button 'unlock' on the remote control must be pushed for at least 500 milliseconds (duration). The expected reaction is that the interior lighting of the vehicle is lit after 100 milliseconds and for at least 10000 milliseconds (duration).

Requirement:

"If the button 'unlock' on the remote control is pushed for at least 500 milliseconds then the interior light is on after 100 milliseconds for at least 10000 milliseconds."

The test specification shows the following test steps that are necessary for testing the requirement: The button 'unlock' on the remote control is assigned the "pushed" state. After that the waiting time is at least 500 milliseconds, because the precondition must be true for that long. A further waiting time of 100 milliseconds results from the fact that the expected reaction must occur after those 100 milliseconds. A check is performed on whether the interior lighting is lit for at least 10000 milliseconds.

Test specification:

"Set the button 'unlock' on the remote control to pushed. Wait at least 500 milliseconds.
Wait 100 milliseconds.
For at least 10000 milliseconds check if the light inside is on."

Figure 69:
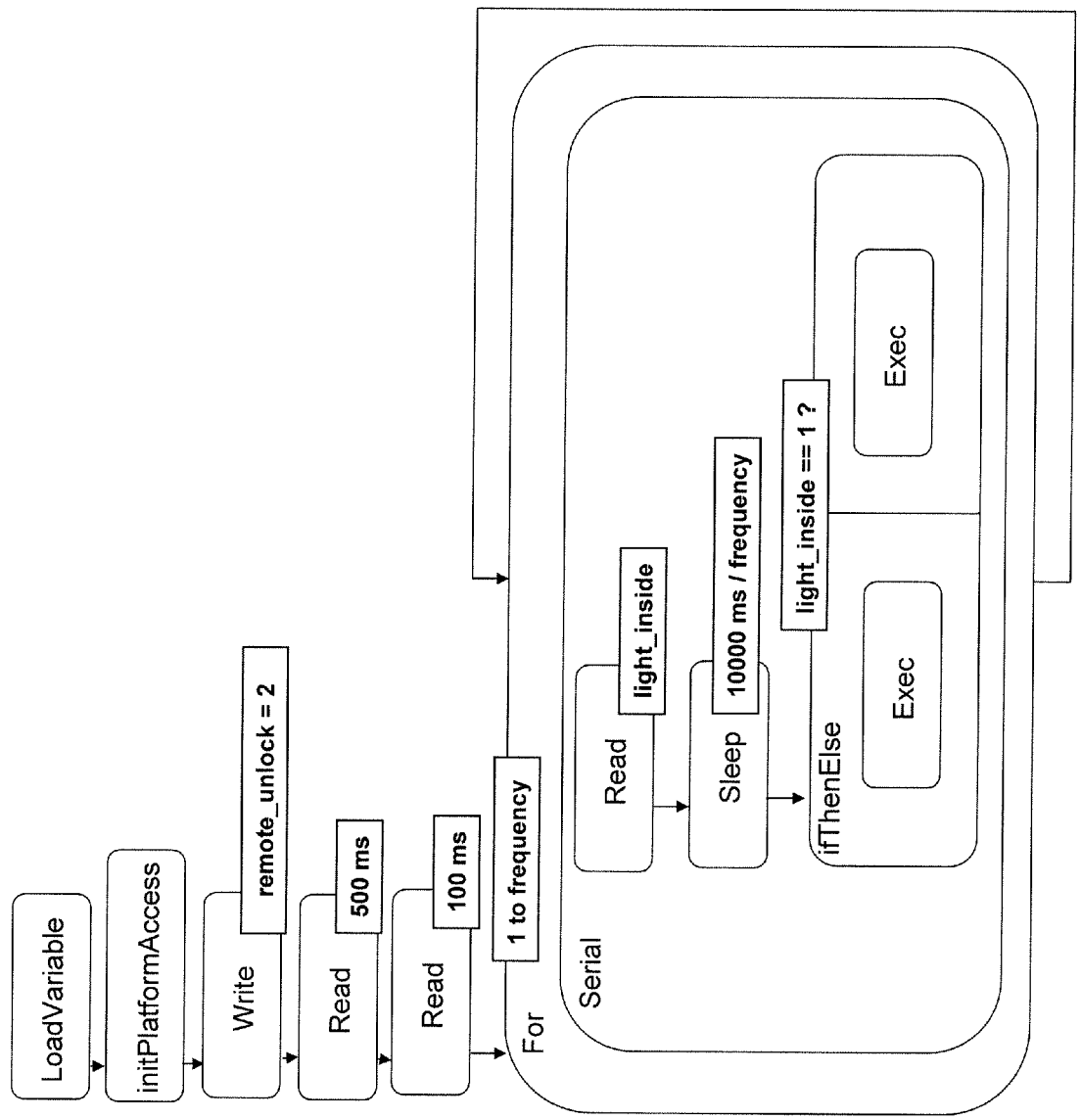
FIG. 69: Test sequence in AutomationDesk: time aspects

The test sequence in AutomationDesk in FIG. 69 begins, like the first example, with initializing the platform and variables. The precondition "remote_unlock=2" is set via a Write block. A Sleep block provides the waiting process in AutomationDesk. The test implementation must contain exactly one time specification for a wait instruction. Thus, degrees of freedom such as those arising from temporal conditions like "at least 500 milliseconds" must be resolved. As described above, temporal conditions can be represented by parameters whose values must be specified concretely for test execution.

To check whether the interior lighting is lit for at least 10000 milliseconds, a definition is needed of how often the "light_inside" variable must be read out for testing within the 10000 milliseconds. A variable with the name "Frequenz" is defined for this. Users must be able to specify the frequency themselves. After the "light_inside" variable is read out, the waiting time must be 10000/Frequenz. This divides the 10000 milliseconds into the steps defined by the frequency.

In this example, an operator is used. The precondition must now consist not only of pressing the button 'unlock' on the remote control, but in addition, after 10000 milliseconds the outer door handle of the driver's door must be pulled. The expectation is that the driver's door is then open.

Requirement:
"If the button 'unlock' on the remote control is pushed for at least 500 milliseconds and the outside driver door handle is pulled after 10000 milliseconds then the driver door is open."

The test specification contains the instruction to perform test steps in parallel. The two parts of the precondition described above are performed in parallel and linked by the AND operator. Finally, a check is made whether the driver's door is open.

Test Specification
"parallel:
Set the button 'unlock' on the remote control to pushed.
Wait at least 500 milliseconds.
and
Wait 10000 milliseconds.
Set the outside driver door handle to pulled.
Check if the driver's door is open."

Figure 70:
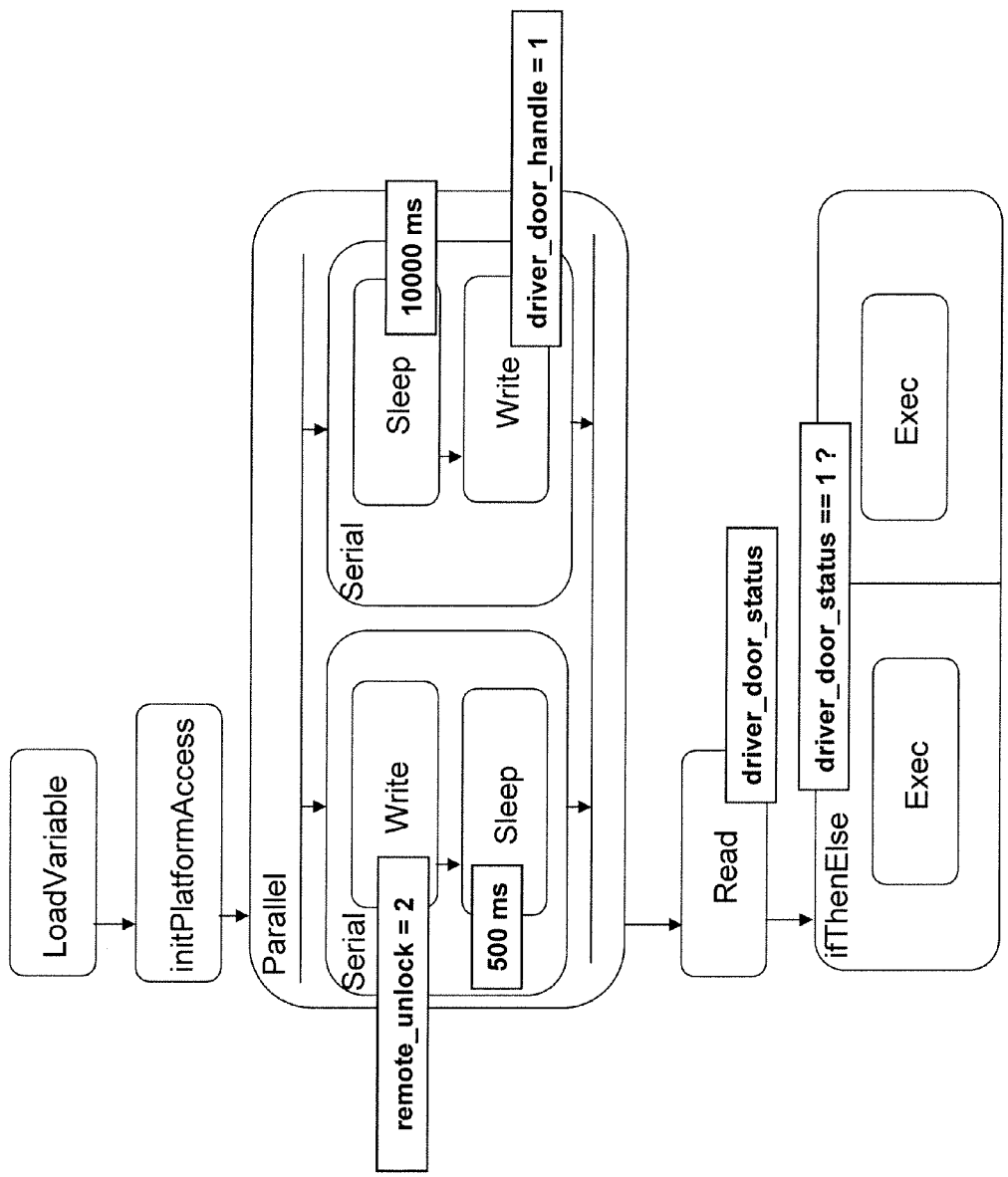
FIG. 70: Test sequence in AutomationDesk: operator

In AutomationDesk, the test sequence begins with initializing the platform and variables, as shown in FIG. 70. The parallel instruction is implemented by a Parallel block, which executes two Serial blocks in parallel. The Serial blocks contain the two instructions of the precondition. The "remote_unlock" variable is assigned the value "1" by a Write block. The time specification "at least 500 milliseconds" must first be concretized. As described above, a parameter can represent the temporal condition whose value must be specified for execution of the test. The value of the parameter could be set to "500" as the default. A Sleep block implements the waiting time of 500 milliseconds. In parallel, first a waiting time of 10000 milliseconds is performed via a Sleep block and then a Write block is executed to assign the value "1" to the variable "driver_door_handle". Then the variable "driver_door_status" is read and a check is made whether it contains the value "1".

In this example, there is a relative temporal relation between two assignments of interface objects and states. After the button 'lock' was pushed on the remote control, the expectation is that the door button of one door is pushed down to the lower position. However, the timing of this expected reaction must not be dependent on the activation of the remote control, but on the time at which the vehicle is actually locked. One second after a door is locked, its door button must be pushed down to the lower position.

Requirement:
"If the button 'lock' on the remote control is pushed then the door button is down 1 second after the door is locked."

In the test specification, this reactive behavior is expressed by the instruction "Wait until the door is locked".

Test Specification
"Set the button 'lock' on the remote control to pushed.
Wait until the door is locked.
Wait 1 second.
Check if the door button is down."

Figure 71:
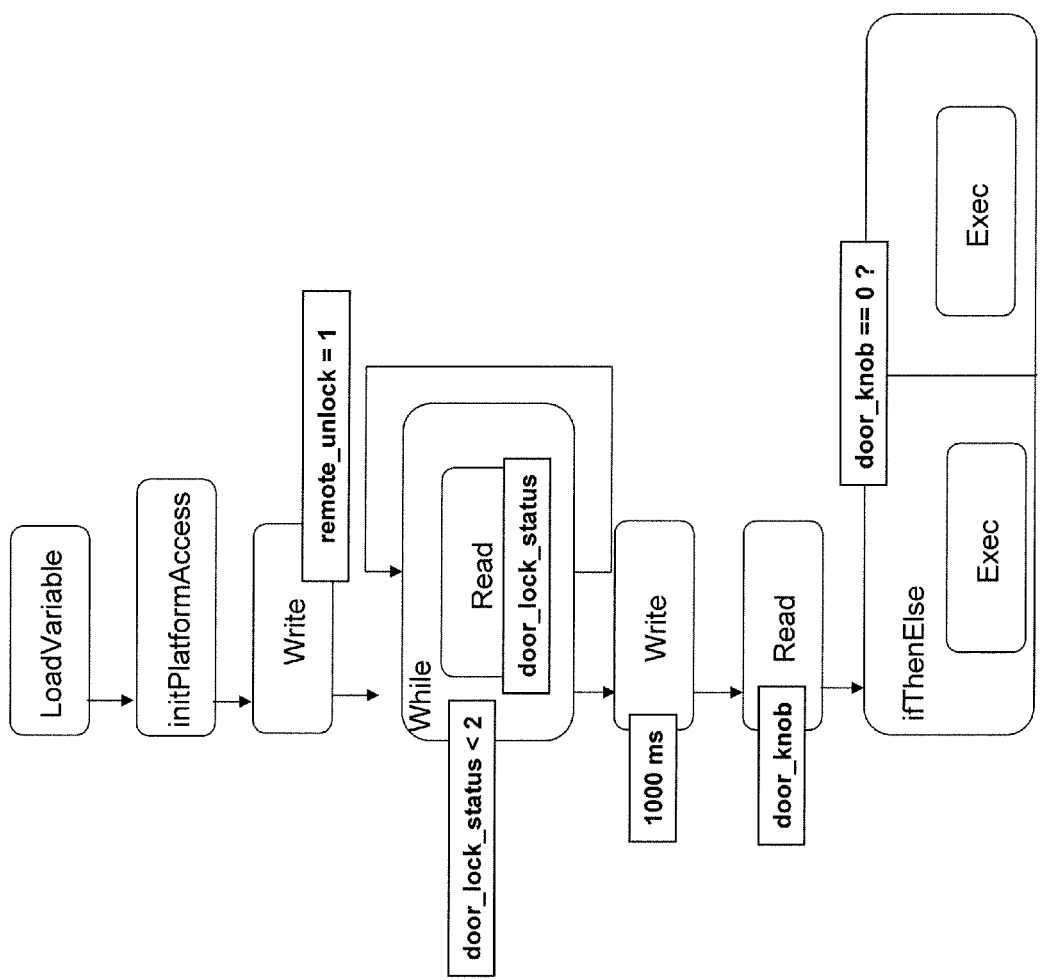
FIG. 71: Test sequence in AutomationDesk: relative dependency
Figure 75:
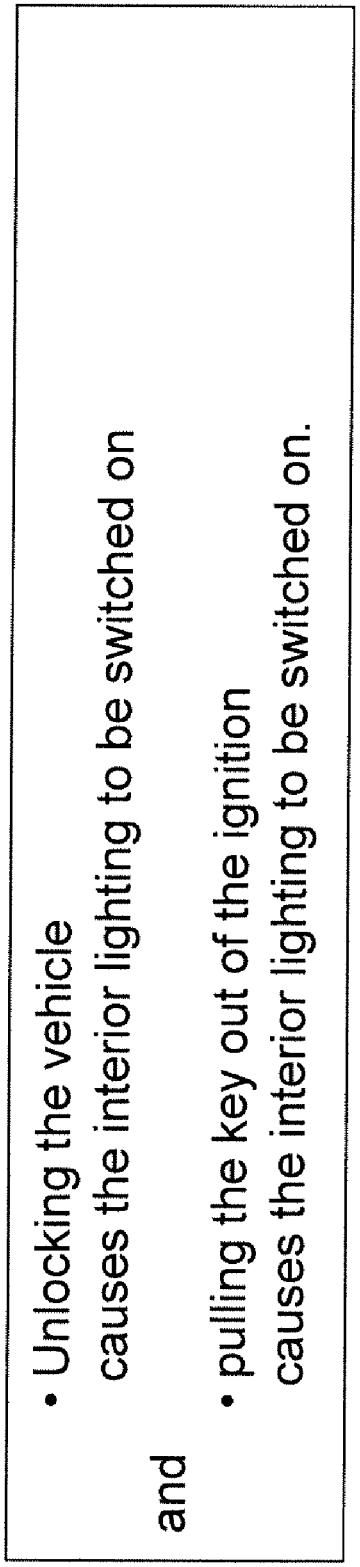
FIG. 75: Scenario "interior lighting"

FIG. 71 shows the sequence of test steps in AutomationDesk. The wait for the actual locking of the vehicle is modeled by a While block. This is executed repeatedly until the event that is being waited for occurs. The "door_lock_status" is read out in the While block. As long as its value <2, the action is repeated. When the variable has a value of 2, the locking of the vehicle has been performed, and the status of the door button can be checked.

This section showed different application examples for the concept created in the framework of this invention. Four different requirements were created, to show the use of interface objects, states, temporal conditions, operators, and relative dependencies. The following section contains an evaluation of the prototype developed, so that the concept described here can be evaluated. Realistic application scenarios are used for this.

The result of an evaluation of this invention is presented below. A comparison between manual creation of test specifications from given requirement scenarios and the use of the prototype for automatic generation of the test specifications aims to show the cost reduction provided by automatic generation. Then the tasks performed by people for the purpose of evaluation are described. This is followed by a section in which the results of evaluation are presented and discussed.

Whether the concepts developed in this invention can bring about the desired cost reduction in creating tests from natural-language requirements can be determined by a comparison between automation test generation by the prototype and manual test development from requirements. Four realistic scenarios describing requirements for the ECUs of a vehicle were chosen for the investigation. These scenarios do not represent complete requirements, in order to test whether a user designs complete test specifications without any help such as that given by the prototype. FIGS. 72, 73, 74 and 75 show the scenarios.

The "indicator lamp" scenario describes the conditions on which the indicator lamp of the rear fog lamp of a vehicle must be lit. The events that must cause this indicator lamp to be switched off are listed in the "indicator lamp off" scenario. The requirement for airbags at the time of an accident is defined in the "Airbag" scenario. The last scenario shows events that must cause the interior lighting of a vehicle to be switched on.

The first step in the task of evaluating this invention consisted in manual creation of individual test steps that are necessary for testing the functionalities described in the scenarios. It was specifically pointed out that the scenarios do not represent complete requirements and that further factors may have to be taken into account in order to test the functionalities for the desired behavior.

In the second part of the evaluation, the prototype was used. The scenarios could be formulated as requirements by means of the prototype. An automatic test specification generation showed the user the individual test steps for checking the functionality of the scenarios. The time needed for carrying out both parts of the task was observed.

For the evaluation, four test persons who had no previous knowledge of the concept of this invention were tasked. The test persons chosen were one graduate electrical engineer with 8 years' professional experience, a mechanical engineering student at advanced university level, a computer science student at advanced university level and an industrial engineering student at introductory university level.

To evaluate the concept and prototype for automatic generation of tests from natural-language requirements developed in this invention, the following criteria were defined:
1. Compare processing times for manual and automatic creation of test specifications
2. Compare the completeness of manually and automatically created test specifications
3. Evaluate the satisfaction of the test persons Although the test persons had no previous experience with the creative prototype whatsoever, after a brief introduction they were able to use it without assistance and were observed to be familiar with the available functions in the course of the working tasks. In 76% of the cases where test specification creation from a requirement was performed, time was saved by using the prototype. In 56% of cases, a considerable time saving was achieved by the prototype in contrast to manual execution, with an average time saving of around 44%. A maximum time saving of 80% was achieved in one case. It must be noted that the evaluation relates solely to the creation of a test specification from a requirement. Developing a test implementation from a test specification would presumably take more time when performed manually than importing a test specification into a test tool and linking interface objects and states with variables and values of the test object, so there is additional time-saving potential there.

None of the test persons extended scenarios by temporal conditions when creating test specifications manually. However, the scenario in FIG. 74 requires time specifications in order to describe useful functionality of the airbag. In contrast, the test persons did use the options for adding temporal conditions to the requirements in the prototype. This shows that requirements are described more completely when the prototype is used, as it prevents temporal conditions being forgotten.

The test persons described the automatic generation of tests from requirements as being useful. They particularly emphasized the reduction in error probability provided by the guidance that the prototype gives, such as the sequence and the temporal conditions. The ability to define synonyms, as described above, was judged very positively, as it is very helpful in making natural-language statements more readable. Describing a requirement by selecting test constructs was called "intuitive". The preview function in the form of the red arrow described above proved to be an advantage. One improvement that was requested was alphabetical sorting of text segments. Representation in parenthesis would be helpful as an alternative display option.

No significantly different results due to the test persons' different subject fields were found. The greatest time saving from automatic generation of test specifications was found in the industrial engineering student.

The result of this evaluation shows that requirements can be described intuitively in natural-language form, and that automatic generation of the test specification reduces the time taken in most cases. Further, requirements can be specified more completely, because without the support of a tool, it is possible to forget temporal conditions. The intuitive handling of the prototype has improvement potential.

The concepts that were created are summarized below with their possible applications, and an outlook to the future is given.

Within the framework of this invention, a concept that allows formal specification of natural-language requirements and automatic test generation on the basis of those requirements was produced. To enable users to create a requirement in natural-language form and at the same time obtain a machine-readable requirement, a vocabulary and a syntax were formulated by means of a metamodel. On the basis of the metamodel, a user can create a requirement that is formal but presented to the user in natural-language form. It is possible to define designations for interface objects and states to extend the vocabulary by terms that are specific to the system under test. The metamodel provides a way of specifying temporal conditions. Modeling a requirement with temporal conditions gives the requirement greater precision, which is necessary for testing embedded systems.

Because the concept of the requirement metamodel was modeled to be extendable, as described, elements can be added to complete the vocabulary. For example, it is possible to add elements that allow different sentence structures to be formed and that allow the nesting of "If . . . then" constructs. Further, it was demonstrated that an element can be added for specifying temporal conditions with a different time reference for the expected reaction. This would make it possible to formulate requirements in which an expected reaction runs parallel to the precondition in time, instead of following the precondition. Such a requirement is used for automatic test generation. To show the user the individual test steps before an executable test is created, a test specification is generated. The test steps defined in this show how the system to which the requirement applies will be tested. A test specification is generated from a requirement by the rules for model transformation described in this invention.

Creating an executable test from a test specification to test the embedded system requires the test-platform-independent interface objects and states to be mapped to the platform-specific variables and values of the test object. The implementation of such an executable test can be performed in a test tool. Degrees of freedom that arise from imprecise time specifications and that are still present in the test specification must be resolved for the test to be executed, so that concrete instructions can be executed in the test. Thus, the time specifications must be concretized before test execution.

Automating the requirement-to-executable-test sequence reduces the time taken for creating tests and helps keep the requirement and test specification consistent. Using natural language enables users without knowledge of formal methods to create requirements that are machine-readable and can therefore be further processed. The ability to add temporal conditions during requirement creation can support the specification of time aspects that can be forgotten in manual requirement formulation. Because degrees of freedom in the temporal conditions are retained right to the end, it is possible to execute the tests with several test cases by varying the concrete time values within their degrees of freedom.

The concept described in this invention is based on requirements. Because the fulfillment of requirements is an important criterion for high-quality software, requirement-based tests play an important part in quality assurance. The concept for automatically generating executable tests from requirements closes a gap in the test process, which is increasingly being automated. It provides great added value, because the cost of test creation can be considerably reduced by automation. The possible application of the concept in practice was shown by means of a prototype. The results of the evaluation indicate that automating the generation of tests from natural-language requirements saves time in the test process. Because testing accounts for an enormous proportion of development cost, development processes are made more efficient by lowering the cost of developing embedded systems.

Despite being seamless from requirement to test implementation, the concept described in this invention is extendable. The test specification that is generated automatically from the requirement is available in a format that was adapted to the test specification conceived in this invention. So that an executable test can be created from a test specification in automated form, the test tool in which the test is to be executed needs import functionality. It was shown that it would be a good solution to standardize the format for test specifications. The test description language TestML could be extended by various elements and made into such a standard.

Another future avenue of research would be a concept for creating different test cases, which would then be presented to the user for selection at the time when the executable test is executed. Due to the degrees of freedom of the temporal conditions, tests can be executed with different concrete time values. If a requirement contains the time duration condition "at least 4 seconds" in the precondition, the test can check whether:

1. The expected reaction occurs if the precondition is fulfilled for exactly 4 seconds 2. Or whether the expected reaction also occurs if the precondition is fulfilled for 5 or more seconds.

Different combinations of different input values also lead to several test cases. There are already various approaches to creating possible test cases, for example, as given in [CTF01, Hu00]. It can be investigated whether there is an approach that provides a suitable concept for integration into this invention.

Frequently, requirements are initially available in natural-language form. Since people's powers of linguistic expression are usually most secure and most extensive in their native language, requirements formulated in that native language have the lowest error potential. Thus, a concept for creating natural-language requirements in different languages is a possible future avenue of research that would extend this invention. However, many languages have completely different characteristics with regard to sentence construction and grammar than the English language investigated in this invention. The possibility of transferring the concept of this invention to languages that are characteristically different has great research potential.

Requirements are not exclusively described by natural language, however, but often completed by other forms of representation. Graphics are frequently produced, and table views are used. In addition, formal notations such as state machines make the textual requirements more precise. Combining the description of requirements in natural-language form and various other notations can help to provide more extensive options for expression. There remains research potential for formalizing requirements from combined notations for automatic test generation.

LITERATURE

[ACD93] Rajeev Alur, Costas Courcoubetis, and David L. Dill. Model-Checking in Dense Real-time. Information and Computation, 104(1):2-34, 1993.

[Ani05] Chris Aniszczyk. Using GEF with EMF. Eclipse Corner Articles, January 2005.

[Bal98] Helmut Balzert. Lehrbuch der Softwaretechnik. Spektrum Akademischer Verlag, 1998.

[BN03] Bart Broekman and Edwin Notenboom. Testing Embedded Software. Addison Wesley, 2003.

[BvdBK98] Manfred Broy, Michael von der Beeck, and Ingolf Krüger. SOFTBED: Problemanalyse für das Großverbundprojekt "Systemtechnik Automobil—Software für eingebettete Systeme". In Ausarbeitung für das BMBF, 1998.

[CES86] Edmund M. Clarke, E. Allen Emerson, and A. Prasad Sistla. Automatic Verification of Finite-State Concurrent Systems Using Temporal Logic Specifications. ACM Trans. Program. Lang. Syst., 8(2):244-263, 1986.

[CGP00] Edmund M. Clarke, Orna Grumberg, and Doron A. Peled. Model Checking. MIT Press, Cambridge, Mass., 2000.

[CLL97] Chin-Liang Chang, Richard C. Lee, and Richard Char-Tung Lee. Symbolic Logic and Mechanical Theorem Proving. Academic Press, Inc., Orlando, Fla., USA, 1997.

[CLRS01] Thomas H. Cormen, Charles E. Leiserson, Ronald L. Rivest, and Clifford Stein. Introduction to Algorithms. The MIT Press, September 2001.

[CSW06] Mirko Conrad, Sadegh Sadeghipour, and Hans-Werner Wiesbrock. Automatic Evaluation of ECU Software Tests. In Proceedings of the SAE 2005 World Congress, page 583, Detroit, USA, April 2006. Software Quality Research Lab, McMaster University, Hamilton, Canada. SAE Techn. Paper No. 2005-01-1659.

[CTF01] Philippe Chevalley and Pascale Th'evenod-Fosse. Automated Generation of Statistical Test Cases from UML State Diagrams. compsac, 00:205, 2001.

[Dij70] Edsger W. Dijkstra. Notes on Structured Programming. Forschungsbericht EWD249, April 1970.

[EMSS91] E. Allen Emerson, Aloysius K. Mok, A. Prasad Sistla, and Jai Srinivasan. Quantitative Temporal Reasoning (Extended Abstract). In E. M. Clarke and R. P. Kurshan, editors, Computer-Aided Verification: Proc. of the 2nd International ConferenceCAV'90, pages 136-145. Springer, Berlin, Heidelberg, 1991.

[FMR00] Stephan Flake, Wolfgang Müller, and Jütrgen Ruf. Structured English for Model Checking specification. In GI-Workshop Methoden und Beschreibungssprachen zur Modellierung und Verifikation von Schaltungen und Systemen in Frankfurt, Berlin, 2000. VDE Verlag.

[FP05] Mario Friske and Holger Pirk. Werkzeuggestützte interaktive Formalisierung textueller Anwendungsfallbeschreibungen für den Systemtest. In A. B. Cremers, P. Manthey, P. Martini, and V. Steinhage, editors, Beiträge der 35. Jahrestagung der Gesellschaft für Informatik e.V. (Band2), Bonn, 19. bis 22. September 2005., volume 68 of LNI, September 2005.

[Fri04] Mario Friske. Testfallerzeugung aus Use-Case-Beschreibungen. Softwaretechnik Trends, 24(3), August 2004. 21. Treffen der Fachgruppe 2.1.7 Test, Analyse und Verifikation von Software (TAV) der Gesellschaft für Informatik (GI).

[FS05] Mario Friske and Holger Schlingloff. Von Use Cases zu Test Cases: Eine systematische Vorgehensweise. In T. Klein, B. Rumpe, and B. Schätz, editors, Tagungsband Dagstuhl-Workshop MBEES: Model Based Engineering of Embedded Systems, number 2005-01 in Informatik-Bericht. TU Braunschweig, January 2005.

[GCF+06] Juergen Grossmann, Mirko Conrad, Ines Fey, Alexander Krupp, Klaus Lamberg, and Christian Wewetzer. TestML—A Test Exchange Language for Modelbased Testing of Embedded Software. In Proceedings of Automotive Software Workshop, March 2006.

[GG93] Matthias Grochtmann and Klaus Grimm. Classification Trees for Partition Testing. volume 3 of Software Testing, Verification and Reliability, pages 63-82.1993.

[GHJV04] Erich Gamma, Richard Helm, Ralph Johnson, and John Vlissides. Entwurfsmuster. Addison-Wesley, July 2004.

[Gmb99] Robert Bosch GmbH. Kraftfahrtechnisches Taschenbuch. Springer Verlag, 1999.

[Gra00] Jens Grabowski. TTCN-3—A new Test Specification Language for BlackBox Testing of Distributed Systems. In Proceedings of the 17th International Conference and Exposition on Testing Computer Software (TCS'2000), Theme: Testing Technology vs. Testers' Requirements, Washington D.C., June 2000, June 2000.

[Hu00] Mou Hu. A New Test Design Method for Requirement-Based Software Testing. Beijing, China, August 2000.

[IEE90] IEEE. IEEE Standard Glossary of Software Engineering Terminology, December 1990.

[iST01] British Computer Society Specialist Interest Group in Software Testing. Standard for software component testing (draft 3.4), April 2001.

[KBP01] Erik Kamsties, Daniel M. Berry, and Barbara Paech. Detecting Ambiguities in Requirements Documents Using Inspections. In Mark Lawford and David L. Parnas, editors, Proceedings of the First Workshop on Inspection in Software Engineering (WISE'01), pages 68-80, Paris, France, July 2001. Software Quality Research Lab, McMaster University, Hamilton, Canada.

[Ken02] Stuart Kent. Model Driven Engineering. In M. Butler, L. Petre, and K. Sere, editors, Proceedings of the Third International Conference on Integrated Formal Methods (IFM 2002), volume 2335 of Lecture Notes in Computer Science, page 286-298, Turku, Finland, May 2002. Springer Verlag.

[Lam06] Klaus Lamberg. Software-Entwicklung: Software-Testen. In H. Wallentowitz and K. Reif, editors, Handbuch Kraftfahrzeugelektronik Grundlagen—Komponenten—Systeme—Anwendungen. Vieweg Verlag, Wiesbaden, 2006.

[Lig02] Peter Liggesmeyer. Software-Qualität. Spektrum Akademischer Verlag, 2002.

[Lov78] Donald W. Loveland. Automated theorem proving: A logical basis. In Fundamental studies in computer science, volume 6, Amsterdam, N.Y., 1978. North-Holland Publishing Co.

[LR05] Peter Liggesmeyer and Dieter Rombach. Software Engineering eingebetteter Systeme. Spektrum Verlag, 2005.

[MDA02] The OMG's Model Driven Architecture, January 2002.

[MDG+04] Bill Moore, David Dean, Anna Gerber, Gunnar Wagenknecht, and Philippe Vanderheyden. Eclipse Development using the Graphical Editing Framework and the Eclipse Modeling Framework. January 2004.

[Obj05] Object Management Group. UML 2.0 Superstructure Specification, August 2005. Document ptc/05-07-04.

[ONS06] Rainer Otterbach, Oliver Niggemann, and Joachim Stroop. SoftwareEntwicklung: Entwicklungsprozesse, Methoden und Werkzeuge. In H. Wallentowitz and K. Reif, editors, Handbuch Kraftfahrzeugelektronik Grundlagen—Komponenten—Systeme—Anwendungen. Vieweg Verlag, Wiesbaden, 2006.

[Pel] Jan Peleska. Verbesserte Softwarequalität durch effiziente Testprozesse. Technologie-Zentrum Informatik und Verified Systems International GmbH. Revision: 1.5.

[Pnu77] Amir Pnueli. The Temporal Logic of Programs. In Proceedings of the 18th IEEE Symposium on the Foundations of Computer Science, pages 46-57. IEEE, 1977.

[Rup04] Chris Rupp. Requirements-Engineering und-Management. Hanser Verlag, 2004.

[SAC03] Rachel L. Smith, George S. Avrunin, and Lori A. Clarke. From Natural Language Requirements to Rigorous Property Specification. In Workshop on Software Engineering for Embedded Systems (SEES 2003): From Requirements to Implementation, pages 40-46, September 2003.

[Sch00] Uwe Schöning. Logik für Informatiker. Spektrum-Akademischer Verlag, January 2000.

[Tha00] Georg E. Thaller. Software-Test: Verifikation und Validation. Verlag Heinz Heise, 2000.

[WHH05] Rupert Wiebel, Steffen Höh, and Stefan Hendrata. Specifiaction Requirements Interchange Format (RIF), 2005.

APPENDIX A

Mapping the Elements of the Requirement Metamodel to Temporal Logic RTCTL

Mapping to RTCTL expressions is done inductively. The notation Iff(precondition, expectedReaction) means that the instances of element Iff of the metamodel, with the instances of the elements reached by the "precondition" and "expectedReaction" associations, are assigned the semantic that follows. The elements reached by the associations also have a semantic definition. For example, the associations precondition and expectedReaction are used to reach the elements of BaseExpressionElement type. Concrete instances of this element are AND, OR, XOR, NOT and InterfaceElement, whose semantics are defined. RTCTL formulas finally follow from all definitions.

BaseExpression
    Iff(precondition, expectedReaction)→precondition⇔expectedReaction
    Implies(precondition, expectedReaction)→precondition⇒expectedReaction BinaryOperator
    XOR(childOne, childTwo)→(childOne∧¬childTwo)∨(¬childOne∧childTwo)
    OR(childOne, childTwo)→childOne∨childTwo
    AND(childOne, childTwo)→childOne∧childTwo UnaryOperator
    NOT(baseExpressionElement)→¬baseExpressionElement The mappings belonging to an InterfaceElement element of PointOfTime and of LengthOfTime cannot be performed independently of one another, since a common time reference is needed. The mappings for an InterfaceElement are therefore performed within its context (InterfaceElement(pointOfTime, lengthOfTime, valueCondition)).

Let t∈N and V an associated ValueCondition in RTCTL, which is formed as follows:

ValueCondition
    AtMostforValue(interfaceElement, valueElement)→interfaceElement≦valueElement
    AtLeastforValue(interfaceElement, valueElement)→interfaceElement≧valueElement
    ExactlyValue(interfaceElement, valueElement)→interfaceElement=valueElement
    WithinValue(interfaceElement, lowerValue, upperValue)→lowerValue≦interfaceElement≦upperValue Since the temporal conditions of the expected reaction have a different reference to the temporal conditions specified in the precondition, the semantics of the temporal conditions for the precondition and for the expected reaction are defined differently. First there follows the definition of the semantic of the temporal conditions in the precondition.

V is true at the point in time ExactTime(time) for duration ExactDuration(duration)→A(true $U^{=time}$ V)∧¬E(true $U^{[time,time+duration]}$¬V)∧¬E(true $U^{>time+duration}$V)

V is true at the point in time ExactTime(time) for duration AtLeast(duration)→A(true $U^{=time}$ V)∧¬E(true $U^{[time,time+duration]}$¬V)

V is true at the point in time ExactTime(time) for duration AtMost(duration)→A(true $U^{=time}$ V)∧¬E(true $U^{>time+duration}$V)

V is true at the point in time ExactTime(time) for duration BetweenDuration(lowerDuration, upperDuration)→A(true $U^{=time}$ V)∧¬E(true $U^{[time,time+lower\ duration]}$¬V)∧¬E(true $U^{>time+upperDuration}$V)

V is true at the point in time Soonest(time) for duration ExactDuration(duration)→t≧time∧A(¬V $U^{=t}$ V)∧¬E(true $U^{[t,t+duration]}$¬V)∧¬E(true $U^{>t+duration}$V)

V is true at point in time Soonest(time) for duration AtLeast(duration)→t≧time∧A(¬V $U^{=t}$V)∧¬E(true $U^{[t,t+duration]}$∧¬V)

V is true at point in time Soonest(time) for duration AtMost(duration)→t≧time ∧A(¬V $U^{=t}$V)∧¬E(true $U^{>t+duration}$V)

V is true at the point in time Soonest(time) für for the durationBetweenDuration(lowerDuration, upperDuration)→t≧time∧A(¬V $U^{=t}$V)∧¬E(true $U^{[t,t+lowerDuration]}$¬V)∧¬E(true $U^{>t+upperDuration}$V)

V is true at the point in time NotLaterThan(time) for durationExactDuration(duration)→t≦time∧A(¬V $U^{=t}$V)∧¬E(true $U^{[t,t+duration]}$¬V)∧¬E(true $U^{>t+duration}$V)

V is true at point in time NotLaterThan(time) for duration AtLeast(duration)→t≦time∧A(¬V $U^{=t}$V)∧¬E(true $U^{[t,t+duration]}$¬V)

V is true at the point in time NotLaterThan(time) for durationAtMost(duration)→t≦time∧A(¬V $U^{=t}$V)∧¬E(true $U^{>t+duration}$V)

V is true at the point in time NotLaterThan(time) for the durationBetweenDuration(lowerDuration, upperDuration)→t≦time∧A(¬V $U^{=t}$V)∧¬E(true $U^{[t,t+lowerDuration]}$¬V)∧¬E(true $U^{>t+upperDuration}$V)

V is true at the point in time BetweenTime(lowerTime, upperTime) for the duration ExactDuration(duration)→lowerTime≦t≦upperTime∧A(¬V $U^{=t}$V)∧¬E(true $U^{[t,t+duration]}$¬V)∧¬E(true $U^{>t+duration}$V)

V is true at the point in time BetweenTime(lowerTime, upperTime) for the durationAtLeast(duration)< lowerTime≦t≦upperTime∧A(¬V $U^{=t}$V)∧¬E(true $U^{[t+lowerDuration]}$¬V)∧¬E(true $U^{>t+upperDuration}$V)

V is true at the point in time BetweenTime(lowerTime, upperTime) for the duration AtMost(duration)→lowerTime≦t≦upperTime∧A(¬U$^{=t}$V)∧¬E(true $U^{>t+duration}$V)

V is true at the point in time BetweenTime(lowerTime, upperTime) for the duration BetweenDuration(lowerDuration, upperDuration)→lowerTime≦t≦upperTime∧A(¬V $U^{=t}$V)∧¬E(true $U^{[t,t+lowerDuration]}$¬V)∧¬E(true $U^{>t+upperDuration}$V)

The temporal conditions in the expected reaction are defined as follows. Let m be the earliest point in time at which all the conditions of the precondition are completed. Thus, point in time m is the reference point for the temporal conditions of the expected reaction.

V is true at the point in time ExactTime(m+time) for durationExactDuration(duration)→A(true $U^{=m+time}$ V)∧¬E(true $U^{[m+time+duration]}$¬V)∧¬E(true $U^{>m+time+duration}$V)

V is true at the point in time ExactTime(m+time) for durationAtLeast(duration)→A(true $U^{=M+time}$ V)∧¬E(true $U^{[m+time,m+time+duration]}$¬V)

V is true at the point in time ExactTime(m+time) for duration AtMost(duration)→A(true $U^{=m+time}$ V)∧¬E(true $U^{>m+time+duration}$V)

V is true at the point in time ExactTime(m+time) for the duration BetweenDuration(lowerDuration, upperDuration)→A(true $U^{=m+time}$ V)∧¬E(true $U^{[m+time,m+time+lowerDuration]}$¬V)∧¬E(true $U^{>m+time+upperDuration}$V)

V is true at the point in time Soonest(m+time) for duration ExactDuration(duration)→t≧m+time∧A(¬V $U^{=t}$V)∧¬E(true $U^{[t,t+duration]}$¬V)∧¬E(true $U^{>t+duration}$V)

V is true at the point in time Soonest(m+time) for duration AtLeast(duration)→t≧m+time∧A(¬V $U^{=t}$V)∧¬E(true $U^{[t,t+duration]}$¬V)

V is true at the point in time Soonest(m+time) for duration AtMost(duration)→t≧m+time∧A(¬V $U^{=t}$V)∧¬E(true $U^{>t+duration}$V)

V is true at the point in time Soonest(m+time) for the duration BetweenDuration(lowerDuration, upperDuration)→t≧m+time∧A(¬V $U^{=t}$V)∧¬E(true $U^{[t,t+lowerDuration]}$¬V)∧¬E(true $U^{>t+upperDuration}$V)

V is true at the point in time NotLaterThan(m+time) for duration ExactDuration(duration)→t≦m+time∧A(¬V $U^{=t}$V)∧¬E(true $U^{[t,t+duration]}$¬V)∧¬E(true $U^{>t+duration}$V)

V is true at the point in time NotLaterThan(m+time) for duration AtLeast(duration)→t≦m+time∧A(¬V $U^{=t}$V)∧¬E(true $U^{[t,t+duration]}$¬V)

V is true at the point in time NotLaterThan(m+time) for duration AtMost(duration)→t≦m+time∧A(¬V $U^{=t}$V)∧¬E(true $U^{>t+duration}$V)

V is true at the point in time NotLaterThan(m+time) for the duration BetweenDuration(lowerDuration, upperDuration)→t≦m+time∧A(¬V $U^{=t}$V)∧¬E(true $U^{[t,t+lowerDuration]}$¬V)∧¬E(true $U^{>t+upperDuration}$V)

V gilt zum Zeitpunkt BetweenTime(m+lowerTime, m+upperTime) für die Dauer ExactDuration(duration)→m+lowerTime≦t≦m+upperTime∧A(¬V $U^{=t}$V)∧¬E(true $U^{[t,t+duration]}$¬V)∧¬E(true $U^{>t+duration}$V)

V is true at the point in time BetweenTime(m+lowerTime, m+upperTime) for the duration AtLeast(duration)→m+lowerTime≦t≦m+upperTime∧A(¬V $U^{=t}$V)∧¬E(true $U^{[t,t+duration]}$¬V)

V is true at the point in time BetweenTime(m+lowerTime, m+upperTime) for the duration AtMost(duration)→m+lowerTime≦t≦m+upperTime∧A(¬V $U^{=t}$V)∧¬E(true $U^{>t+duration}$V)

V is true at the point in time BetweenTime(m+lowerTime, m+upperTime) for the duration BetweenDuration(lowerDuration, upperDuration)→m+lowerTime≦t≦m+upperTime∧A(¬V $U^{=t}$V)∧¬E (true$U^{[t,t+lowerDuration]}$¬V)∧¬E(true $U^{>t+upperDuration}$V)

The invention claimed is:

1. A method of creating a requirement description for testing an embedded system, comprising:
   storing a vocabulary of natural-language, selectable text segments in a data processing system, each of said text segments being combinable only with a deterministically selected subset of said text segments to form at least one natural-language sentence including a condition and a response to a condition, and
   storing a requirements metamodel in the data processing system, each text segment being linked to an instance in the requirements metamodel such that when a text segment is selected a machine readable description of the text segment is created and such that said condition is assigned a value placeable at an input of the embedded system and the response to the condition is assigned a value placeable at an output of the embedded system.

2. The method according to claim 1, further comprising assigning the text segments to classes of a stored requirement metamodel.

3. The method according to claim 2, wherein for every text segment that is selected, an instance of the requirement metamodel is complemented by an instance of the requirement metamodel class linked to the text segment.

4. The method according to claim 1 wherein each text segment is assigned to a class of the requirement metamodel, and for each class, information on at least one relationship and the direction of the relationship to at least one other class is stored, so that by means of the unidirectional relationship, a class sequence is formed, which defines a grammatically correct arrangement of the text segments assigned to the classes.

5. The method according to claim 1 further comprising:
linking and representing a selected text segment with a set of combinable text segments performed by determining the class that is assigned to the selected text segment in the requirement metamodel, by subsequently finding at least one class which follows the specific class according to a unidirectional relationship, by subsequently putting together the elements of at least one of the found successor classes to form a set whose elements are represented by the text segment assigned in each case, and by subsequently displaying these text segments on the display unit, possibly but not necessarily as selectable menu items.

6. The method according to claim 1 wherein sets of mandatory text segments and sets of possible text segments are displayed, whereby sets of possible text segments, including but not only ones concerning temporal specifications, can be skipped without a text segment being selected.

7. The method according to claim 1 wherein the text segments that were already selected can be replaced in a formed requirement description by alternative text segments, for which purpose on selection of a text segment to be replaced a set of possible alternative text segments is automatically displayed in selectable form, whereby the text segment to be replaced is automatically replaced on selection of an alternative text segment from the displayed set.

8. The method according to claim 1 wherein after creation of a natural-language requirement description, the data processing system performs a transformation by which the requirement description is converted into a platform-independent, natural-language test specification.

9. The method according to claim 8, wherein in order to perform the transformation, the instance of the requirement metamodel that was formed in parallel is converted into an instance of a test model by a model transformation, for which at least some of the elements of the instance of the requirement metamodel are transformed into elements of an instance of a test metamodel, whereby an instance of the test metamodel obtained in this way is represented on the display unit of the data processing system as a natural-language test specification, for which purpose natural-language text segments are assigned to the elements of the instance of the test metamodel.

10. The method according to claim 8 wherein elements of the instance of the requirement metamodel that describe a condition are transformed into elements of the instance of the test metamodel that effect value assignments at the inputs of the embedded system, and elements of the instance of the requirement model that describe a reaction to a condition are transformed into elements of the instance of the test metamodel that check values at the outputs.

11. Method according to claim 8 wherein elements of the instance of the requirement metamodel that describe an imprecise time aspect are transformed into elements of the instance of the test metamodel that comprise a degree of freedom that can be concretized in terms of time.

12. The method according to claim 8 wherein a platform-dependent test program is generated from the platform-independent instance of the test metamodel.

13. The method according to claim 12, wherein a temporal degree of freedom is concretized before generation.

14. A computer program product that is stored on a non-transitory data medium and that, when executed on a data processing system, executes a method according to claim 1.

15. The method of claim 1 wherein the natural language sentence is in the English language.

16. The method of claim 2 wherein the classes are classes of the Unified Modelling Language.

* * * * *